(12) United States Patent
Park et al.

(10) Patent No.: US 11,882,246 B2
(45) Date of Patent: *Jan. 23, 2024

(54) METHOD AND APPARATUS FOR IMAGE ENCODING, AND METHOD AND APPARATUS FOR IMAGE DECODING

(71) Applicant: SAMSUNG ELECTRONICS CO., LTD., Suwon-si (KR)

(72) Inventors: Minsoo Park, Suwon-si (KR); Minwoo Park, Suwon-si (KR); Kiho Choi, Suwon-si (KR); Seungsoo Jeong, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/691,732

(22) Filed: Mar. 10, 2022

(65) Prior Publication Data

US 2022/0201299 A1    Jun. 23, 2022

Related U.S. Application Data

(63) Continuation of application No. 17/157,459, filed on Jan. 25, 2021, now Pat. No. 11,310,499, which is a
(Continued)

(51) Int. Cl.
*H04N 19/82*    (2014.01)
*H04N 19/176*    (2014.01)
(Continued)

(52) U.S. Cl.
CPC ......... *H04N 19/119* (2014.11); *H04N 19/117* (2014.11); *H04N 19/176* (2014.11); *H04N 19/82* (2014.11)

(58) Field of Classification Search
CPC .. H04N 19/119; H04N 19/117; H04N 19/176; H04N 19/82
See application file for complete search history.

(56) References Cited

U.S. PATENT DOCUMENTS

| 9,872,019 B2 | 1/2018 | Song et al. |
| 10,027,972 B2 | 7/2018 | Han et al. |

(Continued)

FOREIGN PATENT DOCUMENTS

| EP | 2 574 055 A1 | 3/2013 |
| EP | 3 217 663 A1 | 9/2017 |

(Continued)

OTHER PUBLICATIONS

Norkin, A., et al., "Description of Core Experiment 11 (CE11): Deblocking", Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-24.

(Continued)

*Primary Examiner* — Tsion B Owens
(74) *Attorney, Agent, or Firm* — Sughrue Mion, PLLC

(57) ABSTRACT

An image decoding method includes reconstructing a current image by performing deblocking filtering on a boundary of at least one reconstruction block from among reconstruction blocks, wherein the reconstructing of the current image by performing the deblocking filtering on the boundary of the at least one reconstruction block from among the reconstruction blocks includes, when a prediction mode of at least one reconstruction mode from among blocks located on both sides of the boundary of the at least one reconstruction block is a combined inter-intra prediction mode, determining that a value of a boundary filtering strength applied to the boundary of the at least one reconstruction block is a predetermined value and performing deblocking filtering on
(Continued)

the boundary of the at least one reconstruction block based on the determined value of the boundary filtering strength.

4 Claims, 40 Drawing Sheets

Related U.S. Application Data continuation of application No. PCT/KR2019/009492, filed on Jul. 30, 2019.

(60) Provisional application No. 62/743,637, filed on Oct. 10, 2018, provisional application No. 62/711,850, filed on Jul. 30, 2018.

(51) Int. Cl.
    *H04N 19/119*    (2014.01)
    *H04N 19/117*    (2014.01)

(56) References Cited

U.S. PATENT DOCUMENTS

| | | | |
|---|---|---|---|
| 10,284,878 | B2 | 5/2019 | Min et al. |
| 2011/0310969 | A1 | 12/2011 | Park et al. |
| 2016/0044312 | A1* | 2/2016 | Sato ............... H04N 19/176 |
| | | | 375/240.24 |
| 2017/0142418 | A1 | 5/2017 | Li et al. |
| 2017/0251213 | A1 | 8/2017 | Ye et al. |
| 2017/0347127 | A1 | 11/2017 | Lim et al. |
| 2018/0359470 | A1 | 12/2018 | Lee et al. |
| 2019/0281285 | A1* | 9/2019 | Piao ................. H04N 19/96 |
| 2020/0077086 | A1* | 3/2020 | Lee ................. H04N 19/96 |
| 2021/0337211 | A1 | 10/2021 | Wang et al. |

FOREIGN PATENT DOCUMENTS

| | | | |
|---|---|---|---|
| EP | 3614669 | A1 | 2/2020 |
| KR | 1020120010177 | A | 2/2012 |
| KR | 10-2014-0071302 | A | 6/2014 |
| KR | 1020170021302 | A | 2/2017 |
| KR | 1020210088697 | A | 7/2021 |
| WO | 2012150849 | A2 | 11/2012 |
| WO | 2017/105097 | A1 | 6/2017 |
| WO | 2019009502 | A1 | 1/2019 |

OTHER PUBLICATIONS

Bross, B., et al., Versatile Video Coding (Draft 6), Joint Video Experts Team (JVET) of ITU-T SG 16 WP 3 and ISO/IEC JTC 1/SC 29/WG 11, 15th Meeting: Gothenburg, SE, Jul. 3-12, 2019, 471 pages.
International Search Report (PCT/ISA/210) and Written Opinion (PCT/ISA/237) dated Nov. 13, 2019 issued by the International Searching Authority in International Application No. PCT/KR2019/009492.
Communication dated Jul. 5, 2021 by the Korean Intellectual Property Office in counterpart Korean Patent Application No. 10-2020-7033563.
Communication dated May 19, 2022, issued by the European Patent Office in counterpart European Application No. 19845475.3.
Jin et al., "Combined Inter-Intra Prediction for High Definition Video Coding," Nov. 7, 2007, XP030080387, Total 4 pages.
Communication dated Nov. 8, 2022 issued by the Korean Intellectual Property Office in application No. 10-2021-7041396.
Communication dated Nov. 8, 2022 issued by the Korean Intellectual Property Office in application No. 10-2021-7041397.
Communication dated Oct. 6, 2022 issued by the Intellectual Property India Patent Office in application No. 202127003114.
Communication dated Jun. 30, 2023 by the European Patent Office in counterpart to European Patent Application No. 19845475.3.
Communication dated Oct. 10, 2023 by the Indian Patent Office for Indian Patent Application No. 202328022146.
Communication dated Oct. 9, 2023 by the Indian Patent Office for Indian Patent Application No. 202328021799.

\* cited by examiner

FIG. 13

| BLOCK SHAPE / DEPTH | 0: SQUARE | 1: NS_VER | 2: NS_HOR |
|---|---|---|---|
| DEPTH OF D | 1300 | 1310 | 1320 |
| DEPTH OF D+1 | 1302 | 1312 | 1322 |
| DEPTH OF D+2 | 1304 | 1314 | 1324 |
| ... | ... | ... | ... |

REFERENCE BLOCK 1   REFERENCE BLOCK 2   PREDICTION BLOCK

FIG. 26

| Conditions | Bs |
|---|---|
| At least one of the blocks is Intra | 2 |
| At least one of the blocks has non-zero coded residual coefficient and boundary is a trasnform boundary | 1 |
| Absolute differences between corresponding spatial motion vector components of the two blocks are >= 1 in units of integer pixels | 1 |
| Motion-compensated prediction for the two blocks refers to different reference pictures or the number of motion vectors is different for the two blocks | 1 |
| Otherwise | 0 |

METHOD AND APPARATUS FOR IMAGE ENCODING, AND METHOD AND APPARATUS FOR IMAGE DECODING

CROSS-REFERENCE TO RELATED APPLICATIONS

This application is a continuation of U.S. application Ser. No. 17/157,459, filed Jan. 25, 2021, which is a continuation of International Application No. PCT/KR2019/009492, which was filed on Jul. 30, 2019, and claims priority to U.S. Patent Application No. 62/711,850, which was filed on Jul. 30, 2018, and U.S. Patent Application No. 62/743,637, which was filed on Oct. 10, 2018, the contents of which are incorporated by reference herein in their entireties.

TECHNICAL FIELD

A method and apparatus according to an embodiment may encode or decode an image by using coding units, prediction units, or transform units of various shapes included in the image. A method and apparatus according to an embodiment may encode or decode an image by generating a reconstruction block by using a residual block and a prediction block and performing deblocking filtering on a boundary of the reconstruction block.

BACKGROUND ART

With the development and spread of hardware capable of reproducing and storing high-resolution or high-definition image content, the need for a codec that effectively encodes or decodes high-resolution or high-definition image content is increasing. Encoded image content may be reproduced by being decoded. Recently, methods for effectively compressing such high-resolution or high-definition image content have been performed. For example, an efficient image compressing method is performed through a process of processing an image to be encoded via an arbitrary method.

To compress an image, various data units may be used, and an inclusion relationship may exist between the data units. To determine sizes of data units that are used for image compression, data units may be split by using various methods, and optimized data units may be determined according to the characteristics of images so that encoding or decoding of the images may be performed.

DESCRIPTION OF EMBODIMENTS

Technical Solution to Problem

An image decoding method according to an embodiment of the present disclosure includes: determining a plurality of blocks in a current image by hierarchically splitting the current image based on a split shape mode of the current image; generating prediction blocks of the plurality of blocks by performing prediction on the plurality of blocks; generating residual blocks of the plurality of blocks based on information about residuals of the plurality of blocks obtained from a bitstream, generating reconstruction blocks for the plurality of blocks by using the prediction blocks of the plurality of blocks and the residual blocks of the plurality of blocks; and reconstructing the current image by performing deblocking filtering on a boundary of at least one block from among the plurality of reconstruction blocks, wherein the reconstructing of the current image by performing deblocking filtering on the boundary of the at least one reconstruction block from among the reconstruction blocks includes, when a prediction mode of at least one reconstruction block from among blocks located on both sides of the boundary of the at least one reconstruction block is a combined inter-intra prediction mode, determining that a value of a boundary filtering strength applied to the boundary of the at least one reconstruction block is a predetermined value, and performing deblocking filtering on the boundary of the at least one reconstruction block based on the determined value of the boundary filtering strength.

The performing of the deblocking filtering on the boundary of the at least one reconstruction block based on the determined value of the boundary filtering strength may include, when a size of the at least one reconstruction block is 4×N or N×4 (where N is an integer equal to or greater than 4), determining that the number of pixels in at least one reconstruction block whose pixel value is changed during the deblocking filtering in units of rows or columns at a vertical boundary corresponding to the size of 4×N or at a horizontal boundary corresponding to the size of N×4 is 1.

The predetermined value may be 1 or 2.

The predetermined value may be a value that is the same as a value of a boundary filtering strength used when a prediction mode of at least one block from among the blocks located on both sides of the boundary of the at least one reconstruction block is an intra prediction mode.

The predetermined value may be a value that is the same as a value of a boundary filtering strength used when prediction modes of the blocks located on both sides of the boundary of the at least one reconstruction block are inter prediction modes.

The determining that the value of the boundary filtering strength applied to the boundary of the at least one reconstruction block is the predetermined value and the performing of the deblocking filtering on the boundary of the at least one reconstruction block based on the determined value of the boundary filtering strength when a prediction mode of at least one block from among the blocks located on both sides of the boundary of the at least one reconstruction block is the combined inter-intra prediction mode may include, when a size of at least one block from among the blocks located on both sides of the boundary of the at least one reconstruction block is equal to or greater than a predetermined size and a prediction mode of the at least one block is a combined inter-intra prediction mode, determining that the value of the boundary filtering strength applied to the boundary of the at least one reconstruction block is the predetermined value.

The determining that the value of the boundary filtering strength applied to the boundary of the at least one reconstruction block is the predetermined value and the performing of the deblocking filtering on the boundary of the at least one reconstruction block based on the determined value of the boundary filtering strength when a prediction mode of at least one block from among the blocks located on both sides of the boundary of the at least one reconstruction block is an inter-intra prediction mode may include, when a size of at least one block from among the blocks located on both sides of the boundary of the at least one reconstruction block is equal to or less than a predetermined size and a prediction mode of the at least one block is a combined inter-intra prediction mode, determining that the value of the boundary filtering strength applied to the boundary of the at least one reconstruction block is the predetermined value.

The split shape mode may be a mode based on a split type including one of quad split, binary split, and tri-split.

An image decoding apparatus according to an embodiment of the present disclosure includes at least one processor configured to determine a plurality of blocks in a current image by hierarchically splitting the current image based on a split shape mode of the current image, generate prediction blocks of the plurality of blocks by performing prediction on the plurality of blocks, generate residual blocks of the plurality of blocks based on information about residuals of the plurality of blocks obtained from a bitstream, generate reconstruction blocks for the plurality of blocks by using the prediction blocks of the plurality of blocks and the residual blocks of the plurality of blocks, and reconstruct the current image by performing deblocking filtering on a boundary of at least one reconstruction block of the reconstruction blocks, wherein, when the at least one processor reconstructs the current image by performing deblocking filtering on the boundary of the at least one reconstruction block, and a prediction mode of at least one block of blocks located on both sides of the boundary of the at least one reconstruction block is a combined inter-intra prediction mode, the at least one processor determines that a value of a boundary filtering strength applied to the boundary of the at least one reconstruction block is a predetermined value, and performs deblocking filtering on the boundary of the at least one reconstruction block based on the determined value of the boundary filtering strength.

The predetermined value may be 1 or 2.

The predetermined value may be a value that is the same as a value of a boundary filtering strength used when a prediction mode of at least one block from among the blocks located on both sides of the boundary of the at least one reconstruction block is an intra prediction mode.

The predetermined value may be a value that is the same as a value of a boundary filtering strength used when prediction modes of the blocks located on both sides of the boundary of the at least one reconstruction block are inter prediction modes.

When the at least one processor determines that the value of the boundary filtering strength applied to the boundary of the at least one reconstruction block is the predetermined value and performs the deblocking filtering on the boundary of the at least one reconstruction block based on the determined value of the boundary filtering strength when a prediction mode of at least one block from among the blocks located on both sides of the boundary of the at least one reconstruction block is a combined inter-intra prediction mode,
when a size of at least one block of the blocks located on both sides of the boundary of the at least one reconstruction block is equal to or greater than a predetermined size and a prediction mode of the at least one block is a combined inter-intra prediction mode, the at least one processor may determine that the value of the boundary filtering strength applied to the boundary of the reconstruction block is the predetermined value.

When the at least one processor determines that the value of the boundary filtering strength applied to the boundary of the reconstruction block is the predetermined value and performs the deblocking filtering on the boundary of the reconstruction block based on the determined value of the boundary filtering strength when a prediction mode of at least one block from among the blocks located on both sides of the boundary of the at least one reconstruction block is a combined inter-intra prediction mode,
when a size of at least one block of the blocks located on both sides of the boundary of the at least one reconstruction block is equal to or less than a predetermined size and a prediction mode of the at least one block is a combined inter-intra prediction mode, the at least one processor may determine that the value of the boundary filtering strength applied to the boundary of the at least one reconstruction block is the predetermined value.

An image encoding method according to an embodiment of the present disclosure includes:
determining a plurality of blocks in a current image by hierarchically splitting the current image based on a split shape mode of the current image; generating prediction blocks of the plurality of blocks by performing prediction on the plurality of blocks; encoding residual blocks of the plurality of blocks based on the prediction blocks of the plurality of blocks and original blocks;
generating reconstruction blocks for the plurality of blocks by using the prediction blocks of the plurality of blocks and the encoded residual blocks; and performing deblocking filtering on a boundary of at least one reconstruction block from among the reconstruction blocks,
wherein the performing of the deblocking filtering on the boundary of the at least one reconstruction block includes, when a prediction mode of at least one block from among blocks located on both sides of the boundary of the at least one reconstruction block is a combined inter-intra prediction mode, determining that a value of a boundary filtering strength applied to the boundary of the at least one reconstruction block is a predetermined value and performing deblocking filtering on the boundary of the at least one reconstruction block based on the determined value of the boundary filtering strength.

An image encoding apparatus according to an embodiment of the present disclosure includes at least one processor configured to determine a plurality of blocks in a current image by hierarchically splitting the current image based on a split shape mode of the current image, generate prediction blocks of the plurality of blocks by performing prediction on the plurality of blocks, encode residual blocks of the plurality of blocks based on the prediction blocks of the plurality of blocks and original blocks, generate reconstruction blocks for the plurality of blocks by using the prediction blocks of the plurality of blocks and the encoded residual blocks, and perform deblocking filtering on a boundary of at least one reconstruction block from among the reconstruction blocks,
wherein, when the at least one processor performs the deblocking filtering on the boundary of the at least one reconstruction block, when a prediction mode of at least one block from among blocks located on both sides of the boundary of the at least one reconstruction block is a combined inter-intra prediction mode, the at least one processor determines that a value of a boundary filtering strength applied to the at least one reconstruction block is a predetermined value and performs deblocking filtering on the boundary of the at least one reconstruction block based on the determined value of the boundary filtering strength.

An image decoding method according to an embodiment of the present disclosure includes:
determining a plurality of blocks in a current image by hierarchically splitting the current image based on available split shape modes of the plurality of blocks in the current image; generating prediction blocks of the plurality of blocks by performing prediction on the plurality of blocks; generating residual blocks of the plurality of blocks based on information about residuals of the plurality of blocks obtained from a bitstream, generating reconstruction blocks for the plurality of blocks by using the prediction blocks of the plurality of blocks and the residual blocks of the plurality of blocks; and reconstructing the current image by performing deblocking filtering on a boundary of at least one reconstruction block from among the reconstruction blocks based on a size or a shape of at least one block from among the plurality of blocks determined by the available split shape modes of the plurality of blocks in the current image.

An image encoding method according to an embodiment of the present disclosure includes: determining a plurality of blocks in a current image by hierarchically splitting the current image based on available split shape modes of the plurality of blocks in the current image; generating prediction blocks of the plurality of blocks by performing prediction on the plurality of blocks; encoding residual blocks of the plurality of blocks based on the prediction blocks of the plurality of blocks and original blocks; generating reconstruction blocks for the plurality of blocks by using the prediction blocks of the plurality of blocks and the encoded residual blocks; and performing deblocking filtering on a boundary of at least one reconstruction block from among the reconstruction blocks based on a size or a shape of at least one block from among the plurality of blocks determined based on the available split shape modes of the plurality of blocks in the current image.

A computer program for executing an image decoding method according to an embodiment of the present disclosure may be recorded on a computer-readable recording medium.

BRIEF DESCRIPTION OF DRAWINGS

FIG. 13 illustrates a process of determining a depth of a coding unit as a shape and a size of the coding unit change, when the coding unit is recursively split to determine a plurality of coding units, according to an embodiment.

FIG. 26 is a table showing a value of a boundary filtering strength Bs and conditions for determining the boundary filtering strength Bs, according to an embodiment.

BEST MODE

Figure 1A:
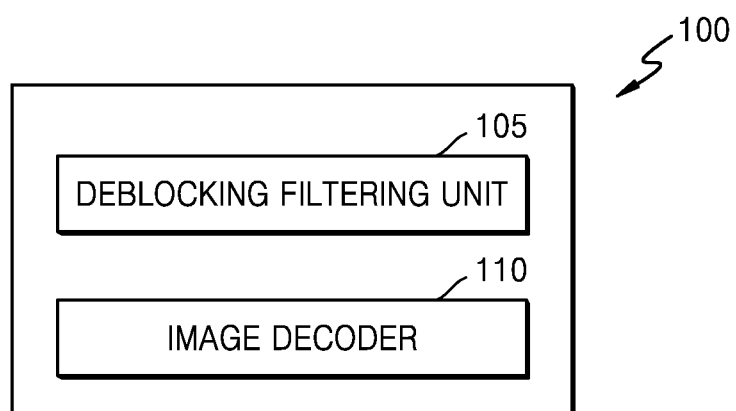
FIG. 1A is a block diagram of an image decoding apparatus according to various embodiments.

An image decoding method according to an embodiment of the present disclosure includes: determining a plurality of blocks in a current image by hierarchically splitting the current image based on a split shape mode of the current image; generating prediction blocks of the plurality of blocks by performing prediction on the plurality of blocks; generating residual blocks of the plurality of blocks based on information about residuals of the plurality of blocks obtained from a bitstream, generating reconstruction blocks for the plurality of blocks by using the prediction blocks of the plurality of blocks and the residual blocks of the plurality of blocks; and reconstructing the current image by performing deblocking filtering on a boundary of at least one block from among the plurality of reconstruction blocks, wherein the reconstructing of the current image by performing deblocking filtering on the boundary of the at least one reconstruction block from among the reconstruction blocks includes, when a prediction mode of at least one reconstruction block from among blocks located on both sides of the boundary of the at least one reconstruction block is a combined inter-intra prediction mode, determining that a value of a boundary filtering strength applied to the boundary of the at least one reconstruction block is a predetermined value, and performing deblocking filtering on the boundary of the at least one reconstruction block based on the determined value of the boundary filtering strength.

An image decoding apparatus according to an embodiment of the present disclosure includes at least one processor configured to determine a plurality of blocks in a current image by hierarchically splitting the current image based on a split shape mode of the current image, generate prediction blocks of the plurality of blocks by performing prediction on the plurality of blocks, generate residual blocks of the plurality of blocks based on information about residuals of the plurality of blocks obtained from a bitstream, generate reconstruction blocks for the plurality of blocks by using the prediction blocks of the plurality of blocks and the residual blocks of the plurality of blocks, and reconstruct the current image by performing deblocking filtering on a boundary of at least one reconstruction block of the reconstruction blocks, wherein, when the at least one processor reconstructs the current image by performing deblocking filtering on the boundary of the at least one reconstruction block, and a prediction mode of at least one block of blocks located on both sides of the boundary of the at least one reconstruction block is a combined inter-intra prediction mode, the at least one processor determines that a value of a boundary filtering strength applied to the boundary of the at least one reconstruction block is a predetermined value, and performs deblocking filtering on the boundary of the at least one reconstruction block based on the determined value of the boundary filtering strength.

An image encoding method according to an embodiment of the present disclosure includes:
determining a plurality of blocks in a current image by hierarchically splitting the current image based on a split shape mode of the current image; generating prediction blocks of the plurality of blocks by performing prediction on the plurality of blocks; encoding residual blocks of the plurality of blocks based on the prediction blocks of the plurality of blocks and original blocks;
generating reconstruction blocks for the plurality of blocks by using the prediction blocks of the plurality of blocks and the encoded residual blocks; and performing deblocking filtering on a boundary of at least one reconstruction block from among the reconstruction blocks,
wherein the performing of the deblocking filtering on the boundary of the at least one reconstruction block includes, when a prediction mode of at least one block from among blocks located on both sides of the boundary of the at least one reconstruction block is a combined inter-intra prediction mode, determining that a value of a boundary filtering strength applied to the boundary of the at least one reconstruction block is a predetermined value and performing deblocking filtering on the boundary of the at least one reconstruction block based on the determined value of the boundary filtering strength.

An image encoding apparatus according to an embodiment of the present disclosure includes at least one processor configured to determine a plurality of blocks in a current image by hierarchically splitting the current image based on a split shape mode of the current image, generate prediction blocks of the plurality of blocks by performing prediction on the plurality of blocks, encode residual blocks of the plurality of blocks based on the prediction blocks of the plurality of blocks and original blocks, generate reconstruction blocks for the plurality of blocks by using the prediction blocks of the plurality of blocks and the encoded residual blocks, and perform deblocking filtering on a boundary of at least one reconstruction block from among the reconstruction blocks,
wherein, when the at least one processor performs the deblocking filtering on the boundary of the at least one reconstruction block, when a prediction mode of at least one block from among blocks located on both sides of the boundary of the at least one reconstruction block is a combined inter-intra prediction mode, the at least one processor determines that a value of a boundary filtering strength applied to the at least one reconstruction block is a value and performs deblocking filtering on the boundary of the at least one reconstruction block based on the determined value of the boundary filtering strength.

An image decoding method according to an embodiment of the present disclosure includes:
determining a plurality of blocks in a current image by hierarchically splitting the current image based on available split shape modes of the plurality of blocks in the current image; generating prediction blocks of the plurality of blocks by performing prediction on the plurality of blocks; generating residual blocks of the plurality of blocks based on information about residuals of the plurality of blocks obtained from a bitstream, generating reconstruction blocks for the plurality of blocks by using the prediction blocks of the plurality of blocks and the residual blocks of the plurality of blocks; and reconstructing the current image by performing deblocking filtering on a boundary of at least one reconstruction block from among the reconstruction blocks based on a size or a shape of at least one block from among the plurality of blocks determined by the available split shape modes of the plurality of blocks in the current image.

An image encoding method according to an embodiment of the present disclosure includes: determining a plurality of blocks in a current image by hierarchically splitting the current image based on available split shape modes of the plurality of blocks in the current image; generating prediction blocks of the plurality of blocks by performing prediction on the plurality of blocks; encoding residual blocks of the plurality of blocks based on the prediction blocks of the plurality of blocks and original blocks; generating reconstruction blocks for the plurality of blocks by using the prediction blocks of the plurality of blocks and the encoded residual blocks; and performing deblocking filtering on a boundary of at least one reconstruction block from among the reconstruction blocks based on a size or a shape of at least one block from among the plurality of blocks determined based on the available split shape modes of the plurality of blocks in the current image.

A computer program for executing an image decoding method according to an embodiment of the present disclosure may be recorded on a computer-readable recording medium.

Mode of Disclosure

Advantages and features of disclosed embodiments and a method of achieving the advantages and features will be apparent by referring to embodiments described below in connection with the accompanying drawings. However, the present disclosure is not restricted by these embodiments but may be implemented in many different forms, and the present embodiments are provided to complete the present disclosure and to allow one of ordinary skill in the art to understand the scope of the disclosure.

Terms used in this specification will be briefly described, and the disclosed embodiments will be described in detail.

Although general terms being widely used were selected as terminology used in the disclosure while considering the functions in the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms "a," "an," and "the" include plural referents unless the context clearly dictates otherwise.

It will be understood that when a certain part "includes" a certain component, the part does not exclude another component but may further include another component, unless the context clearly dictates otherwise.

As used herein, the terms "portion" or "unit" refers to a software or hardware component that performs certain functions. However, the term "portion" or "unit" is not limited to software or hardware. The "portion" or "unit" may be configured in an addressable storage medium, or may be configured to run on at least one processor. Therefore, as an example, the "portion" or "unit" includes components such as software components, object-oriented software components, class components, and task components, processes, functions, attributes, procedures, sub-routines, segments of program codes, drivers, firmware, microcodes, circuits, data, databases, data structures, tables, arrays, and variables. Functions provided in the components and "portions" or "units" may be combined into a smaller number of components and "portions" and "units," or may be sub-divided into additional components and "portions" or "units".

In an embodiment of the present disclosure, the "portion" or "unit" may be implemented as a processor and a memory. The term "processor" should be interpreted in a broad sense to include a general-purpose processor, a central processing unit (CPU), a microprocessor, a digital signal processor (DSP), a controller, a microcontroller, a state machine, etc. In some embodiments, the "processor" may indicate an application-specific integrated circuit (ASIC), a programmable logic device (PLD), a field programmable gate array (FPGA), etc. The term "processor" may indicate a combination of processing devices, such as, for example, a combination of a DSP and a microprocessor, a combination of a plurality of microprocessors, a combination of one or more microprocessors coupled to a DSP core, or a combination of arbitrary other similar components.

The term "memory" should be interpreted in a broad sense to include an arbitrary electronic component capable of storing electronic information. The term "memory" may indicate various types of processor-readable media, such as random-access memory (RAM), read-only memory (ROM), non-volatile RAM (NVRAM), programmable ROM (PROM), erasable programmable ROM (EPROM), electrically erasable PROM (EEPROM), flash memory, a magnetic or optical data storage device, registers, etc. When a processor may read information from a memory and/or write information in the memory, the memory may be considered to electronically communicate with the processor. A memory integrated into a processor electronically communicates with the processor.

Hereinafter, an "image" may represent a static image such as a still image of video, or a moving image, that is, a dynamic image such as video itself.

Hereinafter, a "sample," which is data assigned to a sampling location of an image, means data that is to be processed. For example, pixel values in an image of a spatial region and transform coefficients on a transform region may be samples. A unit including at least one of such samples may be defined as a block.

Hereinafter, embodiments will be described in detail with reference to the accompanying drawings so that the present disclosure may be readily implemented by one of ordinary skill in the technical field to which the present disclosure pertains. Also, in the drawings, parts irrelevant to the description will be omitted for the simplicity of explanation.

An image encoding apparatus and an image decoding apparatus, and an image encoding method and an image decoding method according to various embodiments will be described in detail with reference to FIGS. 1A through 26. A method of determining a data unit of an image according to various embodiments will be described with reference to FIGS. 3 through 16, and an image encoding apparatus, an image decoding apparatus, an image encoding method, and an image decoding method for performing deblocking filtering on a boundary of a reconstruction block of a data unit (e.g., a coding unit, a prediction unit, or a transform unit) determined in any of various shapes according to various embodiments will be described with reference to FIGS. 1A through 1D, 2A through 2D, and 17A through 26.

Hereinafter, an encoding/decoding method and apparatus for encoding or decoding an image based on data units (e.g., coding units, prediction units, or transform units) of various shapes according to an embodiment will be described in detail with reference to FIGS. 1A through 2D.

FIG. 1A is a block diagram of an image decoding apparatus according to various embodiments.

An image decoding apparatus 100 according to various embodiments may include a deblocking filtering unit 105 and an image decoder 110. The deblocking filtering unit 105 and the image decoder 110 may include at least one processor. Also, the deblocking filtering unit 105 and the image decoder 110 may include a memory in which instructions to be executed by the at least one processor are stored. The image decoder 110 may be implemented as hardware separate from the deblocking filtering unit 105, or may include the deblocking filtering unit 105.

The image decoder 110 may determine a plurality of blocks in a current image by hierarchically splitting the current image based on a split shape mode of the current image. That is, the image decoder 110 may determine the plurality of blocks in the current image by hierarchically splitting the current image based on split shape modes of the blocks in the current image. In this case, each block may be a coding unit. However, the present disclosure is not limited thereto, and the block may be a transform unit or a prediction unit. The split shape mode may be a mode based on at least one of a split direction and a split type. The split type may indicate at least one of binary split, tri-split, and quad split.

The image decoder 110 may determine a plurality of blocks in a current image by hierarchically splitting the current image based on available split shape modes of the blocks in the current image. The image decoder 110 may determine at least one second block based on one split shape mode from among available split shape modes of a first block in the current image. For example, when the split shape mode indicates that the first block is not split, the second block may be the same as the first block. When the split shape mode indicates that the first block is split into a plurality of blocks, a plurality of second blocks may be determined from the first block. In this case, the available split shape modes may be split shape modes limited by considering deblocking filtering from among all split shape modes.

The image decoder 110 may generate prediction blocks of blocks by performing prediction on the blocks. For example, the image decoder 110 may generate a prediction block of at least one block by performing inter prediction on the at least one block. The image decoder 110 may generate a prediction block of at least one block by performing intra prediction on the at least one block. The image decoder 110 may generate a prediction block of at least one block by performing prediction based on a combined inter-intra prediction mode on the at least one block. For example, the combined inter-intra prediction mode may be a mode obtained by combining intra prediction with (merge index based) inter prediction. That is, a sample value of a prediction block generated based on the combined inter-intra prediction mode may be determined based on a weighted sum of a first sample value of a prediction block generated based on intra prediction and a second sample value of a prediction block generated based on (merge index based) inter prediction.

The image decoder 110 may generate a prediction block of at least one block by performing prediction on partitions of the at least one block. In this case, the partitions may be a plurality of units generated by splitting one block into various shapes, and may have any of various shapes such as a triangular shape or a quadrangular shape.

The image decoder 110 may generate residual blocks of blocks based on information about residuals obtained from a bitstream.

The image decoder 110 may generate reconstruction blocks for blocks by using prediction blocks of the blocks and residual blocks of the blocks. The image decoder 110 may generate a reconstruction block of at least one block by adding values of samples of a prediction block and values of samples of a residual block of the at least one block.

The deblocking filtering unit 105 may reconstruct a current image by performing deblocking filtering on a boundary of at least one reconstruction block from among reconstruction blocks. The boundary of the at least one reconstruction block is a boundary dividing two adjacent reconstruction blocks including the at least one reconstruction block, and the two adjacent reconstruction blocks may be vertically or horizontally divided by the boundary.

When a prediction mode of at least one reconstruction block from among reconstruction blocks located on both sides of a boundary of the at least one reconstruction block is a combined inter-intra prediction mode, the deblocking filtering unit 105 may determine that a value of a boundary filtering strength applied to the boundary of the at least one reconstruction block is a predetermined value.

The deblocking filtering unit 105 may perform deblocking filtering on the boundary of the at least one reconstruction block based on the determined value of the boundary filtering strength. The value of the boundary filtering strength may be calculated in units of, but not limited to, four rows or four columns, at the boundary, and may be determined to be one of, but not limited to, 0, 1, and 2.

That is, when filtering is performed on a vertical boundary of a reconstruction block in each 8×8 unit, a value of a boundary filtering strength may be determined in units of four rows. When filtering is performed on a vertical boundary and a block (which may be, but not limited to, a block having a size of 4×4 when a value of a boundary filtering strength is calculated in units of four rows or four columns) located on the left of the vertical boundary is a P block and a block located on the right of the vertical boundary is a Q block, the value of the boundary filtering strength may be determined as shown in FIG. 26.

FIG. 26 is a table showing a value of a boundary filtering strength Bs and conditions for determining the boundary filtering strength Bs, according to an embodiment.

In detail, when the P block or the Q block (i.e., at least one of the P block and the Q block) is encoded in an intra prediction mode, the value of the boundary filtering strength may be determined to be 2. That is, deblocking filtering may be performed by using a large boundary filtering value at a boundary of a block encoded in an intra prediction mode.

When the P block and the Q block are encoded in an inter prediction mode, the value of the boundary filtering strength may be determined to be 0 or 1. When discontinuity of pixel values does not occur in the P block and the Q block, the value of the boundary filtering strength may be determined to be 0, and specifically, otherwise, the value of the boundary filtering strength may be determined to be 1. A case where discontinuity of pixel values does not occur in the P block and the Q block may include a case where both the P block and the Q block are encoded in an inter prediction mode, and a case where a non-zero transform coefficient does not exist in both the P block and the Q block and the two blocks perform motion compensation at the same integer position. Accordingly, a case where discontinuity occurs may be branched into the following multiple conditions, and otherwise, it may be determined that discontinuity occurs.

Accordingly, when the P block and the Q block are encoded in an inter prediction mode and a non-zero transform coefficient value exists in the P block or the Q block, the value of the boundary filtering strength may be determined to be 1.

When the P block and the Q block are encoded in an inter prediction mode and a non-zero transform coefficient value exists in the P block or the Q block, the value of the boundary filtering strength may be determined to be 1.

When the P block and the Q block are encoded in an inter prediction mode and a non-zero transform coefficient does not exist in the P block and the Q block, but the P block and the Q block have different motion vectors in integer units, the value of the boundary filtering strength may be determined to be 1.

When the P block and the Q block are encoded in an inter prediction mode, a non-zero transform coefficient value does not exist in the P block and the Q block, and the P block and the Q block have the same motion vector in integer units, but the P block and the Q block perform motion compensation in different pictures or have a different number of motion vectors, the value of the boundary filtering strength may be determined to be 1.

In other cases, that is, when the P block and the Q block are encoded in an inter prediction mode and discontinuity does not occur in pixel values of the P block or the Q block, the value of the boundary filtering strength may be determined to be 0.

When a value of a boundary filtering strength is greater than 0, the deblocking filtering unit 105 may perform deblocking filtering. However, the deblocking filtering unit 105 does not always perform filtering only because a value is greater than 0, and may re-determine whether filtering is applied by comparing a d value (which may refer to the amount of change of pixel values in both regions based on a boundary) determined based on pixel values in a block (e.g., in the case of a horizontal boundary, based on pixel values located in a first column and a fourth column, and in the case of a vertical boundary, based on pixel values located in a first row and a fourth row) with a β value determined based on quantization parameters of the P block and the Q block. The d value and the β value may be the same as d and β values related to deblocking filtering defined in the High Efficiency Video Coding (HEVC) standard.

The deblocking filtering unit 105 may determine whether to apply strong filtering or weak filtering to a boundary of a block. For example, in the case of a vertical boundary, the deblocking filtering unit 105 may determine a strength of filtering by using pixel values of a first row and a fourth row, a β value, and a tc value determined based on a value of a boundary filtering strength. That is, the deblocking filtering unit 105 may determine whether the amount of change of pixel values in the P block and the Q block is small but discontinuity occurs at a boundary by using pixel values of a first row and a fourth row, a β value, and a tc value, and may determine a strength of filtering based on a determination result. The tc value that is determined based on a value of a boundary filtering strength may be the same as a tc value related to deblocking filtering defined in the HEVC standard.

In the case of a vertical boundary, the deblocking filtering unit 105 may perform deblocking filtering in units of rows. When the deblocking filtering unit 105 performs strong filtering on a vertical boundary, the deblocking filtering unit 105 may perform filtering based on pixel values of each row and a tc value in units of 3 pixels of the P block and 3 pixels of the Q block that are adjacent to a boundary of each row. Pixels whose pixel values are changed by performing strong filtering may be 3 pixels of the P block and 3 pixels of the Q block that are adjacent to a boundary of each row, whereas pixels referenced to perform strong filtering may be 4 pixels of the P block and 4 pixels of the Q block that are adjacent to a boundary of each row. That is, the number of pixels referenced to perform filtering and the number of pixels whose pixel values are changed may be different from each other, and preferably, the number of pixels referenced to perform filtering may be equal to or greater than the number of pixels whose pixel values are changed. In particular, pixel values in the P block may be changed by performing filtering by referencing the pixel values in the P block and pixel values in the Q block, and pixel values in the Q block may be changed by performing filtering by referencing pixel values in the P block and the pixel values in the Q block.

When the deblocking filtering unit 105 performs weak filtering on a vertical boundary, the deblocking filtering unit 105 may perform filtering based on a tc value in units of 2 pixels of the P block and 2 pixels of the Q block that are adjacent to a boundary of each row. Pixels whose pixel values are changed by performing filtering may be 2 pixels of the P block and 2 pixels of the Q block that are adjacent to a boundary of each row, whereas pixels referenced to perform filtering may be 4 pixels of the P block and 4 pixels of the Q block that are adjacent to a boundary of each row. That is, the number of pixels referenced to perform filtering and the number of pixels whose pixel values are changed may be different from each other, and preferably, the number of pixels referenced to perform filtering may be equal to or greater than the number of pixels whose pixel values are changed. The term 'referenced pixel' refers to a pixel used to determine conditions for determining whether filtering is performed on a pixel or to change a pixel value by performing filtering.

Accordingly, when filtering (including strong filtering and weak filtering) is performed on a boundary of a reconstruction block in each 8×8 unit, the deblocking filtering unit 105 may reference up to 4 pixels on either side of the boundary, and values of up to 3 pixels on either side of the boundary may be changed.

However, it will be easily understood by one of ordinary skill in the art that the number of referenced pixels and the number of pixels whose pixel values are changed are not limited thereto and may be any of various numbers.

When a prediction mode of one block from among blocks located on both sides of a boundary of at least one reconstruction block is a combined inter-intra prediction mode, the deblocking filtering unit 105 may determine that a value of a boundary filtering strength is a predetermined value that is 1 or 2.

A predetermined value may be a value that is the same as a value of a boundary filtering strength used when a prediction mode of one block from among blocks located on both sides of a boundary of at least one reconstruction block is an intra prediction mode.

For example, a value of a boundary filtering strength used when a prediction mode of one block from among blocks located on both sides of a boundary of at least one reconstruction block is an intra prediction mode may be 2, and thus a value of a boundary filtering strength used when a prediction mode of one block from among blocks located on both sides of a boundary of at least one reconstruction block is a combined inter-intra prediction mode may also be 2.

However, a value of a boundary filtering strength used when a prediction mode of one block from among blocks located on both sides of a boundary of at least one reconstruction block is an intra prediction mode may be a value other than 2, and in this case, a value of a boundary filtering strength used when a prediction mode of one block from among blocks located on both sides of a boundary of at least one reconstruction block is a combined inter-intra prediction mode may be accordingly determined to be a value other than 2.

A predetermined value may be a value that is the same as a value of a boundary filtering strength used when prediction modes of blocks located on both sides of a boundary of at least one reconstruction block are all inter prediction modes. For example, a value of a boundary filtering strength used when prediction modes of blocks located on both sides of a boundary of at least one reconstruction block are inter prediction modes may be 0 or 1, and thus a value of a boundary filtering strength used when a prediction mode of one block from among blocks located on both sides of a boundary of at least one reconstruction block is a combined inter-intra prediction mode may also be 0 or 1.

However, a value of a boundary filtering strength used when a prediction mode of one block from among blocks located on both sides of a boundary of at least one reconstruction block is an intra prediction mode may be a value other than 0 or 1, and in this case, a value of a boundary filtering strength used when a prediction mode of one block from among blocks located on both sides of a boundary of at least one reconstruction block is a combined inter-intra prediction mode may also be accordingly determined to be a value other than 0 or 1.

When a size of at least one block from among blocks located on both sides of a boundary of at least one reconstruction block is equal to or greater than a predetermined size and a prediction mode of the at least one block is a combined inter-intra prediction mode, the deblocking filtering unit 105 may determine that a value of a boundary filtering strength applied to the boundary of the at least one reconstruction block is a predetermined value (e.g., 1 or 2).

Alternatively, when a size of at least one block from among blocks located on both sides of a boundary of at least one reconstruction block is equal to or less than a predetermined size and a prediction mode of the at least one block is a combined inter-intra prediction mode, the deblocking filtering unit 105 may determine that a value of a boundary filtering strength applied to the boundary of the at least one reconstruction block is a predetermined value (e.g., 1 or 2).

The deblocking filtering unit 105 may perform deblocking filtering based on a unit of a predetermined size. When a boundary of at least one reconstruction block is located at a boundary of the unit of the predetermined size, the deblocking filtering unit 105 may perform deblocking filtering on the boundary of the at least one reconstruction block. For example, the predetermined size may be N×N (N may be an integer or 2 to the power of n, and in this case, n may be an integer), and may be 4×4 or 8×8.

The image decoder 110 may limit available split shape modes of a first block based on a size or a shape of a plurality of blocks split from the first block based on the available split shape modes of the first block, and may determine the plurality of blocks based on the limited split shape modes. The deblocking filtering unit 105 may perform deblocking filtering on a boundary of a reconstruction block of at least one block from among the plurality of blocks based on a unit of a predetermined size. That is, when a height or a width of one of the plurality of blocks split from the first block based on the available split shape modes of the first block is not a multiple of a height or a width indicated by the predetermined size and is a multiple of a smaller height or width, the split shape modes may be limited.

For example, when a predetermined size is 8×8, a height or a width indicated by the predetermined size may be 8, and a split shape mode of a first block having a size of 16×16 is a mode based on tri-split, a size of one of a plurality of blocks split from the first block may be 8×4. In this case, because one of a height and a width is 4 that is not a multiple of 8 and is a multiple of a value smaller than 8, the mode based on the tri-split for the first block may be limited.

Alternatively, for example, when a height or a width indicated by a predetermined size is 8 and a split shape mode of a first block having a size of 8×16 or 8×8 is a mode based on binary split, a size of a plurality of blocks split from the first block may be 4×16 or 4×8.

In this case, because one of a height and a width is 4 that is not a multiple of 8 and a multiple of a value smaller than 8, the mode based on the binary split for the first block may be limited.

Accordingly, in this case, when the deblocking filtering unit 105 performs deblocking filtering based on 8×8 that is a predetermined size, the deblocking filtering unit 105 may perform deblocking filtering on a boundary of at least one block from among split blocks whose height and width are not a multiple of 4 but a multiple of 8.

When the deblocking filtering unit 105 performs deblocking filtering in units of rows or columns based on a unit of a predetermined size, the deblocking unit 105 may determine the number of pixels (i.e., the number of pixels whose pixel values are changed by deblocking filtering) to which deblocking filtering is applied and the number of pixels referenced for deblocking filtering based on sizes of two blocks located on both sides of a boundary of a block to which deblocking filtering is to be applied.

When the deblocking filtering unit 105 performs deblocking filtering in units of rows or columns based on a unit having a size of 4×4, and a height or a width of one of two blocks located on both sides of a boundary of a block to which deblocking filtering is to be applied is 4, the deblocking filtering unit 105 may determine that the number of pixels to which deblocking filtering is applied in each of the two blocks located on both sides is equal to or less than 2 (including 0) and the maximum number of pixels referenced for deblocking filtering in each of the two blocks located on both sides is equal to or less than 3 (e.g., 2 or 1). For example, when a size of at least one block from among blocks located on both sides of a boundary of a block to which deblocking filtering is to be applied in units of rows or columns at a vertical block boundary or a horizontal block boundary is 4×N or N×4 (where N is an integer equal to or greater than 4), the deblocking filtering unit 105 may determine that the number of pixels to which deblocking filtering is applied in each of the two blocks located on both sides is 1 and the maximum number of pixels referenced for deblocking filtering in each of the two blocks located on both sides is 3.

When the deblocking filtering unit 105 performs deblocking filtering in units of rows or columns based on a unit having a size of 4×4, and a height or a width of one block (first block) from among two blocks located on both sides of a boundary of a block to which deblocking filtering is to be applied is 4 and a height or a width of the other block (second block) is 8, the deblocking filtering unit 105 may determine that the maximum number of pixels referenced for deblocking filtering located in the first block is 2, the number of pixels to which deblocking filtering is applied is 1, the maximum number of pixels referenced for deblocking filtering located in the second block is 4, and the number of pixels to which deblocking filtering is applied is 3.

Alternatively, the deblocking filtering unit 105 may determine that the maximum number of pixels referenced for deblocking filtering located in the first block is 2 and the number of pixels to which deblocking filtering is applied is 1, and may determine that the maximum number of pixels referenced for deblocking filtering located in the second block is 2 and the number of pixels to which deblocking filtering is applied is 0.

The deblocking filtering unit 105 may perform deblocking filtering at a boundary of a reconstruction block regardless of a unit of a predetermined size. That is, the deblocking filtering unit 105 may perform deblocking filtering at the boundary of the reconstruction block even when a boundary of the unit of the predetermined size is not matched to the boundary of the reconstruction block. The reconstruction block may be one of a coding unit, a transform unit, and a prediction unit.

When residual information is not included in blocks located on both sides of a boundary of a reconstruction block, the deblocking filtering unit 105 may determine whether deblocking filtering is performed by using information about both blocks.

For example, when motion vectors of blocks on both sides of a boundary portion of a reconstruction block are different from each other, the deblocking filtering unit 105 may determine that deblocking filtering is performed.

When a mode of at least one block from among blocks located on both sides of a boundary of a reconstruction block is a specific mode, the deblocking filtering unit 105 may determine that deblocking filtering is performed. In this case, the specific mode may be an affine model based motion compensation mode or a sub-block prediction mode. The affine model based motion compensation mode refers to a mode in which motion compensation is performed by using a motion model based on one of various affine motion models such as a 4-parameter affine motion model or a 6-parameter affine motion model for motion compensation. When intra prediction modes of blocks located on both sides of a boundary of a reconstruction block are different from each other, the deblocking filtering unit 105 may determine that deblocking filtering is performed. When illumination compensation parameters of blocks located on both sides of a boundary of a reconstruction block are different from each other, the deblocking filtering unit 105 may determine that deblocking filtering is performed. The sub-block prediction mode may refer to a mode in which prediction is performed based on a sub-block. The sub-block prediction mode may include a sub-block based temporal merge mode or an affine model based motion compensation mode.

When prediction modes of blocks located on both sides of a boundary of a reconstruction block are different from each other, the deblocking filtering unit 105 may determine that deblocking filtering is performed.

For example, when prediction modes of blocks located on both sides of a boundary of a reconstruction block are an intra mode and an inter mode, a combined inter-intra prediction mode and an inter mode, or a combined inter-intra prediction mode and an intra mode, the deblocking filtering unit 105 may determine that deblocking filtering is performed.

When one of blocks located on both sides of a boundary of a reconstruction block has a triangular partition shape, the deblocking filtering unit 105 may determine whether deblocking filtering is performed in consideration of residuals of both blocks. The deblocking filtering unit 105 may determine whether deblocking filtering is performed in consideration of sizes of heights and widths of both blocks and maximum values and minimum values of the two values.

When blocks located on both sides have all triangular partition shapes, and a height or a width of at least one block from among both blocks is equal to or greater than or equal to or less than a specific size, the deblocking filtering unit 105 may perform deblocking filtering on a boundary between triangular partitions.

When a block has a triangular partition shape, the image decoder 110 may perform bidirectional inter prediction on triangular partitions. In this case, the image decoder 110 may variously determine weights of reference triangular partitions included in two reference blocks of both directions. For example, a weight of a first reference triangular partition of a first reference block may be 0, a weight of a second reference triangular partition of the first reference block may be 1, a weight of a first reference triangular partition of a second reference block may be 1, and a weight of a second reference triangular partition of the second reference block may be 0. Alternatively, a weight of a first reference triangular partition of a first reference block may be ¼, a weight of a second reference triangular partition of the first reference block may be ¾, a weight of a first reference triangular partition of a second reference block may be ¾, and a weight of a second reference triangular partition of the second reference block may be ¼. A weight of each reference triangular partition may be, but not limited to, a predetermined value, and the image decoder 110 may obtain a weight of each reference triangular partition from information about weights included in a bitstream. In this case, a weight of a triangular partition may be determined to be one weight from among one or more weight candidates. In this case, index information indicating one of the one or more weight candidates may be obtained from the bitstream. The weight candidates may be determined for each block, but the present disclosure is not limited thereto. The weight candidates may be determined for each reference block or for each reference triangular partition.

However, a block is not limited to having a triangular partition shape, and may have a partition mask shape including partitions having various shapes such as a quadrangular shape. In this case, a shape of a partition mask of a block may be determined to be one of one or more partition mask shape candidates. In this case, index information indicating one of the one or more mask shape candidates may be obtained from the bitstream.

Figure 1B:
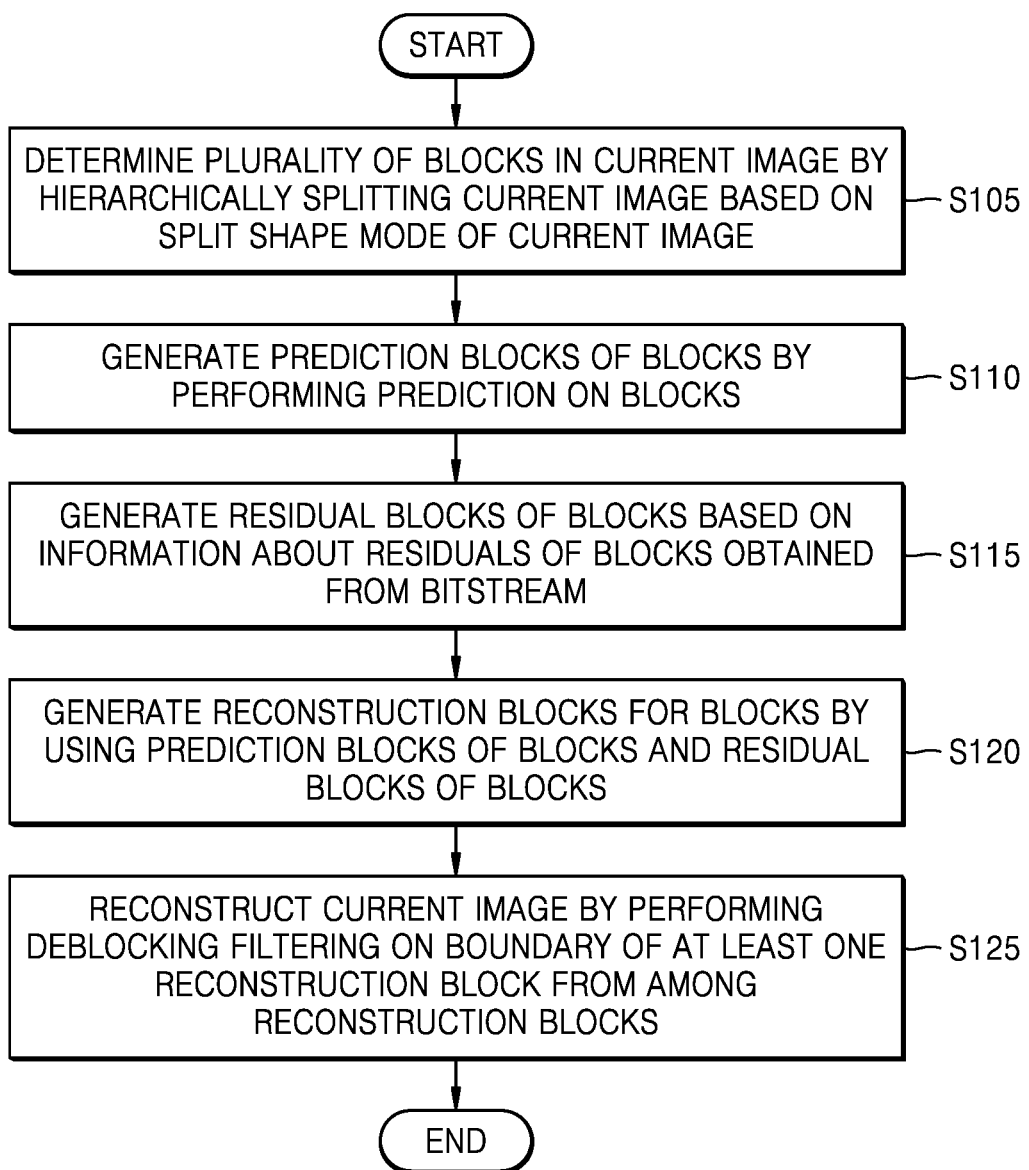
FIG. 1B is a flowchart of an image decoding method according to various embodiments.

FIG. 1B is a flowchart of an image decoding method according to various embodiments.

In operation S105, the image decoding apparatus 100 may determine a plurality of blocks in a current image by hierarchically splitting the current image based on a split shape mode of the current image.

In operation S110, the image decoding apparatus 100 may generate prediction blocks of the blocks by performing prediction on the blocks.

In operation S115, the image decoding apparatus 100 may generate residual blocks of the blocks based on information about residuals obtained from a bitstream.

In operation S120, the image decoding apparatus 100 may generate reconstruction blocks for the blocks by using the prediction blocks of the blocks and the residual blocks of the blocks.

In operation S125, the image decoding apparatus 100 may reconstruct the current image by performing deblocking filtering on a boundary of at least one block from among the reconstruction blocks. In this case, when a prediction mode of at least one reconstruction block from among blocks located on both sides of a boundary of the at least one reconstruction block is a combined inter-intra prediction mode, the image decoding apparatus 100 may determine that a value of a boundary filtering strength applied to the boundary of the at least one reconstruction block is a predetermined value, and may perform deblocking filtering on the boundary of the at least one reconstruction block based on the value of the boundary filtering strength.

Figure 1C:
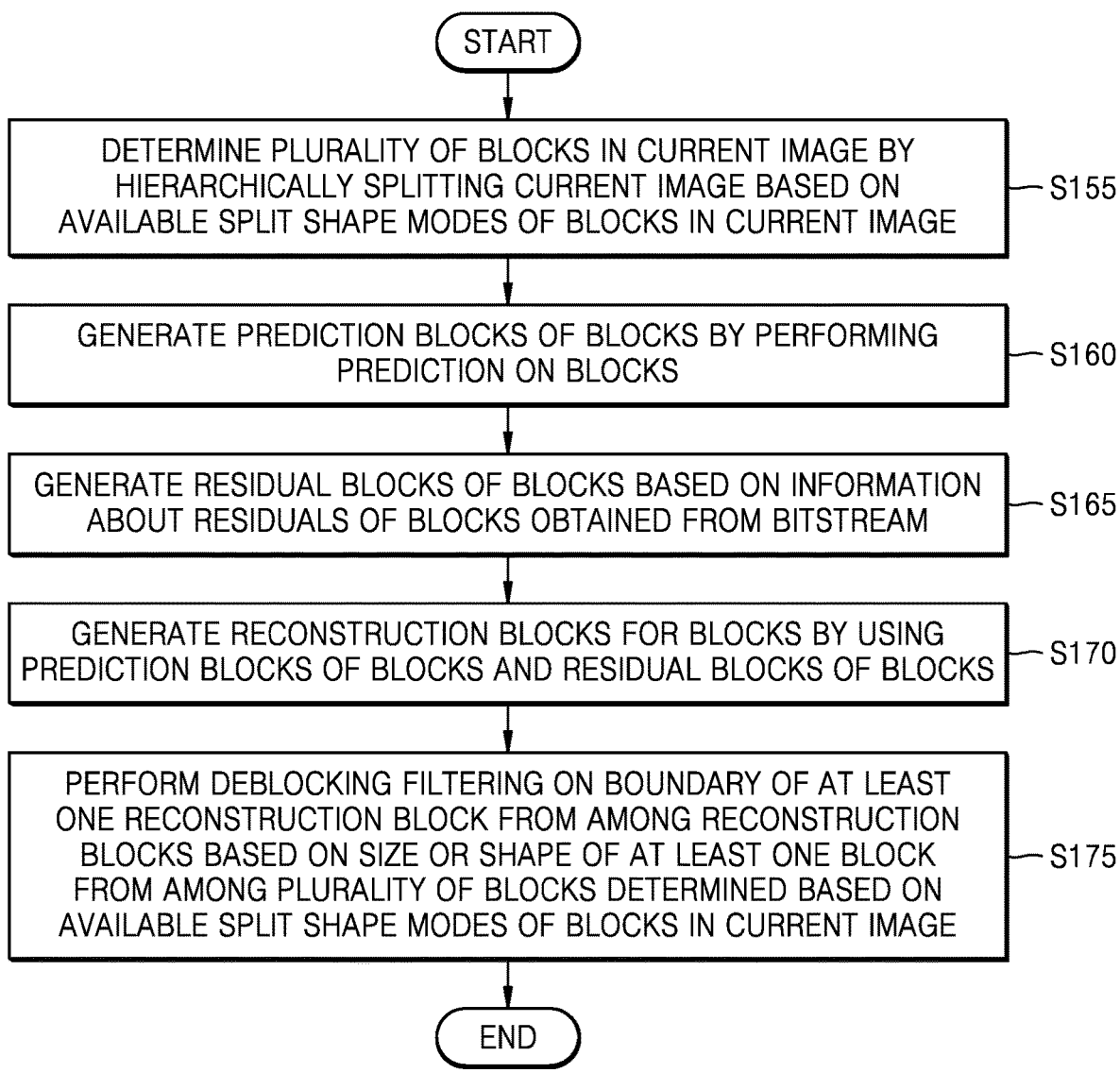
FIG. 1C is a flowchart of an image decoding method according to various embodiments.

FIG. 1C is a flowchart of an image decoding method according to various embodiments.

In operation S155, the image decoding apparatus 100 may determine a plurality of blocks in a current image by hierarchically splitting the current image based on available split shape modes of the blocks in the current image.

In operation S160, the image decoding apparatus 100 may generate prediction blocks of the blocks by performing prediction on the plurality of blocks.

In operation S165, the image decoding apparatus 100 may generate residual blocks of the blocks based on information about residuals obtained from a bitstream.

In operation S170, the image decoding apparatus 100 may generate reconstruction blocks for the blocks by using the prediction blocks of the blocks and the residual blocks of the blocks.

In operation S175, the image decoding apparatus may 100 may perform deblocking filtering on a boundary of at least one block from among the reconstruction blocks based on a size or shape of at least one block from among the plurality of blocks determined based on the available split shape modes of the blocks in the current image.

For example, the image decoding apparatus 100 may generate a plurality of blocks split from a current block based on one of available split shape modes of the current block, and when one of a height and a width of one block from among the plurality of blocks is not a multiple of a height or a width indicated by a predetermined size, the image decoding apparatus 100 may not allow the available split shape mode and may determine the plurality of blocks from the current block based on another available split shape mode. The image decoding apparatus 100 may perform deblocking filtering based on a unit of a predetermined size on a boundary of at least one reconstruction block from among reconstruction blocks of the plurality of blocks determined based on limited split shape modes.

Alternatively, when at least one reconstruction block from among reconstruction blocks of a plurality of blocks determined based on available split shape modes has a triangular partition shape, the image decoding apparatus 100 may perform deblocking filtering on a boundary of the at least one reconstruction block or a boundary between triangular partitions based on a height or a width of the at least one reconstruction block or based on residual information located on both sides of the boundary.

Figure 1D:
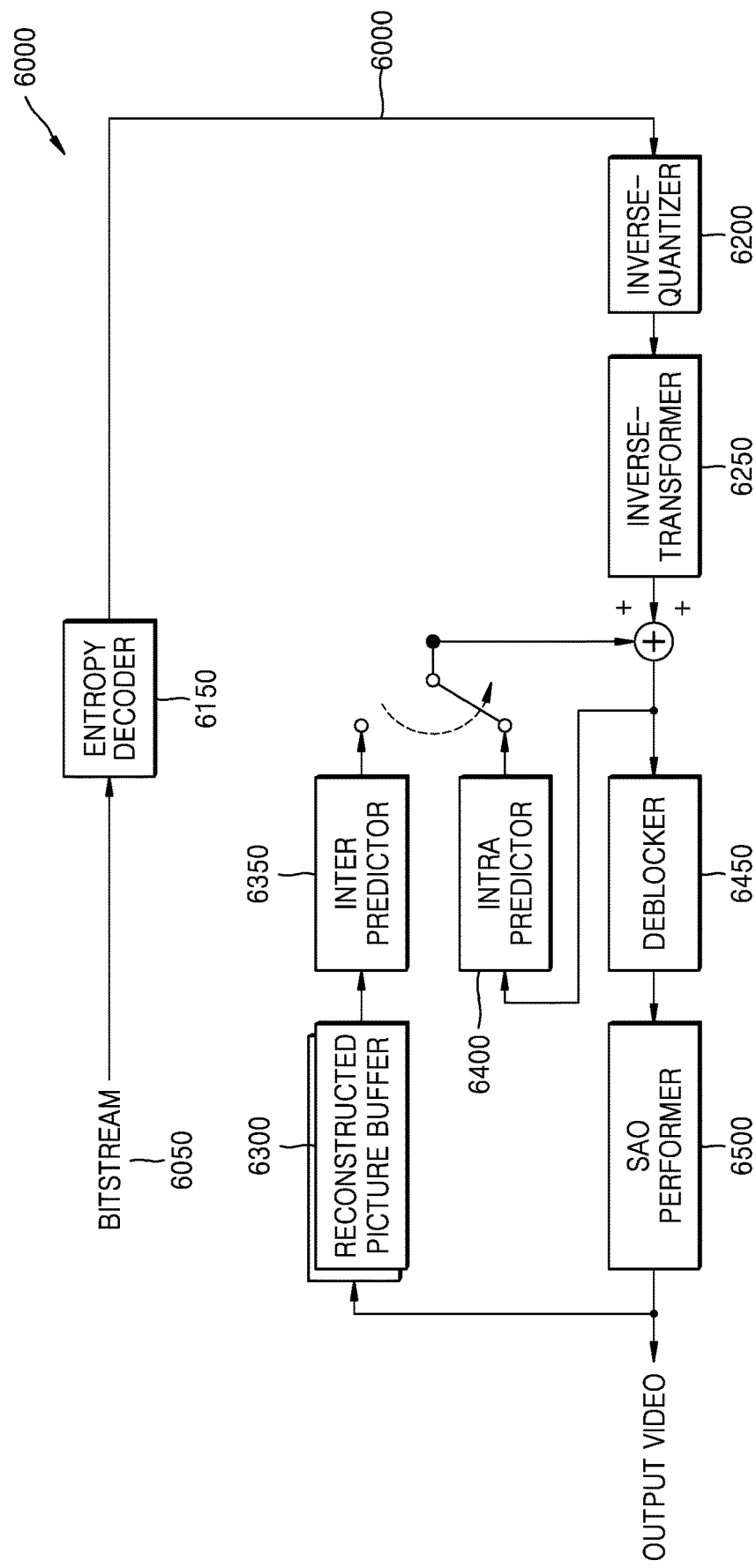
FIG. 1D is a block diagram of an image decoder according to various embodiments.

FIG. 1D is a block diagram of an image decoder 6000 according to various embodiments.

The image decoder 6000 according to various embodiments performs tasks that are performed by the image decoder 110 of the image decoding apparatus 100 to encode image data.

Referring to FIG. 1D, an entropy decoder 6150 parses encoding information needed for decoding and encoded image data to be decoded from a bitstream 6050. The encoded image data is a quantized transform coefficient, and an inverse-quantizer 6200 and an inverse-transformer 6250 reconstruct residue data from the quantized transform coefficient.

An intra predictor 6400 performs intra prediction for each block. An inter predictor 6350 performs inter prediction by using a reference image obtained from a reconstructed picture buffer 6300 for each block. Prediction data for each block generated by the intra predictor 6400 or the inter predictor 6350 may be added to the residue data to reconstruct data of a spatial domain for a block of a current image included in the bitstream 6050, and a deblocker 6450 and a sample adaptive offset (SAO) performer 6500 may output a filtered reconstruction image 6600 by performing loop filtering on the reconstructed data of the spatial domain. Also, reconstruction images stored in the reconstructed picture buffer 6300 may be output as reference images. The deblocking filtering unit 105 may include the deblocker 6450 of the decoder 6000.

In order for the image decoding apparatus 100 to decode image data, tasks of the image decoder 6000 according to various embodiments may be performed according to blocks.

Figure 2A:
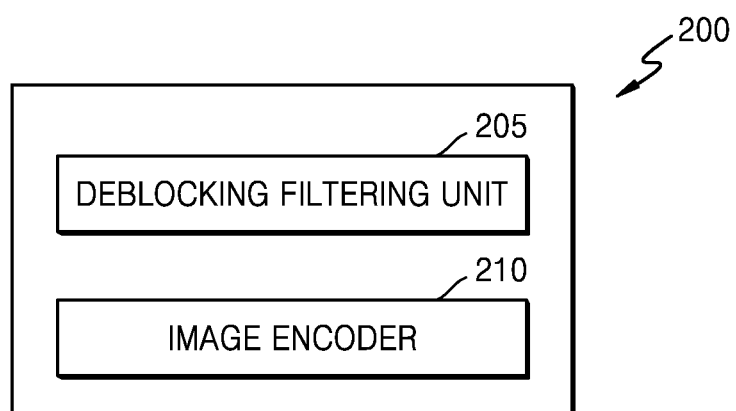
FIG. 2A is a block diagram of an image encoding apparatus according to various embodiments.

FIG. 2A is a block diagram of an image encoding apparatus according to various embodiments.

An image encoding apparatus 200 according to various embodiments may include a deblocking filtering unit 205 and an image encoder 210.

The deblocking filtering unit 205 and the image encoder 210 may include at least one processor. Also, the deblocking filtering unit 205 and the image encoder 210 may include a memory in which instructions to be executed by the at least one processor are stored. The image encoder 210 may be implemented as hardware separate from the deblocking filtering unit 205, or may include the deblocking filtering unit 205.

The image encoder 210 may determine a plurality of blocks in a current image by hierarchically splitting the current image based on a split shape mode of the current image. That is, the image encoder 210 may determine the plurality of blocks in the current image by hierarchically splitting the current image based on split shape modes of the blocks in the current image. In this case, each block may be a coding unit. However, the present disclosure is not limited thereto, and the block may be a transform unit or a prediction unit. The split shape mode may be a mode based on at least one of a split direction and a split type. The split type may indicate at least one of binary split, tri-split, and quad split.

The image encoder 210 may determine a plurality of blocks in a current image by hierarchically splitting the current image based on available split shape modes of the blocks in the current image. The image encoder 210 may determine at least one second block based on one split shape mode from among available split shape modes of a first block in the current image. For example, when the split shape mode indicates that the first block is not split, the second block may be the same as the first block. When the split shape mode indicates that the first block is split into a plurality of blocks, a plurality of second blocks may be determined. In this case, the available split shape modes may be split shape mode limited by considering deblocking filtering from among all split shape modes.

The image encoder 210 may generate prediction blocks of blocks by performing prediction on the blocks. The image encoder 210 may generate a prediction block of at least one block by performing inter prediction on the at least one block. The image encoder 210 may generate a prediction block of at least one block by performing intra prediction on the at least one block. The image encoder 210 may generate a prediction block of at least one block by performing prediction based on a combined inter-intra prediction mode on the at least one block. The image encoder 210 may generate a prediction block of at least one block by performing prediction on partitions of the at least one block. In this case, the partitions may be a plurality of units generated by splitting one block into various shapes, and may have any of various shapes such as a triangular shape or a quadrangular shape.

The image encoder 210 may encode residual blocks of blocks based on prediction blocks of the blocks and original blocks.

The image encoder 210 may generate reconstruction blocks for blocks by using prediction blocks of the blocks and residual blocks of the blocks. The image encoder 210 may generate values of samples of a reconstruction block of at least one block by adding values of samples of a prediction block of at least one block and values of samples of a residual block of the at least one block.

The deblocking filtering unit 205 may reconstruct a current image by performing deblocking filtering on a boundary of at least one reconstruction block from among reconstruction blocks. The boundary of the at least one reconstruction block is a boundary dividing two adjacent reconstruction blocks including the at least one reconstruction block, and the two adjacent reconstruction blocks may be vertically or horizontally divided by the boundary.

When a prediction mode of at least one reconstruction block from among reconstruction blocks located on both sides of a boundary of the at least one reconstruction block is a combined inter-intra prediction mode, the deblocking filtering unit 205 may determine that a value of a boundary filtering strength applied to the boundary of the at least one reconstruction block is a predetermined value. The deblocking filtering unit 205 may perform deblocking filtering on the boundary of the at least one reconstruction block based on the value of the boundary filtering strength. In detail, when a P block or a Q block is encoded in an intra prediction mode, a value of a boundary filtering strength may be determined to be 2. That is, deblocking filtering may be performed by using a large boundary filtering value at a boundary of a block encoded in an intra prediction mode. When a value of a boundary filtering strength is greater than 0, the deblocking filtering unit 205 may perform filtering. However, the deblocking filtering unit 205 does not always perform filtering only because a value is greater than 0, and may re-determine whether filtering is applied by comparing a d value (which may refer to the amount of change of pixel values in both regions based on a boundary) determined based on pixel values in a block (e.g., in the case of a horizontal boundary, based on pixel values located in a first column and a fourth column) with a p value determined based on quantization parameters of the P block and the Q block. The d value and the β value may be the same as d and β values related to deblocking filtering defined in the High Efficiency Video Coding (HEVC) standard.

The deblocking filtering unit 205 may determine whether to apply strong filtering or weak filtering to a boundary of a block. For example, in the case of a vertical boundary, the deblocking filtering unit 205 may determine a strength of filtering by using pixel values of a first row and a fourth row, a β value, and a tc value. That is, the deblocking filtering unit 205 may determine whether the amount of change of pixel values in the P block and the Q block is small but discontinuity occurs at a boundary by using pixel values of a first row and a fourth row, a β value, and a tc value, and may determine a strength of filtering based on a determination result. The tc value may be the same as a tc value related to deblocking filtering defined in the HEVC standard.

In the case of a vertical boundary, the deblocking filtering unit 205 may perform deblocking filtering in units of rows. When the deblocking filtering unit 205 performs strong filtering on a vertical boundary, the deblocking filtering unit 205 may performing filtering based on pixel values of each row and a tc value in units of 3 pixels of the P block and 3 pixels of the Q block that are adjacent to a boundary of each row. Pixels whose pixel values are changed by performing filtering may be 3 pixels of the P block and 3 pixels of the Q block that are adjacent to a boundary of each row, whereas pixels referenced to perform filtering may be 4 pixels of the P block and 4 pixels of the Q block that are adjacent to a boundary of each row. That is, the number of pixels referenced to perform filtering and the number of pixels whose pixel values are changed may be different from each other, and preferably, the number of pixels referenced to perform filtering may be equal to or greater than the number of pixels whose pixel values are changed. In particular, pixel values in the P block may be changed by performing filtering by referencing the pixel values in the P block and pixel values in the Q block, and pixel values in the Q block may be changed by performing filtering by referencing pixel values in the P block and the pixel values in the Q block.

When the deblocking filtering unit 205 performs filtering on a vertical boundary, the deblocking filtering unit 205 may perform filtering based on a tc value in units of 2 pixels of the P block and 2 pixels of the Q block that are adjacent to a boundary of each row. Pixels whose pixel values are changed by performing filtering may be 2 pixels of the P block and 2 pixels of the Q block that are adjacent to a boundary of each row, whereas pixels referenced to perform filtering may be 4 pixels of the P block and 4 pixels of the Q block that are adjacent to a boundary of each row. That is, the number of pixels referenced to perform filtering and the number of pixels whose pixel values are changed may be different from each other, and preferably, the number of pixels referenced to perform filtering may be equal to or greater than the number of pixels whose pixel values are changed. The term 'referenced pixel' refers to a pixel used to determine conditions for determining whether filtering is performed on a pixel or to change a pixel value by performing filtering.

Accordingly, when filtering is performed in each 8×8 unit, the deblocking filtering unit 205 may reference up to 4 pixels on either side of a boundary, and values of up to 3 pixels on either side of the boundary may be changed. However, it will be easily understood by one of ordinary skill in the art that the number of referenced pixels and the number of pixels whose pixel values are changed are not limited thereto and may be any of various numbers.

When a prediction mode of one block from among blocks located on both sides of a boundary of at least one reconstruction block is a combined inter-intra prediction mode, the deblocking filtering unit 205 may determine that a value of a boundary filtering strength is a predetermined value that is 1 or 2. A predetermined value may be a value that is the same as a value of a boundary filtering strength used when a prediction mode of one block from among blocks located on both sides of a boundary of at least one reconstruction block is an intra prediction mode.

For example, a value of a boundary filtering strength used when a prediction mode of one block from among blocks located on both sides of a boundary of at least one reconstruction block is an intra prediction mode may be 2, and thus a value of a boundary filtering strength used when a prediction mode of one block from among blocks located on both sides of a boundary of at least one reconstruction block is a combined inter-intra prediction mode may also be 2. However, a value of a boundary filtering strength used when a prediction mode of one block from among blocks located on both sides of a boundary of at least one reconstruction block is an intra prediction mode may be a value other than 2, and in this case, a value of a boundary filtering strength used when a prediction mode of one block from among blocks located on both sides of a boundary of at least one reconstruction block is a combined inter-intra prediction mode may be accordingly determined to be a value other than 2.

A predetermined value may be a value that is the same as a value of a boundary filtering strength used when prediction modes of blocks located on both sides of a boundary of at least one reconstruction block are all inter prediction modes. For example, a value of a boundary filtering strength used when prediction modes of blocks located on both sides of a boundary of at least one reconstruction block are inter prediction modes may be 0 or 1, and thus a value of a boundary filtering strength used when a prediction mode of one block from among blocks located on both sides of a boundary of at least one reconstruction block is a combined inter-intra prediction mode may also be 0 or 1. However, a value of a boundary filtering strength used when a prediction mode of one block from among blocks located on both sides of a boundary of at least one reconstruction block is an intra prediction mode may be a value other than 0 or 1, and in this case, a value of a boundary filtering strength used when a prediction mode of one block from among blocks located on both sides of a boundary of at least one reconstruction block is a combined inter-intra prediction mode may also be accordingly determined to be a value other than 0 or 1.

When a size of at least one block from among blocks located on both sides of a boundary of at least one reconstruction block is equal to or greater than a predetermined size and a prediction mode of the at least one block is a combined inter-intra prediction mode, the deblocking filtering unit 205 may determine that a value of a boundary filtering strength applied to the boundary of the at least one reconstruction block is a predetermined value.

Alternatively, when a size of at least one block from among the blocks located on both sides of a boundary of at least one reconstruction block is equal to or less than a predetermined size and a prediction mode of the at least one block is a combined inter-intra prediction mode, the deblocking filtering unit 205 may determine that a value of a boundary filtering strength applied to the boundary of the at least one reconstruction block is a predetermined value.

Alternatively, when a size of at least one block from among the blocks located on both sides of the boundary of the at least one reconstruction block is equal to or greater than a predetermined size and a prediction mode of at least one block is a combined inter-intra prediction mode, the deblocking filtering unit 205 may determine that a value of a boundary filtering strength applied to the boundary of the at least one reconstruction block is a predetermined value.

The deblocking filtering unit 205 may perform deblocking filtering based on a unit of a predetermined size. When a boundary of at least one reconstruction block is located at a boundary of the unit of the predetermined size, the deblocking filtering unit 205 may perform deblocking filtering on the boundary of the at least one reconstruction block. For example, the predetermined size may be N×N (N may be an integer or 2 to the power of n, and in this case, n may be an integer), and may be 4×4 or 8×8.

The image encoder 210 may limit available split shape modes of a first block based on a size or a shape of a plurality of blocks split from the first block based on the available split shape modes of the first block, may determine the plurality of blocks based on the limited split shape modes, and may perform deblocking filtering on a boundary of a reconstruction block of at least one block from among the plurality of blocks based on a unit of a predetermined size. That is, when a height or a width of one of the plurality of blocks split from the first block based on the available split shape modes of the first block is not a multiple of a height or a width indicated by the predetermined size and is a multiple of a smaller height or width, the split shape modes may be limited.

Accordingly, in this case, when the deblocking filtering unit 205 performs deblocking filtering based on 8×8 that is a predetermined size, the deblocking filtering unit 205 may perform deblocking filtering on a boundary of at least one block from among split blocks whose height and width are not a multiple of 4 but a multiple of 8.

When the deblocking filtering unit 205 performs deblocking filtering based on a unit of a predetermined size, the deblocking unit 205 may determine the number of pixels to which deblocking filtering is applied and the number of pixels referenced for deblocking filtering based on sizes of two blocks located on both sides of a boundary of a block to which deblocking filtering is to be applied.

When the deblocking filtering unit 205 performs deblocking filtering in units of rows or columns based on a unit having a size of 4×4, and a height or a width of one of two blocks located on both sides of a boundary of a block to which deblocking filtering is to be applied is 4, the deblocking filtering unit 205 may determine that the number of pixels to which deblocking filtering is applied in each of the two blocks located on both sides is equal to or less than 2 (including 0) and the maximum number of pixels referenced for deblocking filtering in each of the two blocks located on both sides is equal to or less than 3 (e.g., 2 or 1). For example, when a size of at least one block from among blocks located on both sides of a boundary of a block to which deblocking filtering is to be applied in units of rows or columns at a vertical block boundary or a horizontal block boundary is 4×N or N×4 (where N is an integer equal to or greater than 4), the deblocking filtering unit 205 may determine that the number of pixels to which deblocking filtering is applied in each of the two blocks located on both sides is 1 and the maximum number of pixels referenced for deblocking filtering in each of the two blocks located on both sides is 3.

When the deblocking filtering unit 205 performs deblocking filtering in units of rows or columns based on a unit having a size of 4×4, and a height or a width of one block (first block) from among two blocks located on both sides of a boundary of a block to which deblocking filtering is to be applied is 4 and a height or a width of the other block (second block) is 8, the deblocking filtering unit 205 may determine that the maximum number of pixels referenced for deblocking filtering located in the first block is 2, the number of pixels to which deblocking filtering is applied is 1, the maximum number of pixels referenced for deblocking filtering located in the second block is 4, and the number of pixels to which deblocking filtering is applied is 3.

Alternatively, the deblocking filtering unit 205 may determine that the maximum number of pixels referenced for deblocking filtering located in the first block is 2 and the number of pixels to which deblocking filtering is applied is 1, and may determine that the maximum number of pixels referenced for deblocking filtering located in the second block is 2 and the number of pixels to which deblocking filtering is applied is 0.

The deblocking filtering unit 205 may perform deblocking filtering at a boundary of a reconstruction block regardless of a unit of a predetermined size. That is, the deblocking filtering unit 205 may perform deblocking filtering at the boundary of the reconstruction block even when a boundary of the unit of the predetermined size is not matched to the boundary of the reconstruction block. The reconstruction block may be one of a coding unit, a transform unit, and a prediction unit.

When residual information is not included in blocks located on both sides of a boundary of a reconstruction block, the deblocking filtering unit 205 may determine whether deblocking filtering is performed by using information about both blocks.

For example, when motion vectors of blocks on both sides of a boundary portion of a reconstruction block are different from each other, the deblocking filtering unit 205 may determine that deblocking filtering is performed.

When a mode of at least one block from among blocks located on both sides of a boundary of a reconstruction block is a specific mode, the deblocking filtering unit 205 may determine that deblocking filtering is performed. In this case, the specific mode may be an affine model based motion compensation mode or a sub-block prediction mode.

When intra prediction modes of blocks located on both sides of a boundary of a reconstruction block are different from each other, the deblocking filtering unit 205 may determine that deblocking filtering is performed. When illumination compensation parameters of blocks located on both sides of a boundary of a reconstruction block are different from each other, the deblocking filtering unit 205 may determine that deblocking filtering is performed.

When prediction modes of blocks located on both sides of a boundary of a reconstruction block are different from each other, the deblocking filtering unit 205 may determine that deblocking filtering is performed.

For example, when prediction modes of blocks located on both sides of a boundary of a reconstruction block are an intra mode and an inter mode, a combined inter-intra prediction mode and an inter mode, or a combined inter-intra prediction mode and an intra mode, the deblocking filtering unit 205 may determine that deblocking filtering is performed.

When one of blocks located on both sides of a boundary of a reconstruction block has a triangular partition shape, the deblocking filtering unit 205 may determine whether deblocking filtering is performed in consideration of residuals of both blocks. The deblocking filtering unit 205 may determine whether deblocking filtering is performed in consideration of sizes of heights and widths of both blocks and maximum values and minimum values of the two values.

When blocks located on both sides have all triangular partition shapes, and a height or a width of at least one block from among both blocks is equal to or greater than or equal to or less than a specific size, the deblocking filtering unit 205 may perform deblocking filtering on a boundary between triangular partitions.

When a block has a triangular partition shape, the image encoder 210 may perform bidirectional inter prediction on triangular partitions. In this case, the image encode 210 may variously determine weights of reference triangular partitions included in two reference blocks of both directions. For example, a weight of a first reference triangular partition of a first reference block may be 0, a weight of a second reference triangular partition of the first reference block may be 1, a weight of a first reference triangular partition of a second reference block may be 1, and a weight of a second reference triangular partition of the second reference block may be 0. Alternatively, a weight of a first reference triangular partition of a first reference block may be ¼, a weight of a second reference triangular partition of the first reference block may be ¾, a weight of a first reference triangular partition of a second reference block may be ¾, and a weight of a second reference triangular partition of the second reference block may be ¼. A weight of each reference triangular partition may be, but not limited to, a predetermined value, and the image encoder 210 may generate a bitstream including information about weights based on a weight of each reference triangular partition. In this case, a weight of a triangular partition may be determined to be one weight from among one or more weight candidates. In this case, index information indicating one of the one or more weight candidates may be obtained from the bitstream. The weight candidates may be determined for each block, but the present disclosure is not limited thereto. The weigh candidates may be determined for each reference block or for each reference triangular partition.

However, a block is not limited to having a triangular partition shape, and may have a partition mask shape including partitions having various shapes such as a quadrangular shape. In this case, a shape of a partition mask of a block may be determined to be one of one or more partition mask shape candidates. In this case, index information indicating one of the one or more mask shape candidates may be obtained from the bitstream.

Figure 2B:
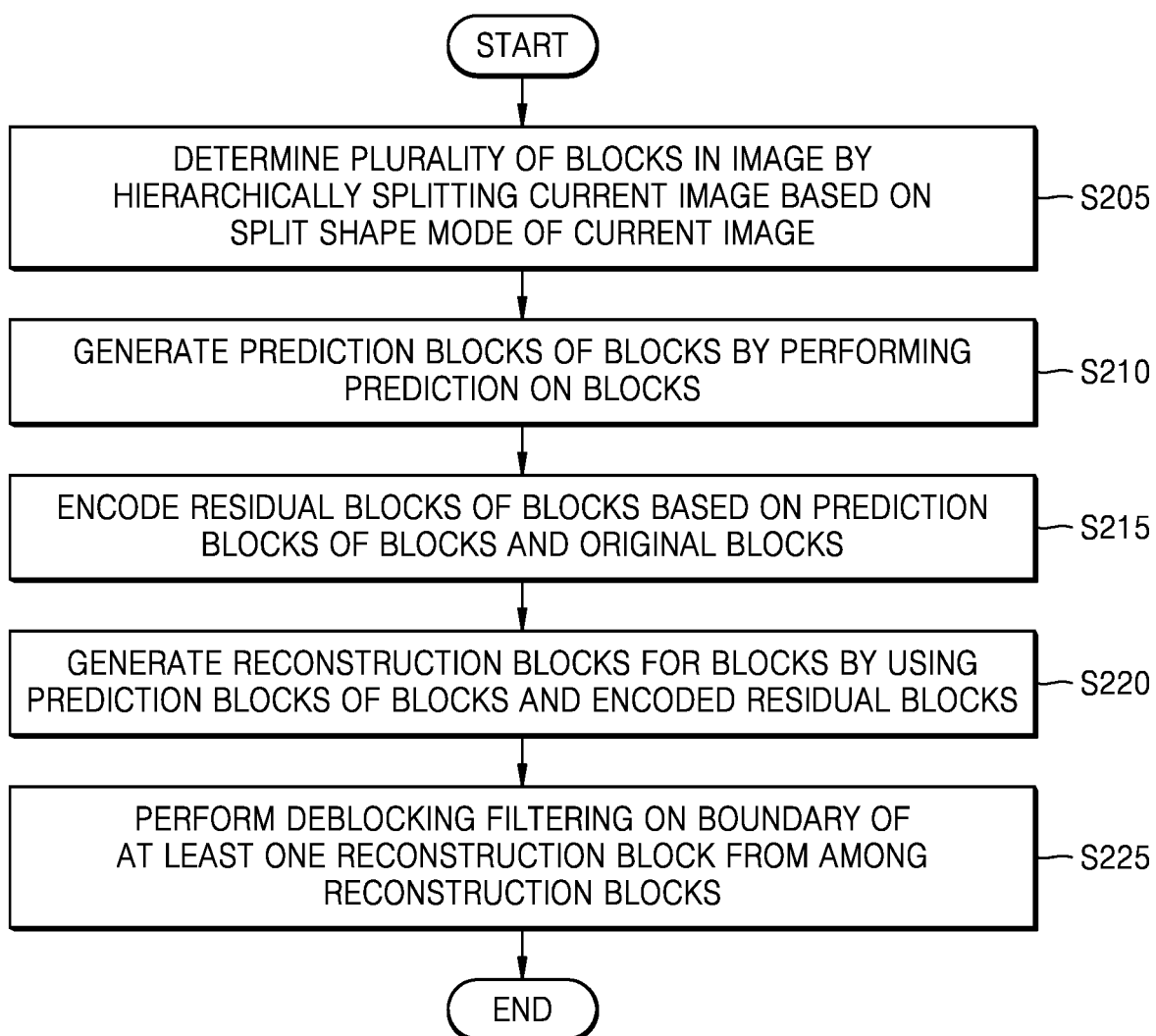
FIG. 2B is a flowchart of an image encoding method according to various embodiments.

FIG. 2B is a flowchart of an image encoding method according to various embodiments.

In operation S205, the image encoding apparatus 200 may determine a plurality of blocks in an image by hierarchically splitting a current image based on a split shape mode of the current image.

In operation S210, the image encoding apparatus 200 may generate prediction blocks of the blocks by performing prediction on the blocks.

In operation S215, the image encoding apparatus 200 may encode residual blocks of the blocks based on the prediction blocks of the blocks and original blocks.

In operation S220, the image encoding apparatus 200 may generate reconstruction blocks for the blocks by using the prediction blocks of the blocks and the encoded residual blocks.

In operation S225, the image encoding apparatus 200 may perform deblocking filtering on a boundary of at least one reconstruction block from among the reconstruction blocks. In this case, when a prediction mode of at least one reconstruction block from among blocks located on both sides of a boundary of the at least one reconstruction block is a combined inter-intra prediction mode, the image encoding apparatus 200 may determine that a value of a boundary filtering strength applied to the boundary of the at least one reconstruction block is a predetermined value, and may perform deblocking filtering on the boundary of the at least one reconstruction block based on the value of the boundary filtering strength.

Figure 2C:
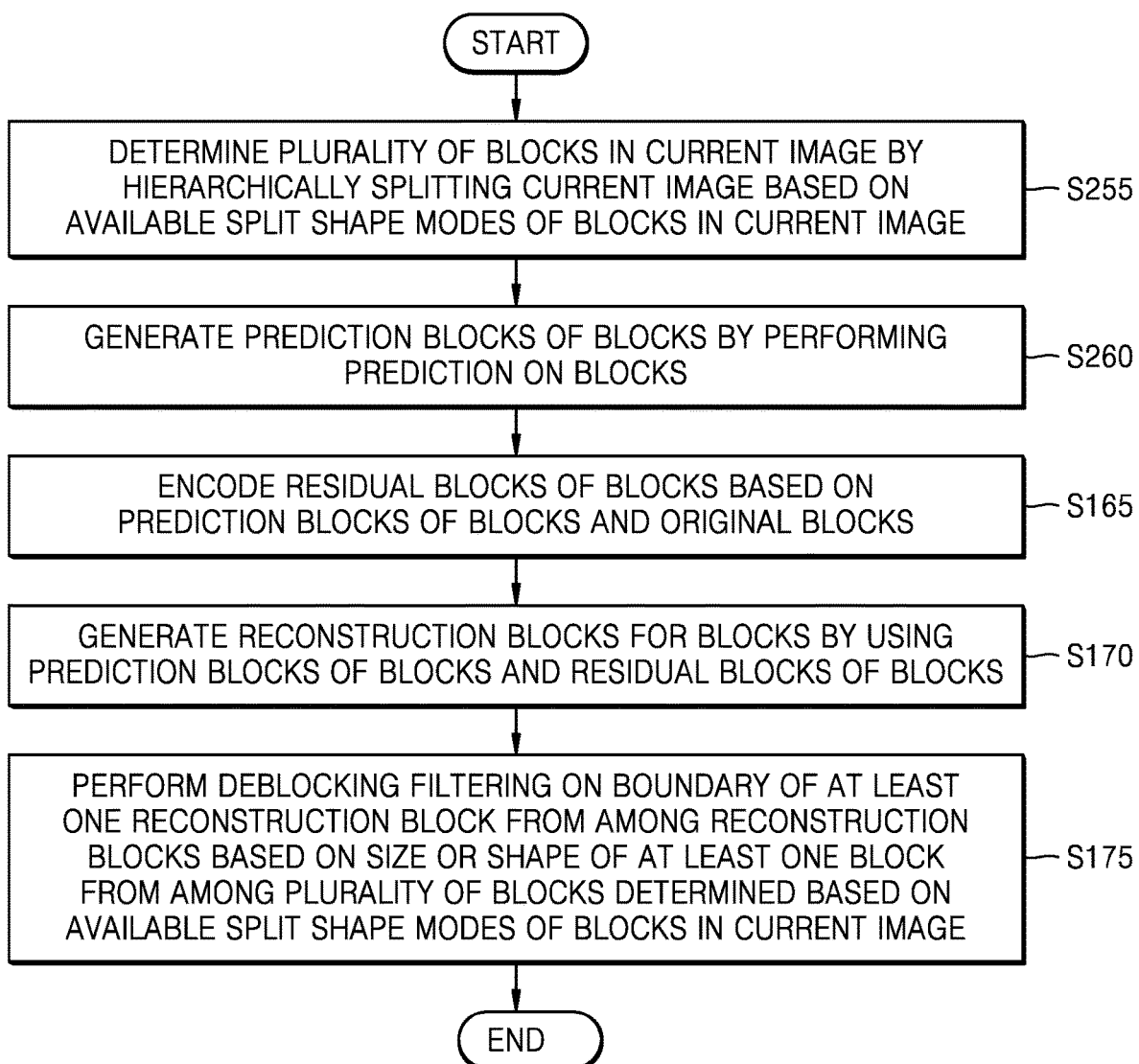
FIG. 2C is a flowchart of an image encoding method according to various embodiments.

FIG. 2C is a flowchart of an image encoding method according to various embodiments.

In operation S255, the image encoding apparatus 200 may determine a plurality of blocks in a current image by hierarchically splitting the current image based on available split shape modes of the blocks in the current image.

In operation S260, the image encoding apparatus 200 may generate prediction blocks of the blocks by performing prediction on the blocks.

In operation S265, the image encoding apparatus 200 may encode residual blocks of the blocks based on the prediction blocks of the blocks and original blocks.

In operation S270, the image encoding apparatus 200 may generate reconstruction blocks for the blocks by using the prediction blocks of the blocks and the encoded residual blocks.

In operation S275, the image encoding apparatus 200 may perform deblocking filtering on a boundary of at least one reconstruction block from among the reconstruction blocks based on a size or shape of at least one block from among the plurality of blocks determined based on the available split shape modes of the blocks in the current image.

For example, the image encoding apparatus 200 may generate a plurality of blocks split from a current block based on one of available split shape modes of the current block, and when one of a height and a width of one block from among the plurality of blocks is not a multiple of a height or a width indicated by a predetermined size, the image encoding apparatus 200 may not allow the available split shape mode and may determine the plurality of blocks from the current block based on another available split shape mode. The image encoding apparatus 200 may perform deblocking filtering on a boundary of at least one reconstruction block from among reconstruction blocks of the plurality of blocks determined based on limited split shape modes.

For example, the image encoding apparatus 200 may generate a plurality of blocks split from a current block based on one of available split shape modes of the current block, and when one of a height and a width of one block from among the plurality of blocks is not a multiple of a height or a width indicated by a predetermined size, the image encoding apparatus 200 may not allow the available split shape mode and may determine the plurality of blocks from the current block based on another available split shape mode. The image encoding apparatus 200 may perform deblocking filtering on a boundary of at least one reconstruction block from among reconstruction blocks of the plurality of blocks determined based on limited split shape modes.

Alternatively, when at least one reconstruction block from among reconstruction blocks of a plurality of blocks determined based on available split shape modes has a triangular partition shape, the image encoding apparatus 200 may perform deblocking filtering on a boundary between triangular partitions based on a height or a width of the at least one reconstruction block or based on residual information located on both sides of the boundary.

Figure 2D:
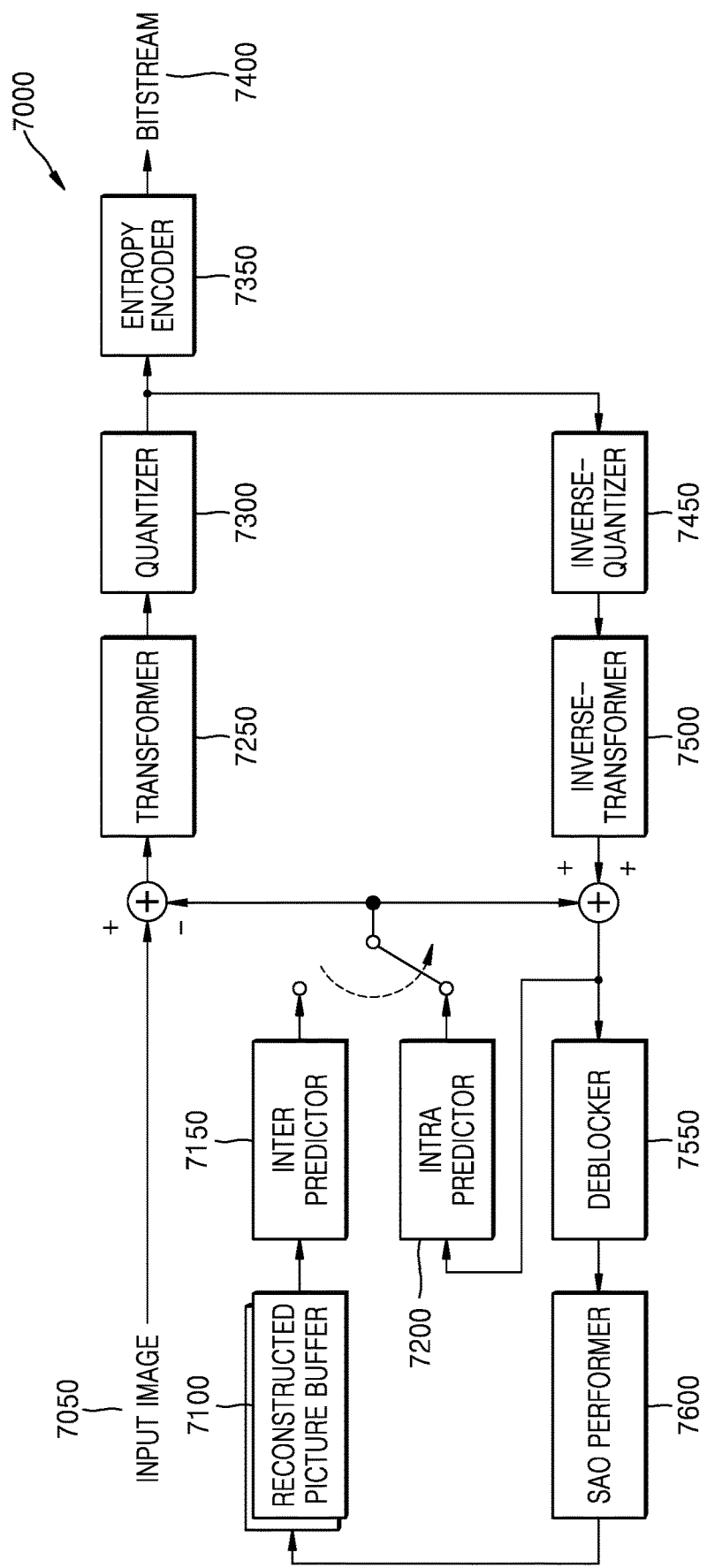
FIG. 2D is a block diagram of an image encoder according to various embodiments.

FIG. 2D is a block diagram of an image encoder according to various embodiments.

An image encoder 7000 according to various embodiments performs tasks that are performed by the image encoder 210 of the image encoding apparatus 200 to encode image data.

That is, an intra predictor 7200 performs intra prediction for each block in a current image 7050, and an inter predictor 7150 performs inter prediction by using the current image 7050 and a reference image obtained by a reconstructed picture buffer 7100 for each block.

Residue data may be generated by subtracting prediction data for each block output from the intra predictor 7200 or the inter predictor 7150 from data for an encoded block of the current image 7050, and a transformer 7250 and a quantizer 7300 may output a quantized transform coefficient for each block by performing transformation and quantization on the residue data. An inverse-quantizer 7450 and an inverse-transformer 7500 may reconstruct the residue data of a spatial domain by performing inverse-quantization and inverse-transformation on the quantized transform coefficient. The reconstructed residue data of the spatial domain is added to the prediction data for each block output from the intra predictor 7200 or the inter predictor 7150, to be reconstructed as data of a spatial domain for the block of the current image 7050. A deblocker 7550 and an SAO performer perform inloop filtering on the reconstructed data of the spatial domain and generate a filtered reconstruction image. The deblocking filtering unit 105 may include the deblocking unit 7550 of the image encoder 7000. The generated reconstruction image is stored in the reconstructed picture buffer 7100. Reconstruction images stored in the reconstructed picture buffer 7100 may be used as reference images for inter prediction of other images. An entropy encoder 7350 may entropy encode the quantized transform coefficient and the entropy encoded coefficient may be output as a bitstream 7400.

In order to apply the image encoder 7000 according to various embodiments to the image encoding apparatus 200, tasks of the image encoder 7000 according to various embodiments may be performed according to blocks.

Splitting of a coding unit according to an embodiment of the present disclosure will now be described in detail.

An image may be split into largest coding units. A size of each largest coding unit may be determined based on information obtained from a bitstream. A shape of each largest coding unit may be a square shape of the same size. However, the present disclosure is not limited thereto. Also, a largest coding unit may be hierarchically split into coding units based on information about a split shape mode obtained from a bitstream. The information about the split shape mode may include at least one of information indicating whether splitting is performed, split direction information, and split type information. The information indicating whether splitting is performed indicates whether a coding unit is to be split. The split direction information indicates that splitting is performed in one of a horizontal direction and a vertical direction. The split type information indicates that splitting is performed in one of binary split, tri-split (or triple split), and quad split.

Although it is described that the information about the split shape mode includes the information indicating whether splitting is performed, the split direction information, and the split type information for convenience of explanation, the present disclosure is not limited thereto. The image decoding apparatus 100 may obtain the information about the split shape mode from a bitstream by using one bin string. The image decoding apparatus 100 may determine whether a coding unit is to be split, a split direction, and a split type, based on one bin string.

The coding unit may be equal to or less than a largest coding unit. For example, when the information about the split shape mode indicates that splitting is not performed, the coding unit has the same size as the largest coding unit. When the information about the split shape mode indicates that splitting is performed, the largest coding unit may be split into coding units of a lower depth. Also, when the information about the split shape mode for the coding units of the lower depth indicates that splitting is performed, the coding units of the lower depth may be split into smaller coding units. However, splitting of an image is not limited thereto, and a largest coding unit and a coding unit may not be distinguished from each other. Splitting of a coding unit will be described in more detail with reference to FIGS. 3 through 16.

Also, a coding unit may be split into prediction units for prediction of an image. Each of the prediction units may be equal to or less than the coding unit. Also, the coding unit may be split into transform units for transformation of an image. Each of the transform units may be equal to or less than the coding unit. Shapes and sizes of the transform unit and the prediction unit may not be related to each other. The coding unit may be distinguished from the prediction unit and the transform unit, or the coding unit, the prediction unit, and the transform unit may be the same. Splitting of the prediction unit and the transform unit may be performed in the same manner as that of the coding unit. Splitting of the coding unit will be described in more detail with reference to FIGS. 3 through 16. Each of a current block and a neighboring block of the present disclosure may indicate one of a largest coding unit, a coding unit, a prediction unit, and a transform unit. Also, a current block or a current coding unit is a block where decoding or encoding is currently performed or splitting is currently performed. The neighboring block may be a block that is reconstructed earlier than the current block. The neighboring block may be spatially or temporally adjacent to the current block. The neighboring block may be located at one of a left lower side, a left side, a left upper side, an upper side, a right upper side, a right side, and a right lower side of the current block.

Figure 3:
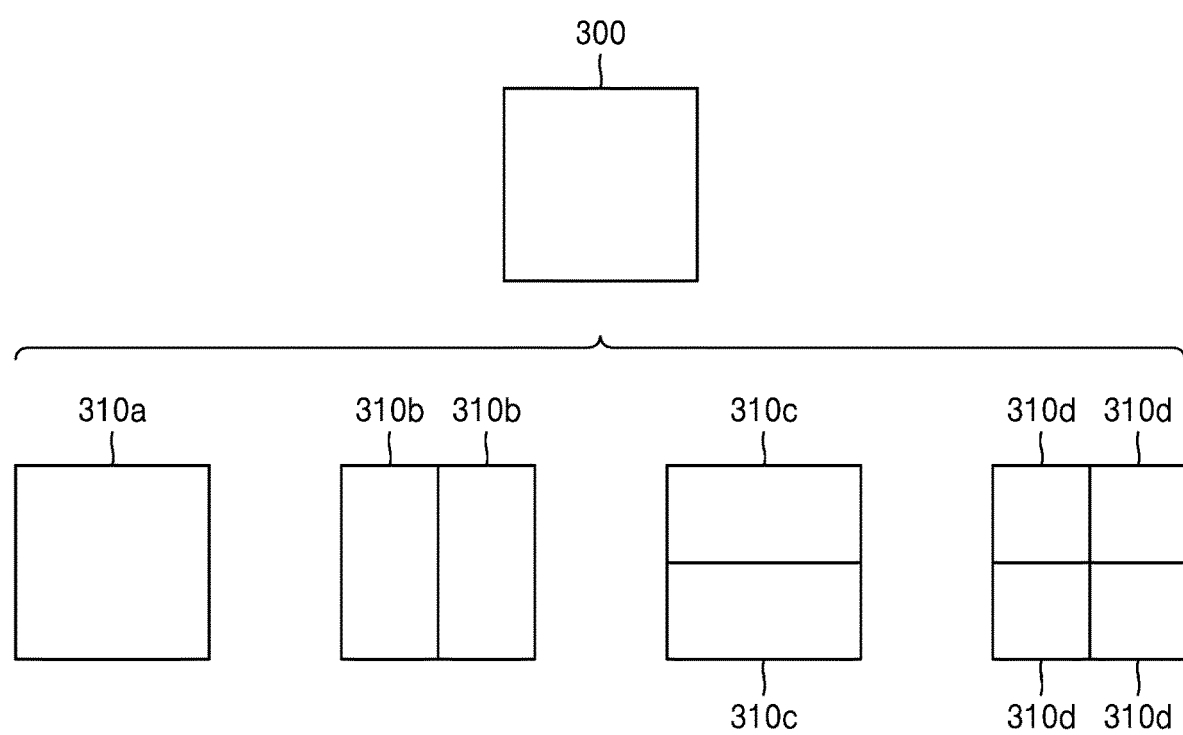
FIG. 3 illustrates a process by which the image decoding apparatus determines at least one coding unit by splitting a current coding unit, according to an embodiment.

FIG. 3 illustrates a process by which the image decoding apparatus 100 determines at least one coding unit by splitting a current coding unit, according to an embodiment.

A block shape may include 4N×4N, 4N×2N, 2N×4N, 4N×N, or N×4N. N may be a positive integer. Block shape information is information indicating at least one of a shape, a direction, a ratio between a width and a height, and a size of a coding unit.

The shape of the coding unit may include a square shape and a non-square shape. When the width and the height of the coding unit are the same (i.e., when the block shape of the coding unit is 4N×4N), the image decoding apparatus 100 may determine the block shape information of the coding unit as a square shape. The image decoding apparatus 100 may determine the shape of the coding unit as a non-square shape.

When the width and the height of the coding unit are different from each other (i.e., when the block shape of the coding unit is 4N×2N, 2N×4N, 4N×N, or N×4N), the image decoding apparatus 100 may determine the block shape information of the coding unit as a non-square shape. When the shape of the coding unit is a non-square shape, the image decoding apparatus 100 may determine the width-to-height ratio in the block shape information of the coding unit as at least one of 1:2, 2:1, 1:4, 4:1, 1:8, and 8:1. Also, the image decoding apparatus 100 may determine whether the coding unit is in a horizontal direction or a vertical direction, based on a length of the width and a length of the height of the coding unit. Also, the image decoding apparatus 100 may determine the size of the coding unit, based on at least one of the length of the width, the length of the height, and an area of the coding unit.

According to an embodiment, the image decoding apparatus 100 may determine a shape of the coding unit by using the block shape information, and may determine which shape the coding unit is split into by using information about a split shape mode. That is, a coding unit splitting method indicated by the information about the split shape mode may be determined according to which block shape is indicated by the block shape information used by the image decoding apparatus 100.

The image decoding apparatus 100 may determine the information about the split shape mode from a bitstream. However, the present disclosure is not limited thereto, and the image decoding apparatus 100 and the image encoding apparatus 200 may determine the information about the split shape mode that is pre-promised based on the block shape information. The image decoding apparatus 100 may determine the information about the split shape mode that is pre-promised for a largest coding unit or a smallest coding unit. For example, the image decoding apparatus 100 may determine that the information about the split shape mode for the largest coding unit indicates quad splitting. Also, the image decoding apparatus 100 may determine that the information about the split shape mode for the smallest coding unit indicates "not to perform splitting". For example, the image decoding apparatus 100 may determine that a size of the largest coding unit is 256×256. The image decoding apparatus 100 may determine that the pre-promised information about the split shape mode indicates quad splitting. The quad splitting is a split shape mode in which the width and the height of the coding unit are halved. The image decoding apparatus 100 may obtain the coding unit having a size of 128×128 from the largest coding unit having a size of 256×256 based on the information about the split shape mode. Also, the image decoding apparatus 100 may determine that a size of the smallest coding unit is 4×4. The image decoding apparatus 100 may obtain the information about the split shape mode indicating "not to perform splitting" for the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the information about the split shape mode. Referring to FIG. 3, when the block shape information of a current coding unit 300 indicates a square shape, the decoder 120 may determine that a coding unit 310a having the same size as the current coding unit 300 is not split, based on the information about the split shape mode indicating not to perform splitting, or may determine coding units 310b, 310c, and 310d split based on the information about the split shape mode indicating a certain splitting method.

Referring to FIG. 3, according to an embodiment, the image decoding apparatus 100 may determine two coding units 310b obtained by vertically splitting the current coding unit 300, based on the information about the split shape mode indicating to vertically perform splitting. The image decoding apparatus 100 may determine two coding units 310c obtained by horizontally splitting the current coding unit 300, based on the information about the split shape mode indicating to horizontally perform splitting. The image decoding apparatus 100 may determine four coding units 310d obtained by vertically and horizontally splitting the current coding unit 300, based on the information about the split shape mode indicating to vertically and horizontally perform splitting. However, splitting methods of the square coding unit are not limited to the above-described methods, and the information about the split shape mode may include various methods. Certain splitting methods of splitting the square coding unit will be described in detail below through various embodiments.

Figure 4:
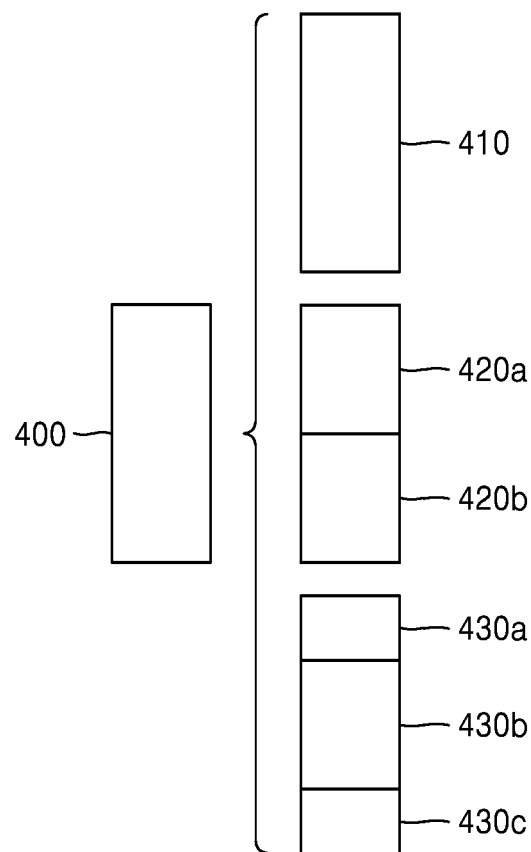
FIG. 4 illustrates a process by which the image decoding apparatus determines at least one coding unit by splitting a non-square coding unit, according to an embodiment.
Figure 4:
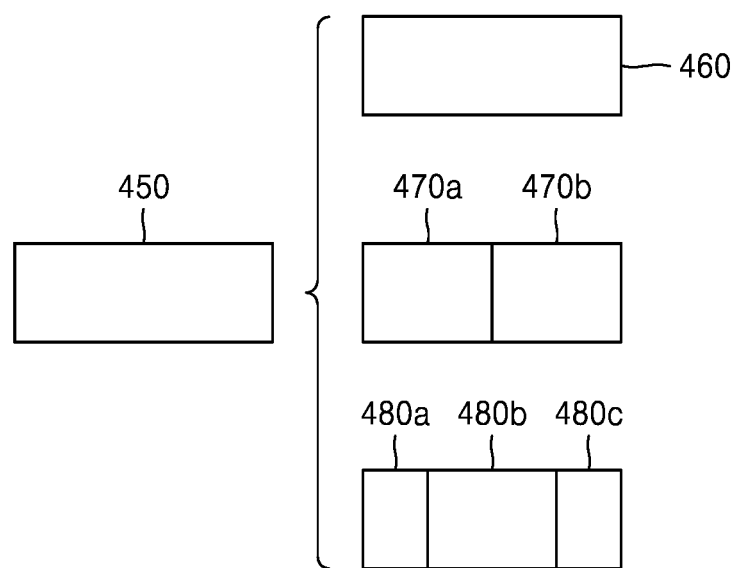

FIG. 4 illustrates a process by which the image decoding apparatus 100 determines at least one coding unit by splitting a non-square coding unit, according to an embodiment.

According to an embodiment, the image decoding apparatus 100 may use block shape information indicating that a current coding unit has a non-square shape. The image decoding apparatus 100 may determine, according to information about a split shape mode, whether not to split the non-square current coding unit or whether to split the non-square current coding unit by using a certain method. Referring to FIG. 4, when the block shape information of a current coding unit 400 or 450 indicates a non-square shape, the image decoding apparatus 100 may determine a coding unit 410 or 460 having the same size as the current coding unit 400 or 450 based on the information about the split shape mode indicating not to perform splitting, or may determine coding units 420a and 420b, 430a to 430c, 470a and 470b, or 480a to 480c split based on the information about the split shape mode indicating a certain splitting method. Certain splitting methods of splitting a non-square coding unit will be described in detail below through various embodiments.

According to an embodiment, the image decoding apparatus 100 may determine a splitting method of a coding unit by using the information about the split shape mode and, in this case, the information about the split shape mode may indicate the number of one or more coding units generated by splitting the coding unit. Referring to FIG. 4, when the information about the split shape mode indicates to split the current coding unit 400 or 450 into two coding units, the image decoding apparatus 100 may determine two coding units 420a and 420b, or 470a and 470b included in the current coding unit 400 or 450 by splitting the current coding unit 400 or 450 based on the information about the split shape mode.

According to an embodiment, when the image decoding apparatus 100 splits the non-square current coding unit 400 or 450 based on the information about the split shape mode, a location of a long side of the non-square current coding unit 400 or 450 may be considered. For example, the image decoding apparatus 100 may determine a plurality of coding units by splitting the long side of the current coding unit 400 or 450, in consideration of a shape of the current coding unit 400 or 450.

According to an embodiment, when the information about the split shape mode indicates to split (tri-split) a coding unit into an odd number of blocks, the image decoding apparatus 100 may determine an odd number of coding units included in the current coding unit 400 or 450. For example, when the information about the split shape mode indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a width-to-height ratio of the current coding unit 400 or 450 may be 4:1 or 1:4. When the width-to-height ratio is 4:1, a length of the width is greater than a length of the height, and thus the block shape information may be horizontal. When the width-to-height ratio is 1:4, a length of the width is less than a length of the height, and thus the block shape information may be vertical. The image decoding apparatus 100 may determine to split the current coding unit into an odd number of blocks based on the information about the split shape mode. Also, the image decoding apparatus 100 may determine a split direction of the current coding unit 400 or 450 based on the block shape information of the current coding unit 400 or 450. For example, when the current coding unit 400 is in a vertical direction, the image decoding apparatus 100 may horizontally split the current coding unit 400 and may determine the coding units 430a, 430b, and 430c. Also, when the current coding unit 450 is in a horizontal direction, the image decoding apparatus 100 may vertically split the current coding unit 450 and may determine the coding units 480a, 480b, and 480c.

According to an embodiment, the image decoding apparatus 100 may determine an odd number of coding units included in the current coding unit 400 or 450, and sizes of all of the determined coding units may not be the same. For example, a certain coding unit 430b or 480b from among the determined odd number of coding units 430a, 430b, and 430c, or 480a, 480b, and 480c may have a size different from sizes of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the information about the split shape mode indicates to split a coding unit into an odd number of blocks, the image decoding apparatus 100 may determine an odd number of coding units included in the current coding unit 400 or 450, and may put a certain restriction on at least one coding unit from among the odd number of coding units generated by splitting the current coding unit 400 or 450. Referring to FIG. 4, the image decoding apparatus 100 may allow a decoding method of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a certain number of times, unlike the other coding units 430a and 430c, or 480a and 480c.

Figure 5:
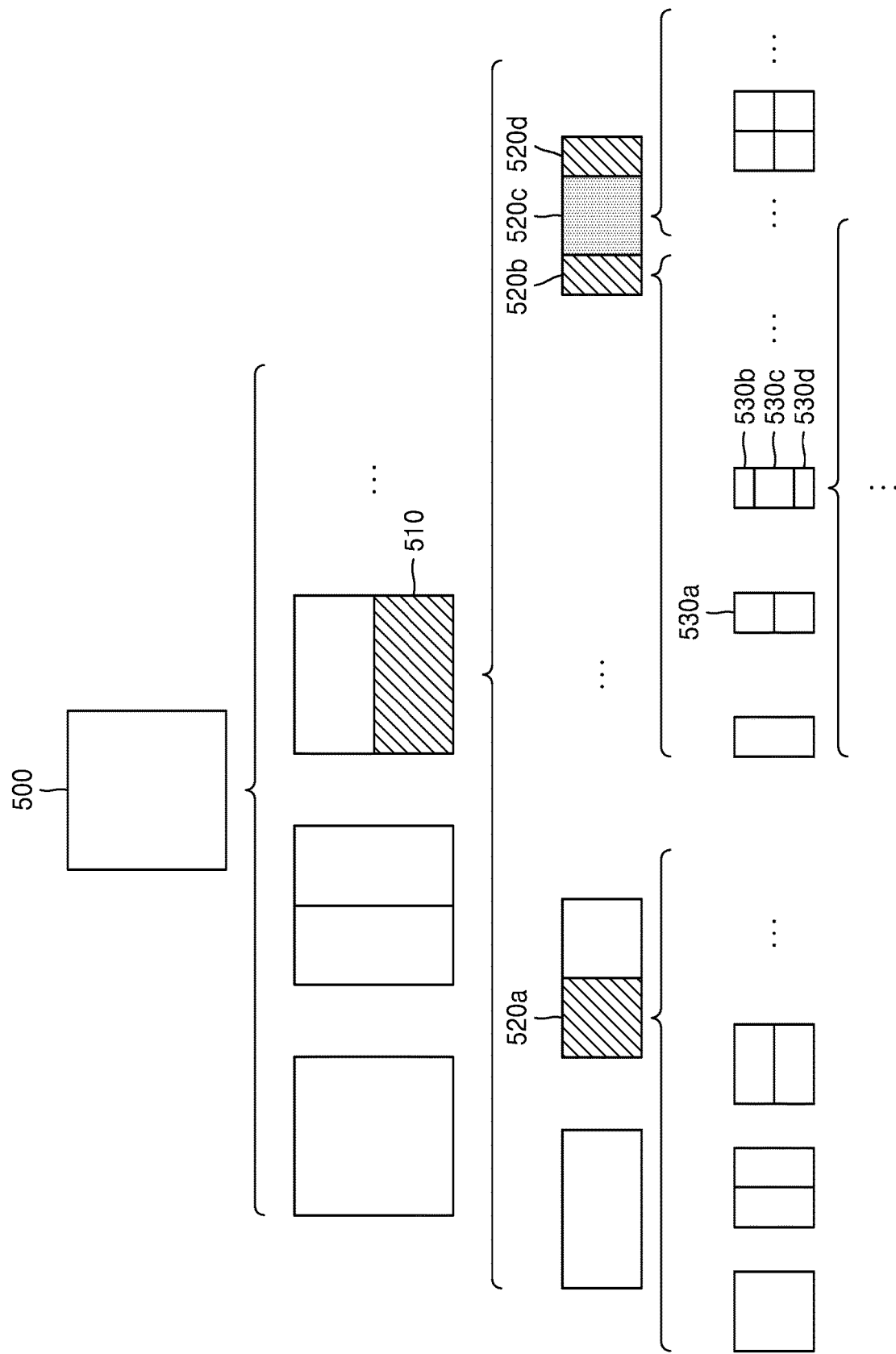
FIG. 5 illustrates a process by which the image decoding apparatus splits a coding unit based on at least one of block shape information and information about a split shape mode, according to an embodiment.

FIG. 5 illustrates a process by which the image decoding apparatus 100 splits a coding unit based on at least one of block shape information and information about a split shape mode, according to an embodiment.

According to an embodiment, the image decoding apparatus 100 may determine to split or not to split a square first coding unit 500 into coding units based on at least one of the block shape information and the information about the split shape mode. According to an embodiment, when the information about the split shape mode indicates to horizontally split the first coding unit 500 in a horizontal direction, the image decoding apparatus 100 may determine a second coding unit 510 by horizontally splitting the first coding unit 500. A first coding unit, a second coding unit, and a third coding unit used according to an embodiment are terms used to understand a relationship before and after splitting a coding unit. For example, the second coding unit may be determined by splitting the first coding unit, and the third coding unit may be determined by splitting the second coding unit. It will be understood that a relationship among the first coding unit, the second coding unit, and the third coding unit applies to the following descriptions.

According to an embodiment, the image decoding apparatus 100 may determine to split or not to split the second coding unit 510 into coding units, based on at least one of the block shape information and the information about the split shape mode. Referring to FIG. 5, the image decoding apparatus 100 may split the non-square second coding unit 510, which is determined by splitting the first coding unit 500, into one or more third coding units 520a, or 520b, 520c, and 520d based on at least one of the block shape information and the information about the split shape mode, or may not split the non-square second coding unit 510. The image decoding apparatus 100 may obtain at least one of the block shape information and the information about the split shape mode, and may obtain a plurality of various-shaped second coding units (e.g., 510) by splitting the first coding unit 500, based on at least one of the block shape information and the information about the split shape mode, and the second coding unit 510 may be split by using a splitting method of the first coding unit 500 based on at least one of the block shape information and the information about the split shape mode. According to an embodiment, when the first coding unit 500 is split into the second coding units 510 based on at least one of the block shape information and the information about the split shape mode of the first coding unit 500, the second coding unit 510 may also be split into the third coding units 520a, or 520b, 520c, and 520d based on at least one of the block shape information and the information about the split shape mode of the second coding unit 510. That is, a coding unit may be recursively split based on at least one of the block shape information and the information about the split shape mode of each coding unit. Therefore, a square coding unit may be determined by splitting a non-square coding unit, and a non-square coding unit may be determined by recursively splitting the square coding unit.

Referring to FIG. 5, a certain coding unit (e.g., a coding unit at a center location or a square coding unit) from among an odd number of third coding units 520b, 520c, and 520d determined by splitting the non-square second coding unit 510 may be recursively split. According to an embodiment, the square (non-square?) third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split again into a plurality of coding units. For example, the non-square fourth coding unit 530b or 530d may be split again into an odd number of coding units. A method that may be used to recursively split a coding unit will be described below through various embodiments.

According to an embodiment, the image decoding apparatus 100 may split each of the third coding units 520a, 520b, 520c, and 520d into coding units, based on at least one of the block shape information and the information about the split shape mode. Also, the image decoding apparatus 100 may determine not to split the second coding unit 510 based on at least one of the block shape information and the information about the split shape mode. According to an embodiment, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain at least one of the block shape information and the information about the split shape mode, which is used to split a current coding unit, from a certain location in the current coding unit.

Figure 6:
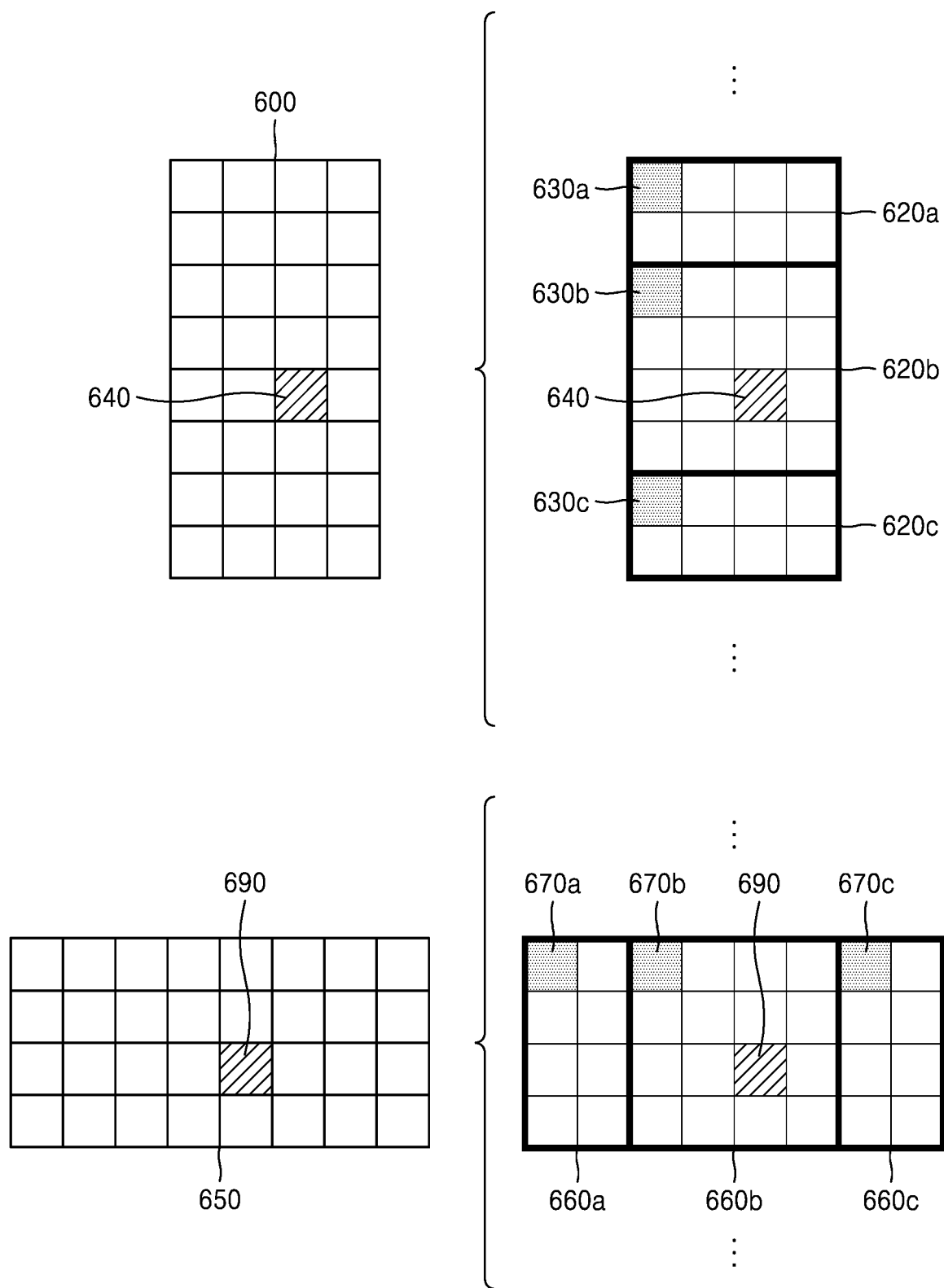
FIG. 6 illustrates a method by which the image decoding apparatus determines a certain coding unit from among an odd number of coding units, according to an embodiment.

FIG. 6 illustrates a method by which the image decoding apparatus 100 determines a certain coding unit from among an odd number of coding units, according to an embodiment.

Referring to FIG. 6, at least one of block shape information and information about a split shape mode of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one of the block shape information and the information about the split shape mode may be obtained, is not limited to the center location in FIG. 6, and may include various locations (e.g., top, bottom, left, right, top left, bottom left, top right, and bottom right locations) included in the current coding unit 600. The image decoding apparatus 100 may obtain at least one of the block shape information and the information about the split shape mode from the certain location and may determine to split or not to split the current coding unit into various-shaped and various-sized coding units.

According to an embodiment, when the current coding unit is split into a certain number of coding units, the image decoding apparatus 100 may select one of the coding units. Various methods that may be used to select one of a plurality of coding units will be described below through various embodiments.

According to an embodiment, the image decoding apparatus 100 may split the current coding unit into a plurality of coding units, and may determine a coding unit at a certain location.

According to an embodiment, the image decoding apparatus 100 may use information indicating locations of an odd number of coding units to determine a coding unit at a center location from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600 or the current coding unit 650. The image decoding apparatus 100 may determine the coding unit 620b at a center location or the coding unit 660b at a center location by using information about locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of certain samples included in the coding units 620a, 620b, and

620c. In detail, the image decoding apparatus 100 may determine the coding unit 620b at the center location by determining the locations of the coding units 620a, 620b, and 620c based on information indicating locations of top left samples 630a, 630b, and 630c of the coding units 620a, 620b, and 620c.

According to an embodiment, the information indicating the locations of the top left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the differences between the coordinates.

According to an embodiment, information indicating the location of the top left sample 630a of the upper coding unit 620a may include coordinates (xa, ya), information indicating the location of the top left sample 630b of the middle coding unit 620b may include coordinates (xb, yb), and information indicating the location of the top left sample 630c of the lower coding unit 620c may include coordinates (xc, yc). The image decoding apparatus 100 may determine the middle coding unit 620b by using the coordinates of the top left samples 630a, 630b, and 630c which are included in the coding units 620a, 620b, and 620c, respectively. For example, when the coordinates of the top left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top left samples 630a, 630b, and 630c may include coordinates indicating absolute locations in the picture, or may use coordinates (dxb, dyb) indicating a relative location of the top left sample 630b of the middle coding unit 620b and coordinates (dxc, dyc) indicating a relative location of the top left sample 630c of the lower coding unit 620c, with reference to the location of the top left sample 630a of the upper coding unit 620a. Also, a method of determining a coding unit at a certain location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into the plurality of coding units 620a, 620b, and 620c, and may select one of the coding units 620a, 620b, and 620c based on a certain criterion. For example, the image decoding apparatus 100 may select the coding unit 620b, which has a size different from that of the others, from among the coding units 620a, 620b, and 620c.

According to an embodiment, the image decoding apparatus 100 may determine the widths or heights of the coding units 620a, 620b, and 620c by using the coordinates (xa, ya) indicating the location of the top left sample 630a of the upper coding unit 620a, the coordinates (xb, yb) indicating the location of the top left sample 630b of the middle coding unit 620b, and the coordinates (xc, yc) indicating the location of the top left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be a width of the current coding unit 600. The image decoding apparatus 100 may determine the height of the upper coding unit 620a to be yb−ya. According to an embodiment, the image decoding apparatus 100 may determine the width of the middle coding unit 620b to be a width of the current coding unit 600. The image decoding apparatus 100 may determine the height of the middle coding unit 620b to be yc−yb. According to an embodiment, the image decoding apparatus 100 may determine the width or height of the lower coding unit 620c by using the width or height of the current coding unit 600 and the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the certain location. However, the above-described method by which the image decoding apparatus 100 determines a coding unit having a size different from that of the other coding units merely corresponds to an example of determining a coding unit at a certain location by using the sizes of coding units, which are determined based on coordinates of samples, and thus various methods of determining a coding unit at a certain location by comparing sizes of coding units, which are determined based on coordinates of certain samples, may be used.

The image decoding apparatus 100 may determine widths or heights of the coding units 660a, 660b, and 660c by using coordinates (xd, yd) that are information indicating a location of a top left sample 670a of the left coding unit 660a, coordinates (xe, ye) that are information indicating a location of a top left sample 670b of the middle coding unit 660b, and coordinates (xf, yf) that are information indicating a location of a top left sample 670c of the right coding unit 660c. The image decoding apparatus 100 may determine sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe−xd. The image decoding apparatus 100 may determine the height of the left coding unit 660a to be a height of the current coding unit 650. According to an embodiment, the image decoding apparatus 100 may determine the width of the middle coding unit 660b to be xf−xe. The image decoding apparatus 100 may determine the height of the middle coding unit 660b to be a height of the current coding unit 600. According to an embodiment, the image decoding apparatus 100 may determine the width or the height of the right coding unit 660c by using the width or the height of the current coding unit 650 and the width and the height of the left coding unit 660a and the middle coding unit 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the size of the left coding unit 660a and the right coding unit 660c, as the coding unit of the certain location. However, the above-described method by which the image decoding apparatus 100 determines a coding unit having a size different from that of the other coding units merely corresponds to an example of determining a coding unit at a certain location by using the sizes of coding units, which are determined based on coordinates of samples, and thus various methods of determining a coding unit at a certain location by comparing sizes of coding units, which are determined based on coordinates of certain samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a certain location from among an odd number of coding units determined by splitting the current coding unit, considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary splitting) the current coding unit, and may determine the coding unit at the certain location by using information about locations of the even number of coding units. An operation related thereto may correspond to the operation of determining a coding unit at a certain location (e.g., a center location) from among an odd number of coding units, which has been described in detail above with reference to FIG. 6, and thus detailed descriptions thereof are not provided here.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information and information about a split shape mode, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into the plurality of coding units 620a, 620b, and 620c based on at least one of the block shape information and the information about the split shape mode, and may determine the coding unit 620b at a center location from among the plurality of the coding units 620a, 620b, and 620c. Furthermore, the image decoding apparatus 100 may determine the coding unit 620b at the center location, in consideration of a location from which at least one of the block shape information and the information about the split shape mode is obtained. That is, at least one of the block shape information and the information about the split shape mode of the current coding unit 600 may be obtained from the sample 640 at a center location of the current coding unit 600 and, when the current coding unit 600 is split into the plurality of coding units 620a, 620b, and 620c based on at least one of the block shape information and the information about the split shape mode, the coding unit 620b including the sample 640 may be determined as the coding unit at the center location. However, information used to determine the coding unit at the center location is not limited to at least one of the block shape information and the information about the split shape mode, and various kinds of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use at least one of the block shape information and the information about the split shape mode, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location by considering a block shape of the current coding unit 600, may determine the coding unit 620b including a sample, from which certain information (e.g., at least one of the block shape information and the information about the split shape mode) may be obtained, from among the plurality of coding units 620a, 620b, and 620c determined by splitting the current coding unit 600, and may put a certain restriction on the coding unit 620b. Referring to FIG. 6, according to an embodiment, the image decoding apparatus 100 may determine the sample 640 at the center location of the current coding unit 600 as the sample from which the certain information may be obtained, and may put a certain restriction on the coding unit 620b including the sample 640, in a decoding operation. However, the location of the sample from which the certain information may be obtained is not limited to the above-described location, and may include arbitrary locations of samples included in the coding unit 620b to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located on a boundary for dividing at least one of a width and a height of the current coding unit in half, as the sample from which the certain information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the certain information may be obtained.

According to an embodiment, when the current coding unit is split into a plurality of coding units, the image decoding apparatus 100 may use at least one of the block shape information and the information about the split shape mode to determine a coding unit at a certain location from among the plurality of coding units. According to an embodiment, the image decoding apparatus 100 may obtain at least one of the block shape information and the information about the split shape mode from a sample at a certain location in a coding unit, and may split the plurality of coding units, which are generated by splitting the current coding unit, by using at least one of the block shape information and the information about the split shape mode, which is obtained from the sample of the certain location in each of the plurality of coding units. That is, a coding unit may be recursively split based on at least one of the block shape information and the information about the split shape mode, which is obtained from the sample at the certain location in each coding unit. An operation of recursively splitting a coding unit has been described above with reference to FIG. 5, and thus detailed descriptions thereof will be omitted.

According to an embodiment, the image decoding apparatus 100 may determine one or more coding units by splitting the current coding unit, and may determine an order of decoding the one or more coding units based on a certain block (e.g., the current coding unit).

Figure 7:
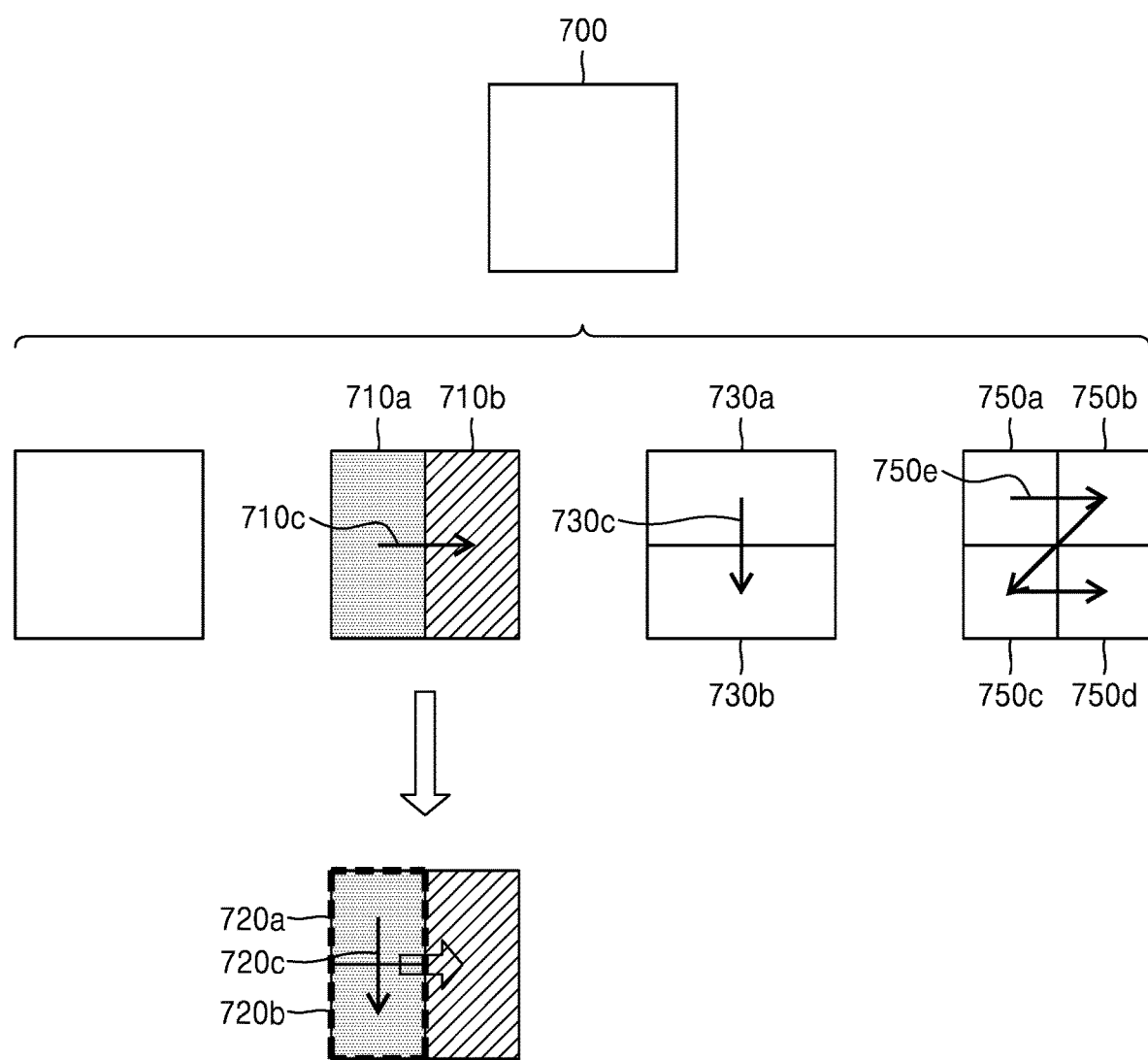
FIG. 7 illustrates an order of processing a plurality of coding units when the image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on block shape information and information about a split shape mode.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a to 750d, which are determined by splitting the first coding unit 700 in vertical and horizontal directions, according to a certain order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of second coding units 710a, 710b, 730a, 730b, 750a, 750b, 750c, and 750d by splitting the first coding unit 700, and may recursively split each of the determined plurality of second coding units 710a, 710b, 730a, 730b, 750a, 750b, 750c, and 750d. A splitting method of the plurality of second coding units 710a, 710b, 730a, 730b, 750a, 750b, 750c, and 750d may correspond to a splitting method of the first coding unit 700. As such, each of the plurality of second coding units 710a, 710b, 730a, 730b, 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a certain order.

Figure 8:
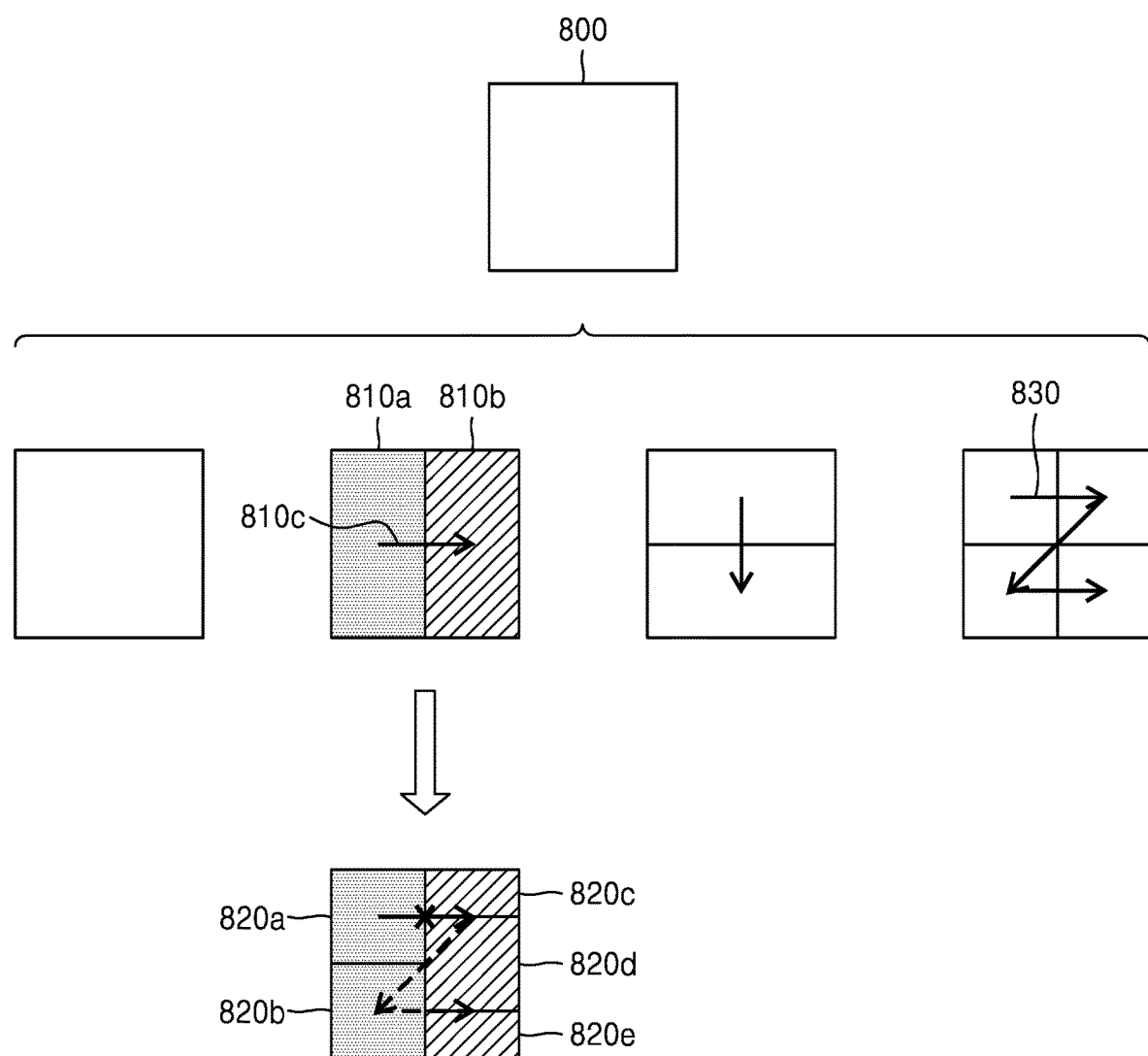
FIG. 8 illustrates a process by which the image decoding apparatus determines that a current coding unit is to be split into an odd number of coding units, when the coding units are not processable in a certain order, according to an embodiment.

FIG. 8 illustrates a process by which the image decoding apparatus 100 determines that a current coding unit is to be split into an odd number of coding units, when the coding units are not processable in a certain order, according to an embodiment.

According to an embodiment, the image decoding apparatus 100 may determine whether the current coding unit is split into an odd number of coding units, based on obtained block shape information and information about a split shape mode. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a certain order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, or the third coding units 820a and 820b, and 820c, 820d, and 820e is split into an odd number of coding units, based on at least one of block shape information and information about a split shape mode. For example, a coding unit located in the right from among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may decide whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c, 820d, and 820e included in the first coding unit 800 satisfy the condition for processing in the certain order, and the condition relates to whether at least one of a width and a height of the second coding units 810a and 810b is to be divided in half along a boundary of the third coding units 820a and 820b, and 820c, 820d, and 820e. For example, the third coding units 820a and 820b determined by dividing the height of the non-square left second coding unit 810a in half may satisfy the condition. However, because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and may determine that the right second coding unit 810b is to be split into an odd number of coding units, based on a result of the decision. According to an embodiment, when a coding unit is split into an odd number of coding units, the image decoding apparatus 100 may put a certain restriction on a coding unit at a certain location among the split coding units, and the restriction or the certain location has been described above through various embodiments and thus detailed descriptions thereof will be omitted.

Figure 9:
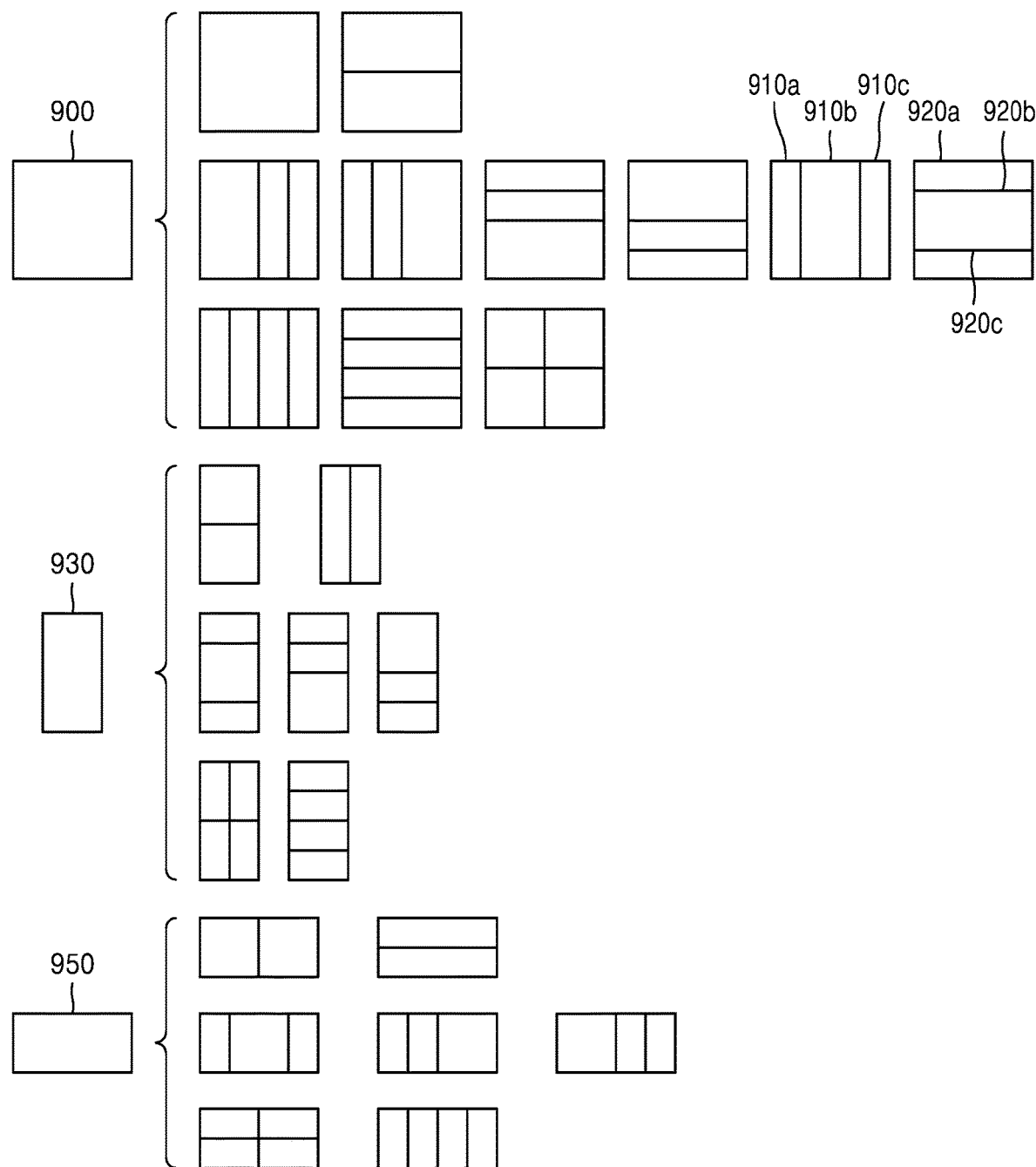
FIG. 9 illustrates a process by which the image decoding apparatus determines at least one coding unit by splitting a first coding unit, according to an embodiment.

FIG. 9 illustrates a process by which the image decoding apparatus 100 determines at least one coding unit by splitting a first coding unit 900, according to an embodiment.

According to an embodiment, the image decoding apparatus 100 may split the first coding unit 900 based on at least one of block shape information and information about a split shape mode which is obtained by a receiver (not shown). The square first coding unit 900 may be split into four square coding units, or may be split into a plurality of non-square coding units. For example, referring to FIG. 9, when the block shape information indicates that the first coding unit 900 has a square shape and the information about the split shape mode indicates to split the first coding unit 900 into non-square coding units, the image decoding apparatus 100 may split the first coding unit 900 into a plurality of non-square coding units. In detail, when the information about the split shape mode indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and a height of the first coding unit 900 is to be divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the width of the first coding unit 900 in half, it may be determined that the first coding unit 900 does not satisfy the condition for processing in the certain order. In addition, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is to be split into an odd number of coding units based on a result of the decision. According to an embodiment, when a coding unit is split into an odd number of coding units, the image decoding apparatus 100 may put a certain restriction on a coding unit at a certain location from among the split coding units, and the restriction or the certain location has been described above through various embodiments and thus detailed descriptions thereof will be omitted.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
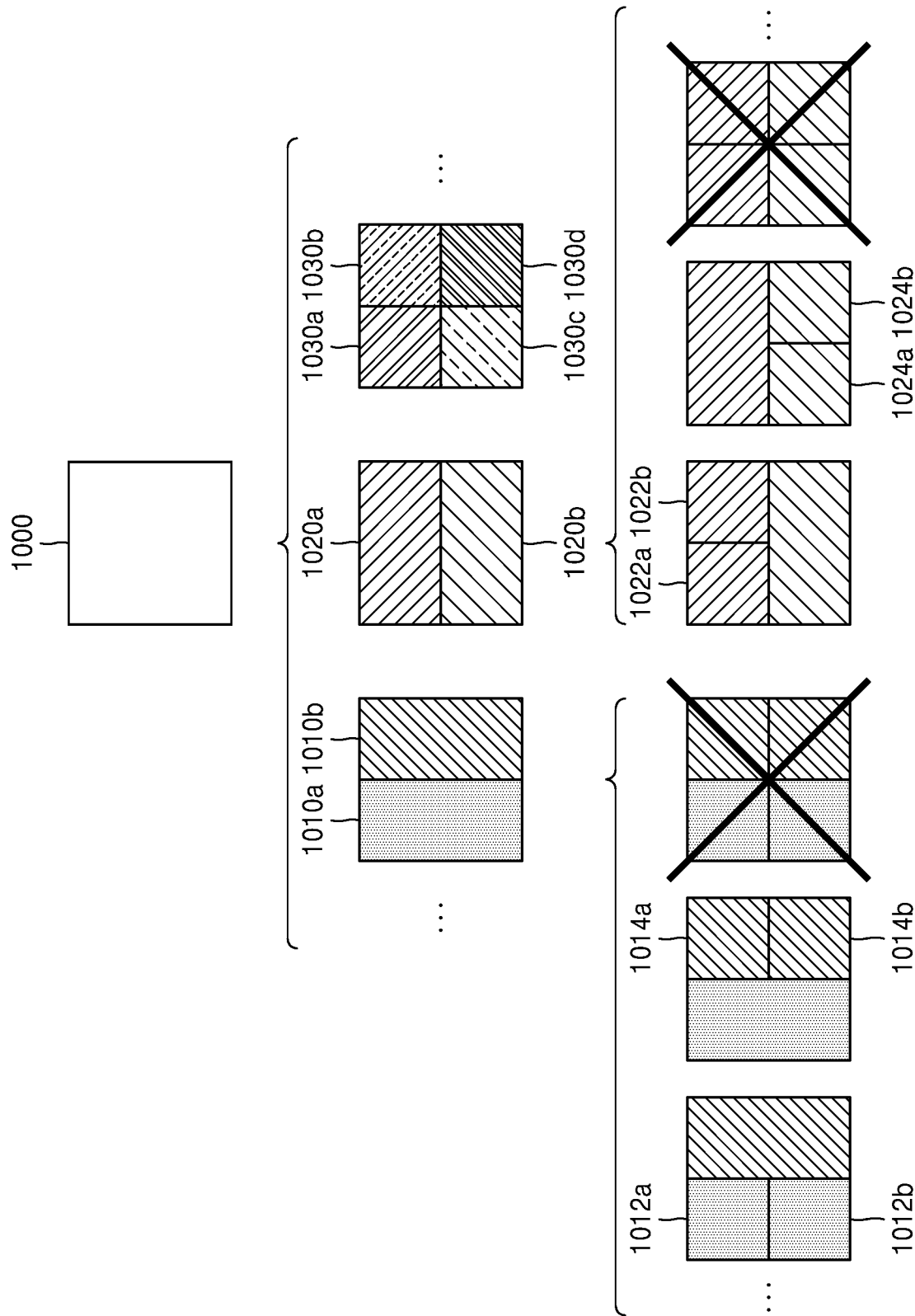
FIG. 10 illustrates that a shape into which a second coding unit is splittable by the image decoding apparatus is restricted when the second coding unit having a non-square shape, which is determined by splitting a first coding unit, satisfies a certain condition, according to an embodiment.

FIG. 10 illustrates that a shape into which a second coding unit is splittable by the image decoding apparatus 100 is restricted when the second coding unit having a non-square shape, which is determined by splitting a first coding unit 1000, satisfies a certain condition, according to an embodiment.

According to an embodiment, the image decoding apparatus 100 may determine to split the square first coding unit 1000 into non-square second coding units 1010a, 1010b, 1020a, and 1020b, based on at least one of block shape information and information about a split shape mode which is obtained by a receiver (not shown). The second coding units 1010a, 1010b, 1020a, and 1020b may be independently split. Accordingly, the image decoding apparatus 100 may determine to split or not to split the first coding unit 1000 into a plurality of coding units, based on at least one of the block shape information and the information about the split shape mode of each of the second coding units 1010a, 1010*b*, 1020*a*, and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* to not be split in a horizontal direction in which the left second coding unit 1010*a* is split. When third coding units 1014*a* and 1014*b* are determined by splitting the right second coding unit 1010*b* in the same direction, because the left and right second coding units 1010*a* and 1010*b* are independently split in a horizontal direction, the third coding units 1012*a*, 1012*b*, 1014*a*, and 1014*b* may be determined. However, this case serves equally as a case in which the image decoding apparatus 100 splits the first coding unit 1000 into four square second coding units 1030*a*, 1030*b*, 1030*c*, and 1030*d* based on at least one of the block shape information and the information about the split shape mode, and may be inefficient in terms of image decoding.

According to an embodiment, the image decoding apparatus 100 may determine third coding units 1022*a*, 1022*b*, 1024*a*, and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) to not be split in a vertical direction in which the upper second coding unit 1020*a* is split.

Figure 11:
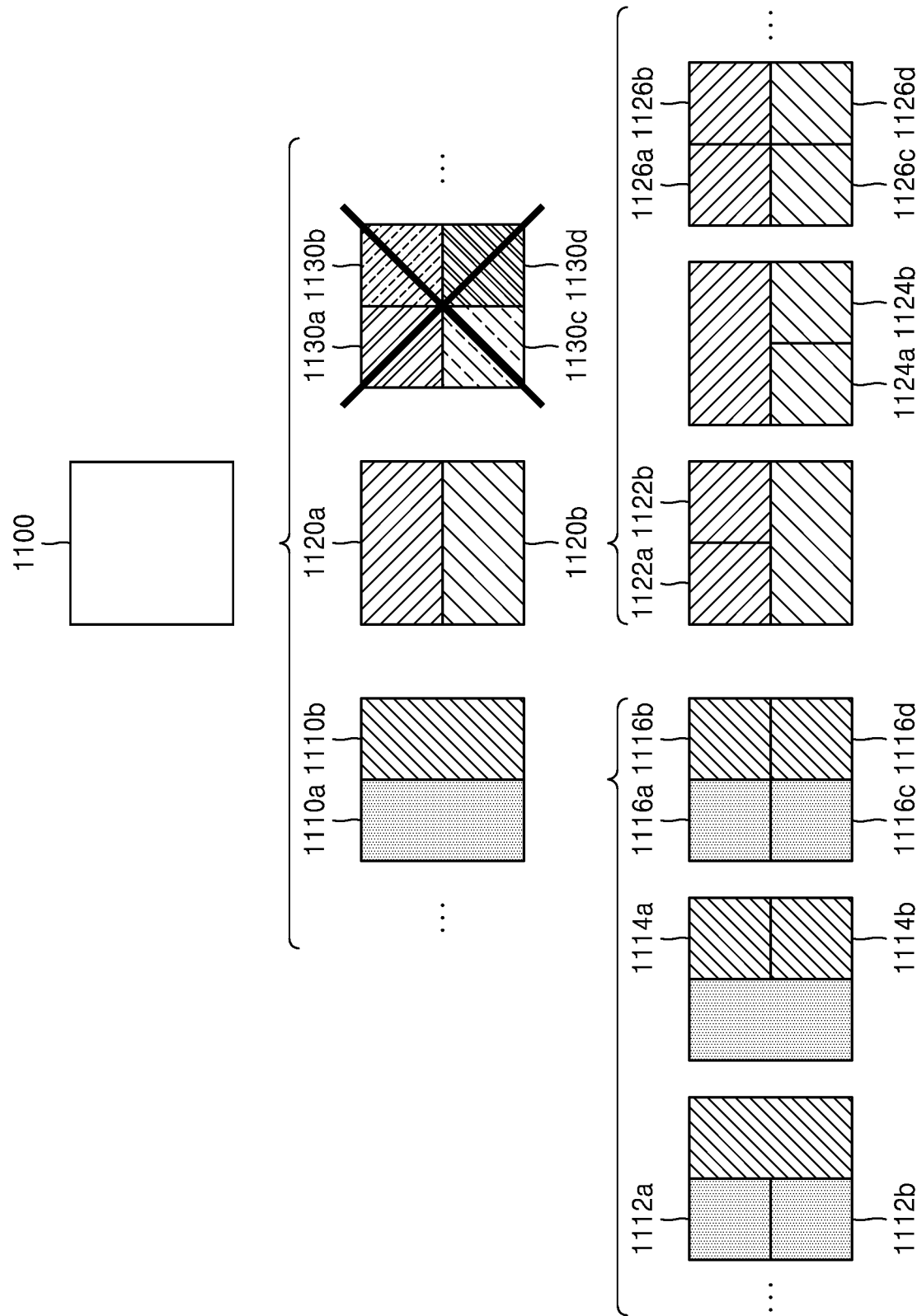
FIG. 11 illustrates a process by which the image decoding apparatus splits a square coding unit when information about a split shape mode indicates that the square coding unit is not to be split into four square coding units, according to an embodiment.

FIG. 11 illustrates a process by which the image decoding apparatus 100 splits a square coding unit when information about a split shape mode indicates that the square coding unit is not to be split into four square coding units, according to an embodiment.

According to an embodiment, the image decoding apparatus 100 may determine second coding units 1110*a*, 1110*b*, 1120*a*, 1120*b*, etc. by splitting a first coding unit 1100 based on at least one of block shape information and information about a split shape mode. The information about the split shape mode may include information about various methods of splitting a coding unit, but the information about various splitting methods may not include information for splitting a coding unit into four square coding units. According to such information about the split shape mode, the image decoding apparatus 100 may not split the first square coding unit 1100 into four square second coding units 1130*a*, 1130*b*, 1130*c*, and 1130*d*. The image decoding apparatus 100 may determine the non-square second coding units 1110*a*, 1110*b*, 1120*a*, 1120*b*, etc., based on the information about the split shape mode.

According to an embodiment, the image decoding apparatus 100 may independently split the non-square second coding units 1110*a*, 1110*b*, 1120*a*, 1120*b*, etc. Each of the second coding units 1110*a*, 1110*b*, 1120*a*, 1120*b*, etc. may be recursively split in a certain order, and this splitting method may correspond to a method of splitting the first coding unit 1100 based on at least one of the block shape information and the information about the split shape mode.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
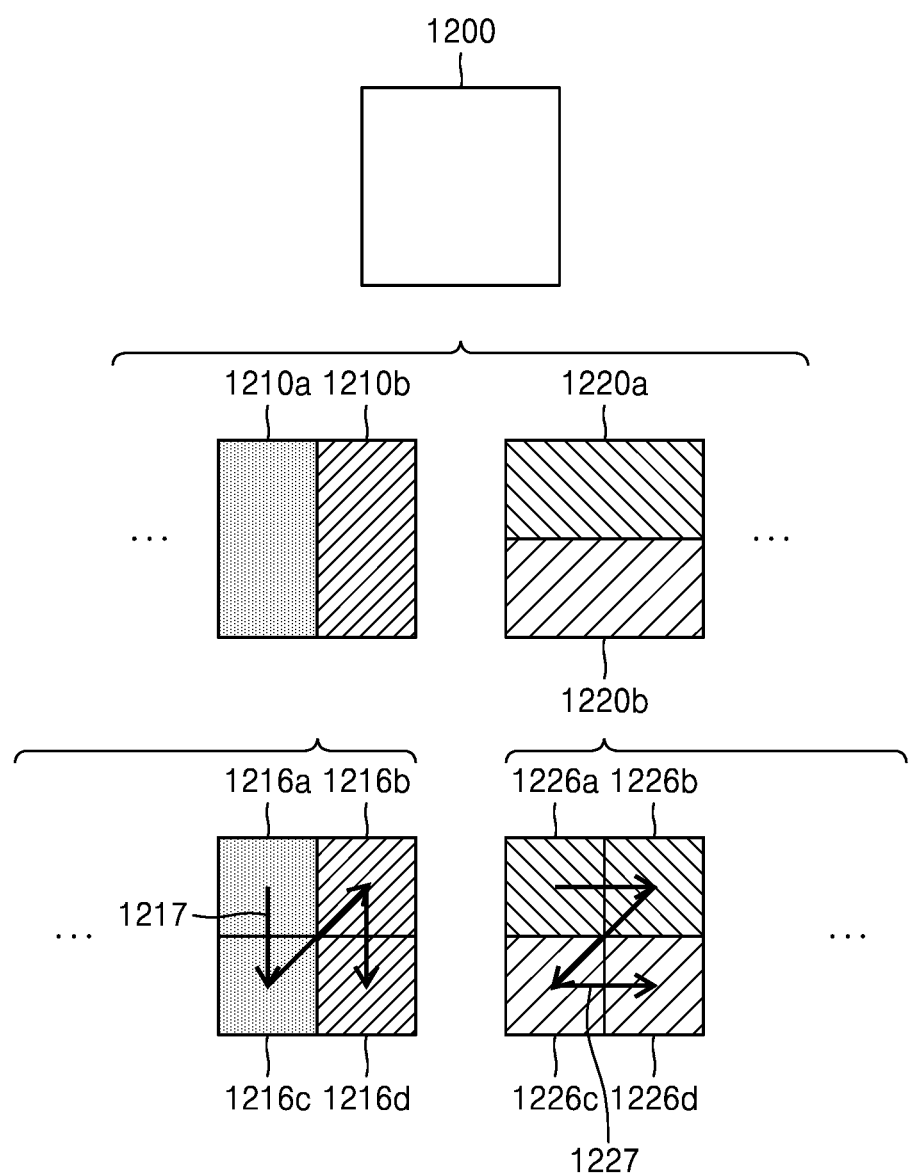
FIG. 12 illustrates that a processing order between a plurality of coding units may vary according to a process of splitting a coding unit, according to an embodiment.

FIG. 12 illustrates that a processing order between a plurality of coding units may vary according to a process of splitting a coding unit, according to an embodiment.

According to an embodiment, the image decoding apparatus 100 may split a first coding unit 1200 based on block shape information and information about a split shape mode. When the block shape information indicates a square shape and the information about the split shape mode indicates to split the first coding unit 1200 in at least one of horizontal and vertical directions, the image decoding apparatus 100 may determine second coding units 1210*a*, 1210*b*, 1220*a*, 1220*b*, etc. by splitting the first coding unit 1200. Referring to FIG. 12, the non-square second coding units 1210*a*, 1210*b*, 1220*a*, and 1220*b* determined by splitting the first coding unit 1200 in only a horizontal direction or vertical direction may be independently split based on the block shape information and the information about the split shape mode of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a horizontal direction. An operation of splitting the second coding units 1210*a*, 1210*b*, 1220*a*, and 1220*b* has been described above with reference to FIG. 11, and thus detailed descriptions thereof will be omitted.

According to an embodiment, the image decoding apparatus 100 may process coding units in a certain order. An operation of processing coding units in a certain order has been described above with reference to FIG. 7, and thus detailed descriptions thereof will be omitted. Referring to FIG. 12, the image decoding apparatus 100 may determine four square third coding units 1216*a*, 1216*b*, 1216*c*, and 1216*d*, or 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, or 1226*a*, 1226*b*, 1226*c*, and 1226*d*, based on a split shape by which the first coding unit 1200 is split.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a*, 1210*b*, 1220*a*, and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on at least one of the block shape information and the information about the split shape mode, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split to determine a plurality of coding units, according to an embodiment.

According to an embodiment, the image decoding apparatus 100 may determine the depth of the coding unit based on a certain criterion. For example, the certain criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302, a third coding unit 1304, etc. of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by dividing a width and a height of the first coding unit 1300 to ½ may have a size of N×N. Furthermore, the third coding unit 1304 determined by dividing a width and a height of the second coding unit 1302 to ½ may have a size of N/2×N/2. In this case, a width and a height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322, a third coding unit 1314 or 1324, etc. of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by dividing at least one of a width and a height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and a height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by dividing at least one of a width and a height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and a height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and a height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and a height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
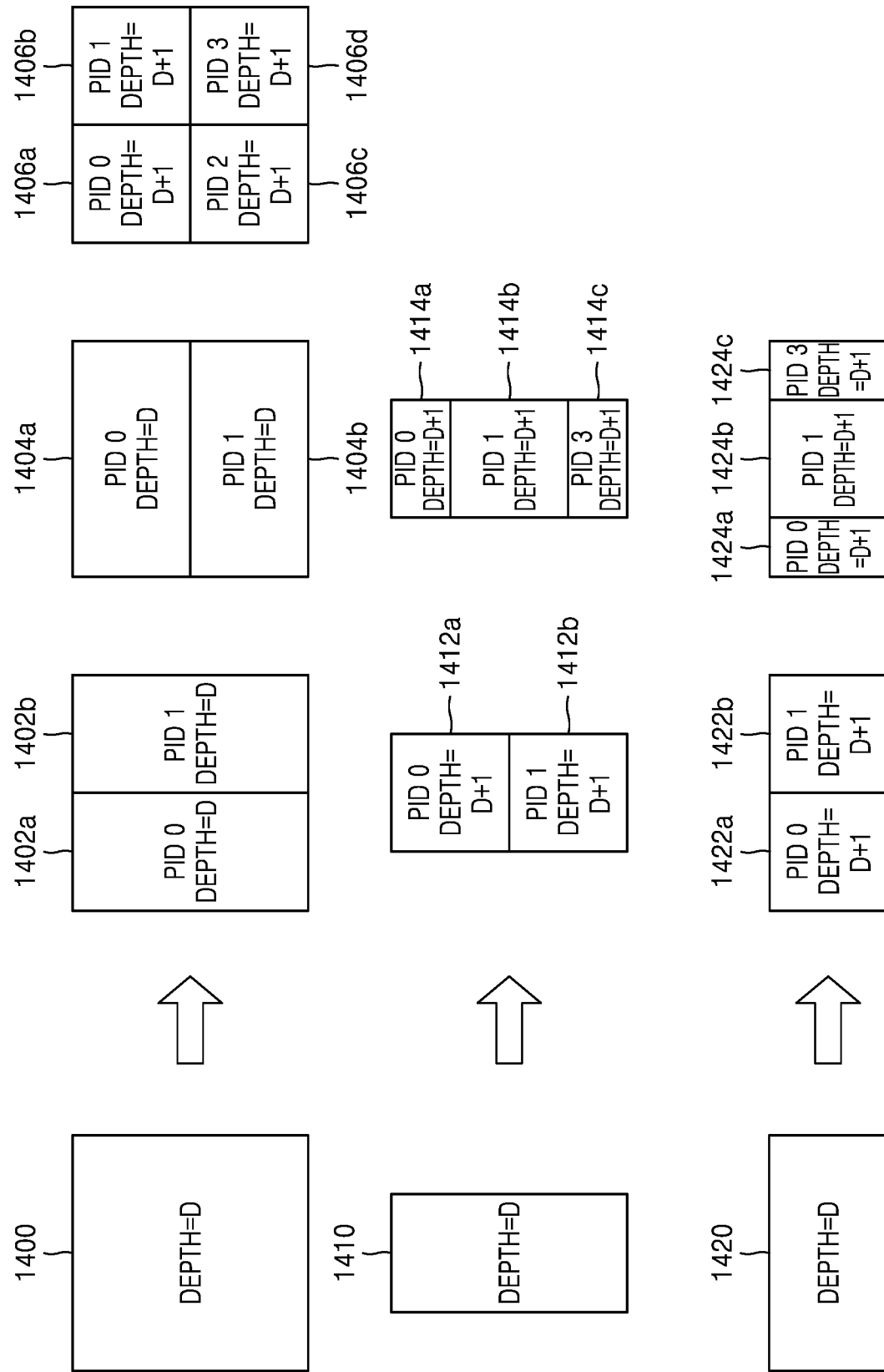
FIG. 14 illustrates depths that are determinable based on shapes and sizes of coding units and part indexes (PIDs) that are for distinguishing the coding units, according to an embodiment.

FIG. 14 illustrates depths that are determinable based on shapes and sizes of coding units and part indexes (PIDs) that are for distinguishing the coding units, according to an embodiment.

According to an embodiment, the image decoding apparatus 100 may determine various-shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on information about a split shape mode. That is, the image decoding apparatus 100 may determine the second coding units 1402a and 1402b, 1404a and 1404b, and 1406a, 1406b, 1406c, and 1406d, based on the information about the split shape mode of the first coding unit 1400.

According to an embodiment, depths of the second coding units 1402a and 1402b, 1404a and 1404b, and 1406a, 1406b, 1406c, and 1406d, which are determined based on the information about the split shape mode of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the information about the split shape mode, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the information about the split shape mode. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the information about the split shape mode.

According to an embodiment, a depth of the second coding units 1412a and 1412b, 1414a, 1414b, and 1414c, 1422a and 1422b, and 1424a, 1424b, and 1424c, which are determined based on the information about the split shape mode of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the information about the split shape mode. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, the coding unit 1414b of a center location among the odd number of split coding units 1414a, 1414b, and 1414c may have a width which is equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample of a certain location (e.g., a top left sample) of each coding unit.

According to an embodiment, the image decoding apparatus 100 may determine a coding unit at a certain location from among the split coding units, by using the PIDs for distinguishing the coding units. According to an embodiment, when the information about the split shape mode of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width which is equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the information about the split shape mode indicates to split a coding unit into an odd number of coding units, the image decoding apparatus 100 may split a current coding unit in such a manner that a coding unit of a certain location (e.g., a coding unit of a center location) among the odd number of coding units has a size different from that of the other coding units. In this case, the image decoding apparatus 100 may determine the coding unit of the center location, which has a different size, by using PIDs of the coding units. However, the PID and the size or location of the coding unit of the certain location to be determined are not limited to the above-described examples, and various PIDs and various locations and sizes of coding units may be used.

According to an embodiment, the image decoding apparatus 100 may use a certain data unit where a coding unit starts to be recursively split.

Figure 15:
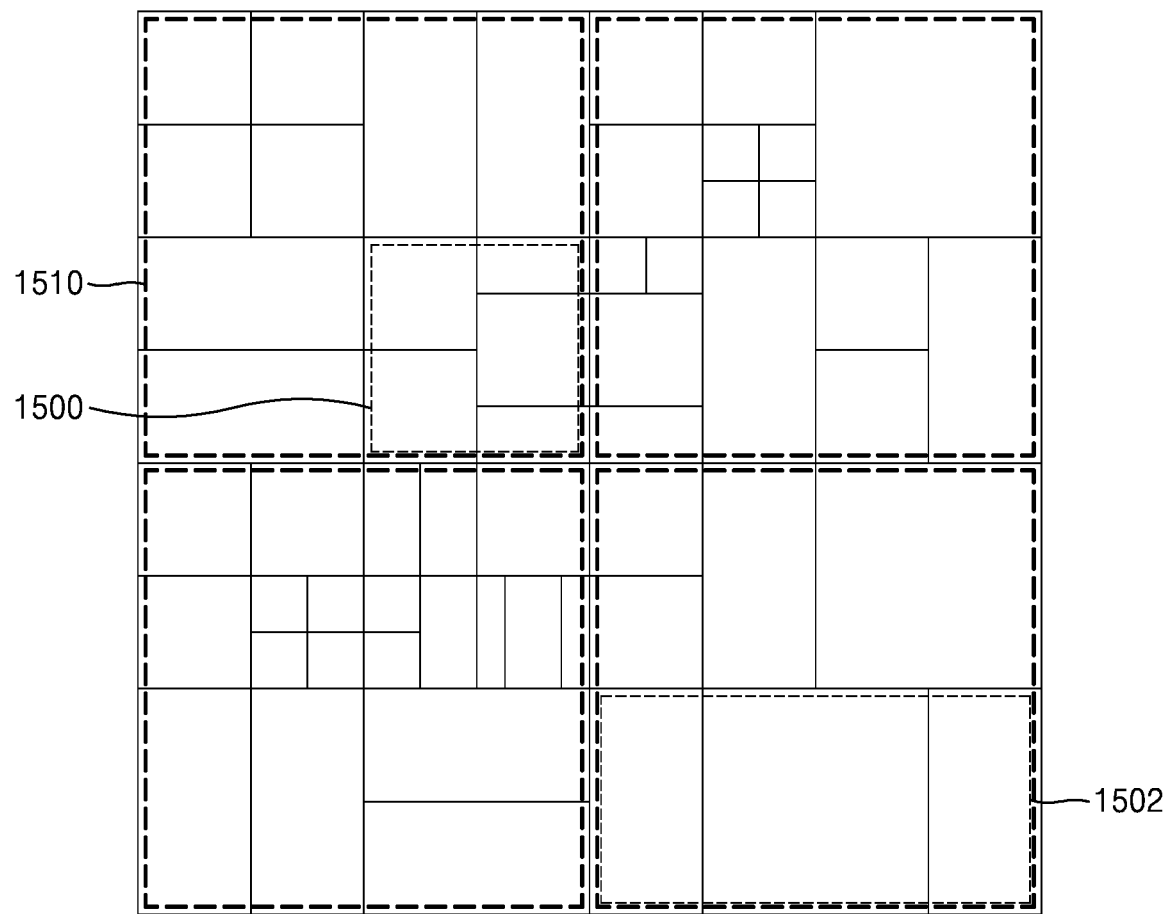
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using at least one of block shape information and information about a split shape mode. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, a reference coding unit may include M×N samples. Herein, M and N may be the same, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using information about a split shape mode of each reference data unit. The operation of splitting the reference data unit may correspond to a splitting operation using a quadtree structure.

According to an embodiment, the image decoding apparatus 100 may previously determine a minimum size allowed for the reference data units included in the current picture. Accordingly, the image decoding apparatus 100 may determine various reference data units having sizes equal to or greater than the minimum size, and may determine one or more coding units by using the block shape information and the information about the split shape mode with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, a receiver (not shown) of the image decoding apparatus 100 may obtain, from a bitstream, at least one of reference coding unit shape information and reference coding unit size information for each of the various data units. An operation of determining one or more coding units included in the square reference coding unit 1500 has been described above in relation to the operation of splitting the current coding unit 300 of FIG. 3, and an operation of determining one or more coding units included in the non-square reference coding unit 1502 has been described above in relation to the operation of splitting the current coding unit 400 or 450 of FIG. 4, and thus, detailed descriptions thereof will be omitted.

According to an embodiment, the image decoding apparatus 100 may use a PID for identifying the size and shape of reference coding units, to determine the size and shape of reference coding units according to some data units previously determined based on a certain condition. That is, the receiver (not shown) may obtain, from the bitstream, only the PID for identifying the size and shape of reference coding units for each slice, slice segment, or largest coding unit which is a data unit satisfying a certain condition (e.g., a data unit having a size equal to or smaller than a slice) among the various data units (e.g., sequences, pictures, slices, slice segments, largest coding units, or the like). The image decoding apparatus 100 may determine the size and shape of reference data units for each data unit, which satisfies the certain condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of the width and the height of the largest coding unit may be integer times at least one of the width and the height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the information about the split shape mode according to various embodiments.

Figure 16:
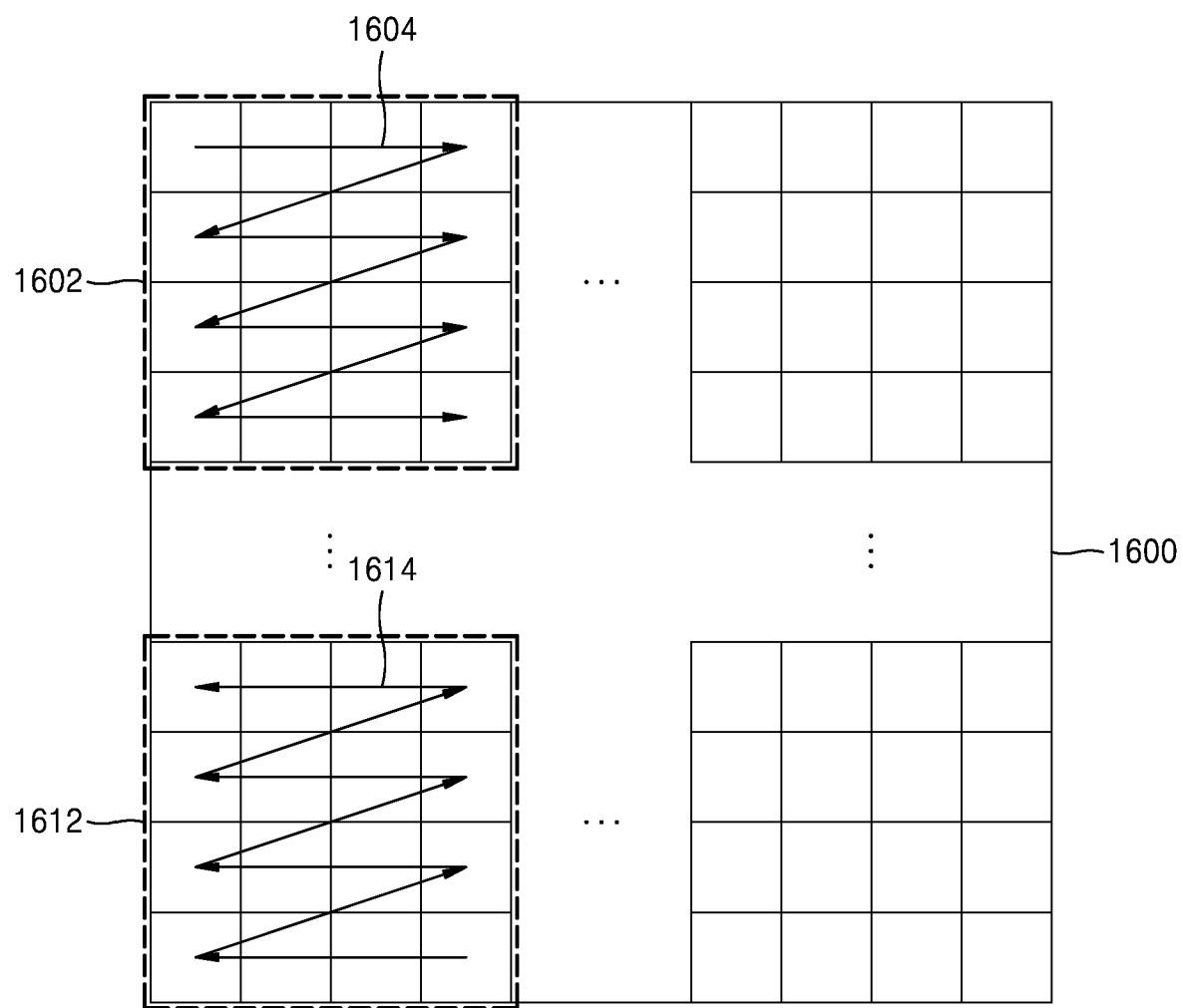
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined for each processing block, may be one of various orders, e.g., raster scan, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the image. The image decoding apparatus 100 may obtain the processing block size information from a bitstream and may determine the size of one or more processing blocks included in the image. The size of processing blocks may be a certain size of data units, which is indicated by the processing block size information.

According to an embodiment, the receiver (not shown) of the image decoding apparatus 100 may obtain the processing block size information from the bitstream according to each specific data unit. For example, the processing block size information may be obtained from the bitstream in a data unit such as an image, a sequence, a picture, a slice, or a slice segment. That is, the receiver (not shown) may obtain the processing block size information from the bitstream according to each of the various data units, the image decoding apparatus 100 may determine the size of one or more processing blocks, which are split from the picture, by using the obtained processing block size information, and the size of the processing blocks may be integer times that of the reference coding units.

According to an embodiment, the image decoding apparatus 100 may determine the size of processing blocks 1602 and 1612 included in the picture 2100 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the image decoding apparatus 100 may obtain, from the bitstream, determination order information about one or more reference coding units included in one or more processing blocks, and may determine a determination order of one or more reference coding units based on the obtained determination order information. The determination order information may be defined as an order or direction for determining the reference coding units in the processing block. That is, the determination order of reference coding units may be independently determined for each processing block.

According to an embodiment, the image decoding apparatus 100 may obtain, from the bitstream, the determination order information of reference coding units according to each specific data unit. For example, the receiver (not shown) may obtain the determination order information of reference coding units from the bitstream according to each data unit such as an image, a sequence, picture, a slice, a slice segment, or a processing block. Because the determination order information of reference coding units indicates an order for determining reference coding units in a processing block, the determination order information may be obtained for each specific data unit including an integer number of processing blocks.

According to an embodiment, the image decoding apparatus 100 may determine one or more reference coding units based on the determined determination order.

According to an embodiment, the receiver (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained for each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to the raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or information about a split shape mode indicating a splitting method of the current coding unit, from the bitstream, and may use the obtained information. The block shape information or the information about the split shape mode may be included in the bitstream related to various data units. For example, the image decoding apparatus 100 may use the block shape information of the information about the split shape mode included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the information about the split shape mode according to each largest coding unit, each reference coding unit, or each processing block, and may use the obtained syntax element.

An image encoding apparatus, an image decoding apparatus, an image encoding method, and an image decoding method for encoding or decoding an image by performing deblocking filtering on a boundary of a reconstruction block of a block (e.g., a coding unit, a prediction unit, or a transform unit) determined in any of various shapes according to various embodiments will be described with reference to FIGS. 17A through 26.

FIGS. 17A through 17D are diagrams for describing a process of performing deblocking filtering on a boundary of a reconstruction block, according to various embodiments.

Figure 17A:
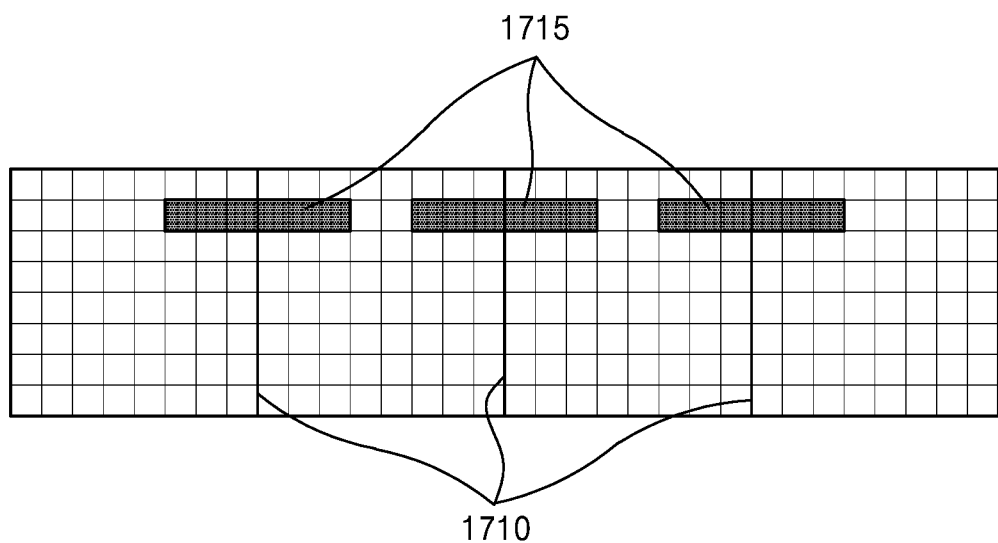
FIGS. 17A through 17D are diagrams for describing a process of performing deblocking filtering on a boundary of a reconstruction block, according to various embodiments.

Referring to FIG. 17A, the image decoding apparatus 100 may perform deblocking filtering on three pixels 1715 on either side of a vertical block boundary 1710 in each 8×8 unit. When the image decoding apparatus 100 allows only quad split from among split types, and blocks of a coding unit, a prediction unit, or a transform unit are determined based on a split type, each block boundary is located only at a point corresponding to a multiple of 8 except a block having a size of 4×4, and thus the image decoding apparatus 100 may perform deblocking filtering at most block boundaries.

Figure 17B:
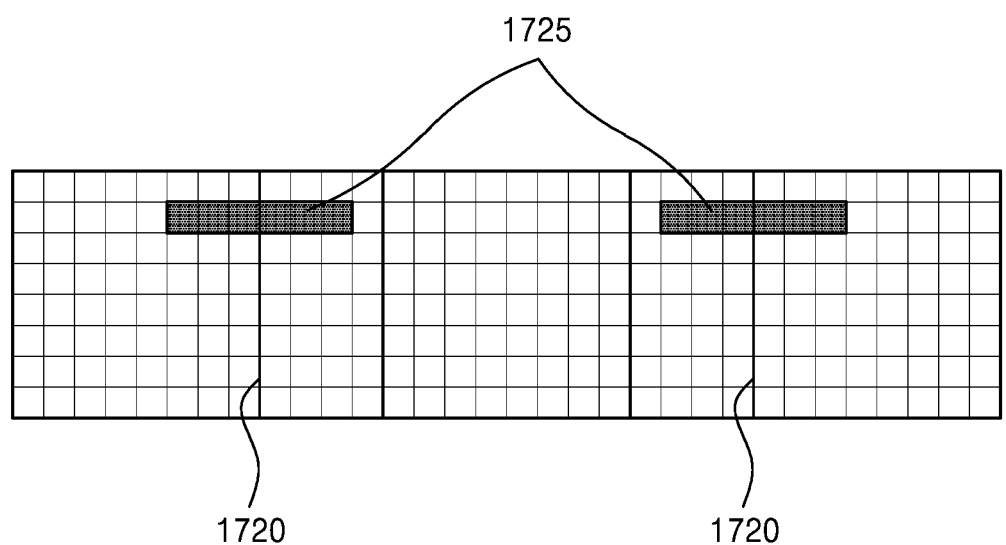

Referring to FIG. 17B, the image decoding apparatus 100 may perform deblocking filtering on three pixels 1725 on either side of a block boundary 1720 in each 8×8 unit. When the image decoding apparatus 100 allows tri-split and binary split as well as quad split as available split types, blocks having sizes of 8×4 and 16×4 may be determined, and in this case, deblocking filtering may not be performed at some block boundaries.

Figure 17C:
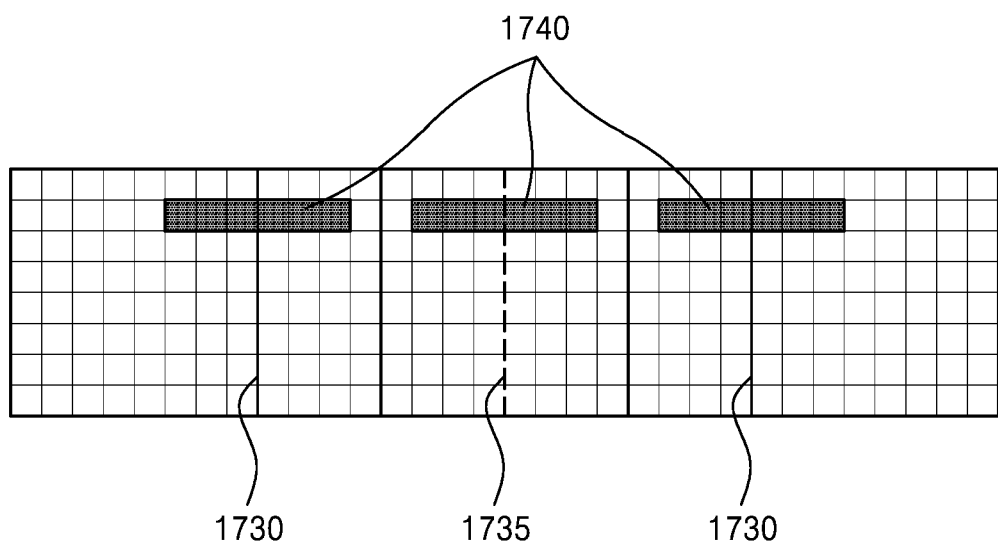

Referring to FIG. 17C, the image decoding apparatus 100 may perform deblocking filtering at each of boundaries 1730 and 1735 of 8×8 units. The image decoding apparatus 100 may perform deblocking filtering on three pixels 1740 on either side of each of the boundaries 1730 and 1735 of 8×8 units. When the image decoding apparatus 100 allows tri-split and binary split as well as quad split as available split types, blocks having sizes of 8×4 and 16×4 may be determined, and in this case, deblocking filtering may not be performed at some block boundaries and deblocking filtering may be performed at the boundary 1735 of a 8×8 unit other than a block boundary.

Figure 17D:
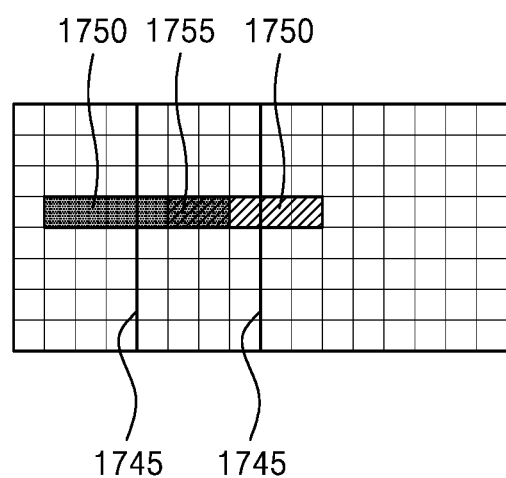

Referring to FIG. 17D, the image decoding apparatus 100 may perform deblocking filtering on three pixels 1750 on either side of a block boundary 1745 in each 4×4 unit. In this case, filtering may be performed twice on the pixels 1750 due to deblocking filtering of the block boundaries 1745 located on both sides. In this case, a deblocking filtering result value may vary according to a deblocking filtering order during deblocking filtering of the block boundaries 1745, and thus dependency on the deblocking filtering order occurs, thereby making it difficult to perform deblocking filtering in parallel.

Figure 18:
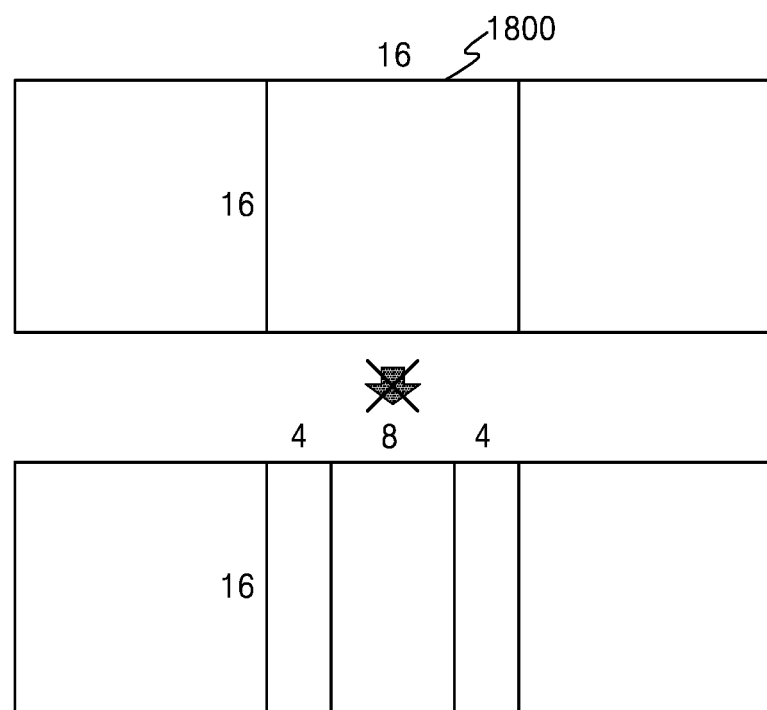
FIG. 18 is a diagram for describing a process of limiting a split shape mode of a block indicating a tri-split type in consideration of a size of a unit for deblocking filtering.

FIG. 18 is a diagram for describing a process of limiting a split shape mode of a block indicating a tri-split type in consideration of a size of a unit for deblocking filtering.

Referring to FIG. 18, when the image decoding apparatus 100 splits a reconstruction block 1800 having a size of 16×16 based on a tri-split type, blocks having sizes of 8×4 and 4×8 may be determined, and in this case, when deblocking filtering is performed at a block boundary in each 8×8 unit, deblocking filtering is not performed at a boundary of an intermediate block. Accordingly, the image decoding apparatus 100 may limit a split shape mode indicating a vertical tri-split type from among available block split modes of the reconstruction block 1800 so that a block boundary is not located at a point corresponding to a multiple of 4 other than a multiple of 8, and may split the reconstruction block 1800 by using one of the remaining available block split modes. The image decoding apparatus 100 may perform deblocking filtering at a boundary of a reconstruction block by limiting a split shape mode so that the boundary of the reconstruction block is located at a boundary of a unit for performing deblocking filtering.

Figure 19A:
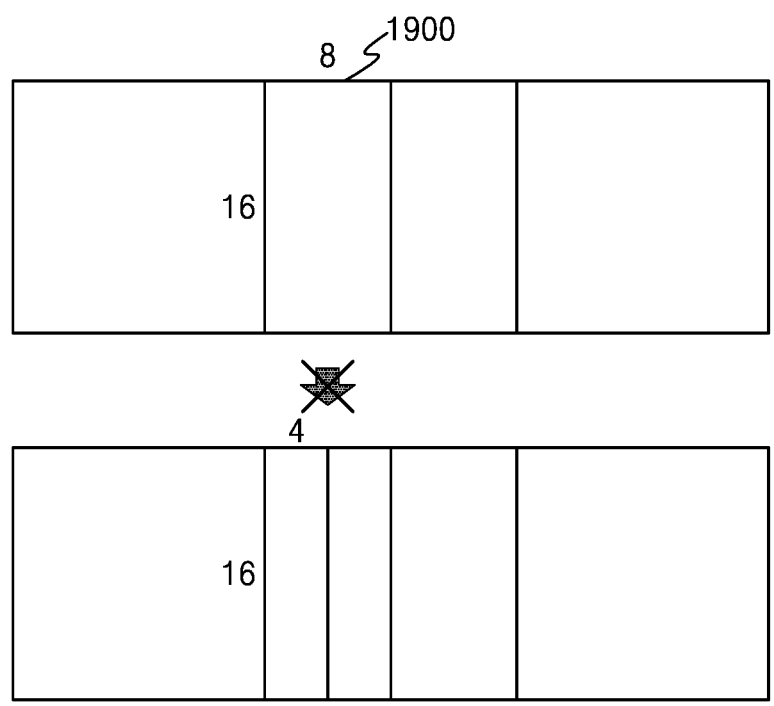
FIGS. 19A and 19B are diagrams for describing a process of limiting a split shape mode of a block of a binary split type in consideration of a size of a unit for deblocking filtering.
Figure 19B:
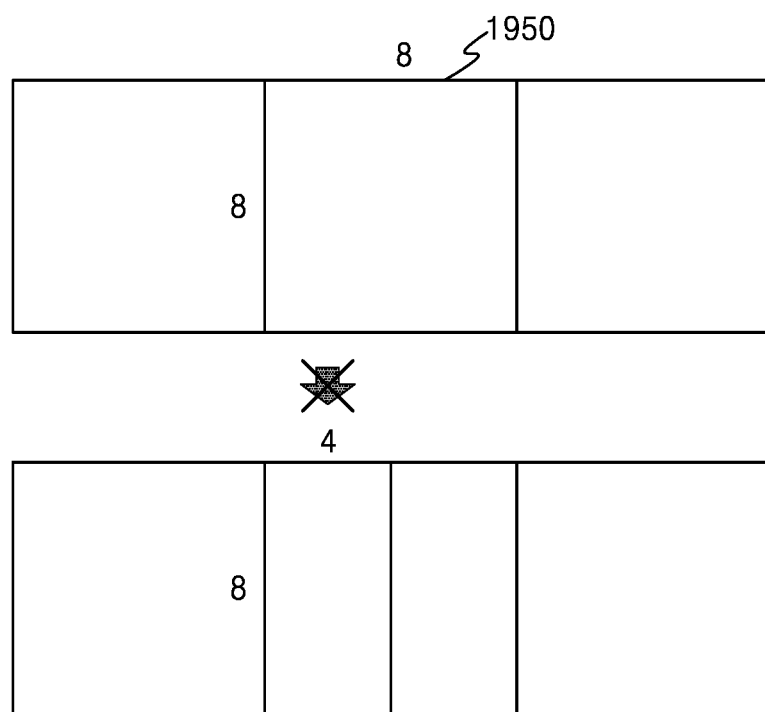

FIGS. 19A and 19B are diagrams for describing a process of limiting a split shape mode of a block of a binary split type in consideration of a size of a unit for deblocking filtering.

Referring to FIG. 19A, when the image decoding apparatus 100 splits a reconstruction block 1900 having a size of 8×16 based on a tri-split type, a block having a size of 4×16 may be determined, and in this case, when deblocking filtering is performed at a block boundary in each 8×8 unit, deblocking filtering is not performed at some block boundaries. Accordingly, the image decoding apparatus 100 may limit a split shape mode indicating a vertical binary split type from among available split shape modes of the reconstruction block 1900 so that a block boundary is not located at a point corresponding to a multiple of 4 other than a multiple of 8, and may split the reconstruction block 1900 by using one of the remaining available block split modes. The image decoding apparatus 100 may perform deblocking filtering at a boundary of a reconstruction block by limiting a split shape mode so that the boundary of the reconstruction block is located at a boundary of a unit for performing deblocking filtering.

Referring to FIG. 19B, when the image decoding apparatus 100 splits a reconstruction block 1950 having a size of 8×8 based on a bi-split type, a block having a size of 4×8 may be determined, and in this case, when deblocking filtering is performed at a block boundary in each 8×8 unit, deblocking filtering is not performed at some block boundaries. Accordingly, the image decoding apparatus 100 may limit a split shape mode indicating a vertical binary split type from among available split shape modes of the reconstruction block 1950 so that a block boundary is not located at a point corresponding to a multiple of 4 other than a multiple of 8, and may split the reconstruction block 1950 by using one of the remaining available block split modes. The image decoding apparatus 100 may perform deblocking filtering at a boundary of a reconstruction block by limiting a split shape mode so that the boundary of the reconstruction block is located at a boundary of a unit for performing deblocking filtering.

As described with reference to FIGS. 19A and 19B, the image decoding apparatus 100 may perform deblocking filtering at a boundary of a reconstruction block by limiting a split shape mode so that the boundary of the reconstruction block is located at a boundary of a unit for performing deblocking filtering. However, the limited split shape mode is not limited thereto, and modifications may be made. For example, a split shape mode may be limited when a size of a block determined based on the split shape mode is 8×4 or 16×4 and thus at least one of a height and a width corresponds to a multiple of 4 other than a multiple of 8.

Figure 20A:
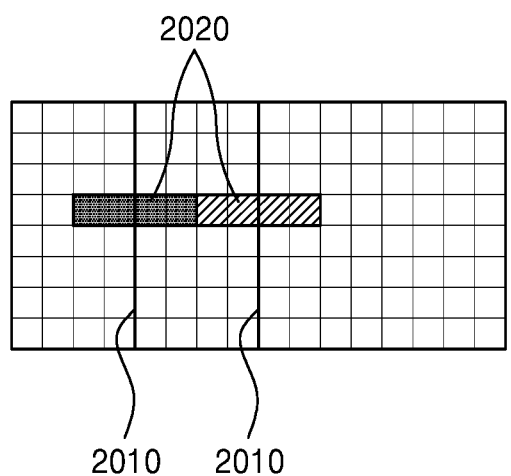
FIGS. 20A and 20B are diagrams for describing a process of determining the number of pixels whose pixel values are changed by deblocking filtering at a block boundary in consideration of a size of a block, according to various embodiments.
Figure 20B:
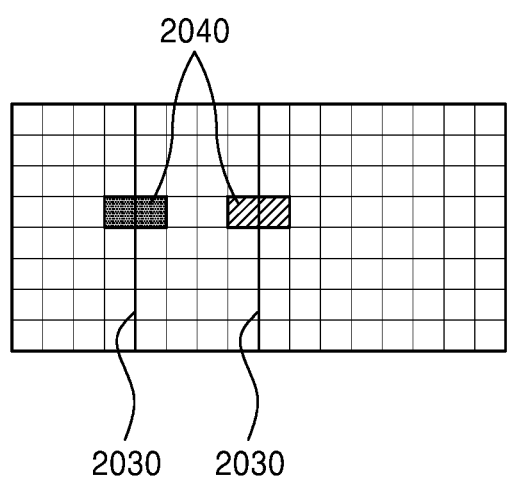

FIGS. 20 and 20B are diagrams for describing a process of determining the number of pixels whose pixel values are changed by deblocking filtering at a block boundary in consideration of a size of a block, according to various embodiments.

Referring to FIG. 20A, when the image decoding apparatus 100 performs deblocking filtering on a block boundary in units of rows in each 4×4 unit, and a width of one block from among reconstruction blocks located on both sides of a vertical block boundary 2010 is 4, the image decoding apparatus 100 may perform deblocking filtering on two pixels 2020 located on either side of the vertical block boundary 2010 to change pixel values of the two pixels 2020.

Referring to FIG. 20B, when the image decoding apparatus 100 performs deblocking filtering on a block boundary in units of rows in each 4×4 unit, and a width of one block from among reconstruction blocks located on both sides of a vertical block boundary 2030 is 4, the image decoding apparatus 100 may perform deblocking filtering on one pixel 2040 located on either side of the vertical block boundary 2030 to change a pixel value of the pixel 2040.

As described with reference to FIGS. 20A and 20B, when the image decoding apparatus 100 performs deblocking filtering in units of rows or columns in each 4×4 unit, the image decoding apparatus 100 adaptively determines the number of pixels whose pixel values are changed according to deblocking filtering based on a vertical (horizontal) boundary of reconstruction blocks, based on sizes of blocks located on both sides of the boundary. Accordingly, even when deblocking filtering is performed on adjacent boundaries in the same direction, pixels whose pixel values are changed may not overlap each other, and thus dependency on a deblocking filtering order on adjacent boundaries in the same direction may be removed. As a result, the image decoding apparatus 100 may perform deblocking filtering in parallel on adjacent boundaries in the same direction.

Figure 21A:
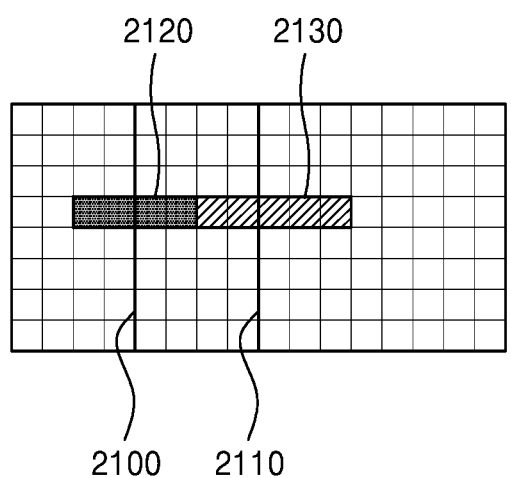
FIGS. 21A and 21B are diagrams for describing a process of determining the number of pixels whose pixel values are changed by deblocking filtering at a block boundary in consideration of sizes of blocks on both sides of the block boundary, according to various embodiments.
Figure 21B:
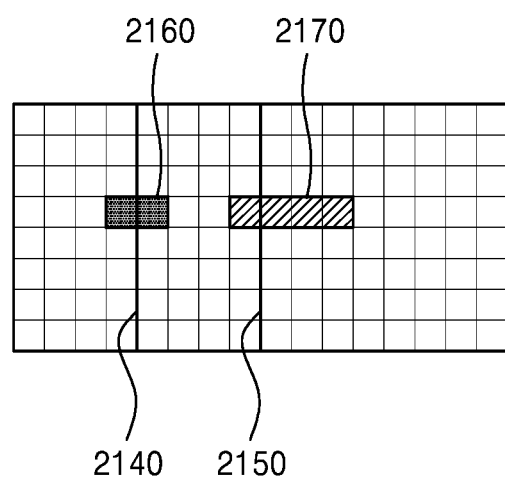

FIGS. 21A and 21B are diagrams for describing a process of determining the number of pixels whose pixel values are changed by deblocking filtering at a block boundary in consideration of sizes of blocks on both sides of the block boundary, according to various embodiments.

Referring to FIG. 21A, when the image decoding apparatus 100 performs deblocking filtering in units of rows on a block boundary in each 4×4 unit, and a width of a block located on either side from among reconstruction blocks located on both sides of a vertical block boundary 2100 is 4, the image decoding apparatus 100 may reference two pixels 2120 on either side of the vertical block boundary 2100 to apply deblocking filtering and may change pixel values of the two pixels 2120.

When the image decoding apparatus 100 performs deblocking filtering in units of rows on a block boundary in each 4×4 unit, and a width of a block located on the left from among reconstruction blocks located on both sides of a vertical block boundary 2110 is 4, the image decoding apparatus 100 may reference two pixels on the left of the vertical block boundary 2110 and four pixels on the right of the vertical block boundary 2110 to apply deblocking filtering, and may perform deblocking filtering on two pixels on the left of the vertical block boundary 2110 and three pixels 2130 on the right of the vertical block boundary 2110 to change pixel values of the pixels.

Referring to FIG. 21B, when the image decoding apparatus 100 performs deblocking filtering in units of rows on a block boundary in each 4×4 unit, and a width of a block located on either side from among reconstruction blocks located on both sides of a vertical block boundary 2140 is 4, the image decoding apparatus 100 may reference one pixel 2160 located on either side of the vertical block boundary 2140 to apply deblocking filtering and may change a pixel value of the pixel 2160.

When the image decoding apparatus 100 performs deblocking filtering on a block boundary in units of rows in each 4×4 unit, and a width of a block located on the left from among reconstruction blocks located on both sides of a vertical block boundary 2150 is 4, the image decoding apparatus 100 may reference one pixel on the left of the vertical block boundary 2150 and four pixels on the right of the vertical block boundary 2150 to apply deblocking filtering, and may perform deblocking filtering on one pixel on the left of the vertical block boundary 2150 and three pixels 2170 on the right of the vertical block boundary 2150 to change pixel values of the pixels.

Figure 22:
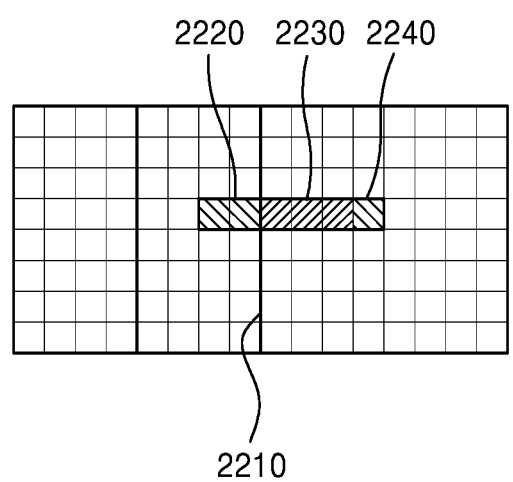
FIG. 22 is a diagram for describing a process of determining the number of pixels whose pixel values are changed or the number of referenced pixels in consideration of sizes of blocks on both sides of the block boundary, according to various embodiments.

FIG. 22 is a diagram for describing a process of determining the number of pixels whose pixel values are changed by deblocking filtering at a block boundary or the number of referenced blocks in consideration of sizes of blocks on both sides of the block boundary, according to various embodiments.

Referring to FIG. 22, when the image decoding apparatus 100 performs deblocking filtering in units of rows on a block boundary in each a 4×4 unit, and a width of a block located on the left of a vertical block boundary 2210 is 4 and a width of a block located on the right of the vertical block boundary 2210 is 8, the image decoding apparatus 100 may reference two pixels 2220 on the left of the vertical block boundary 2210 for the block located on the left and may not apply deblocking filtering to the block located on the left. For the block located on the right, the image decoding apparatus 100 may reference four pixels 2240 on the right of the vertical block boundary 2210, and may perform deblocking filtering on three pixels 2230 on the right of the vertical block boundary 2210 to change pixel values of the pixels 2230.

Figure 23A:
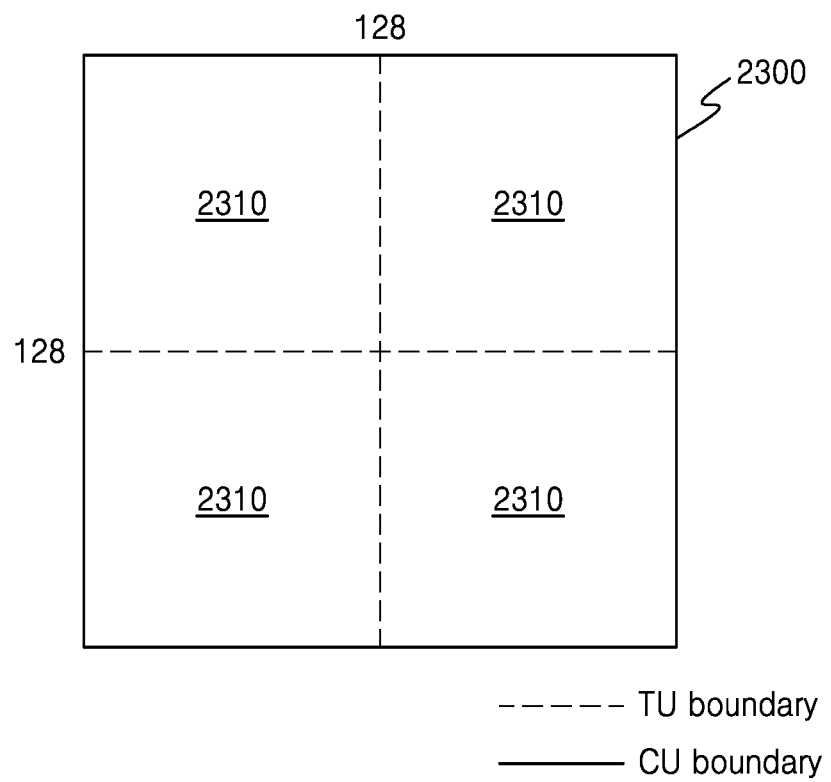
FIGS. 23A and 23B are diagrams for describing a process by which an image decoding apparatus performs deblocking filtering on a boundary of a block of a transform unit, according to various embodiments.
Figure 23B:
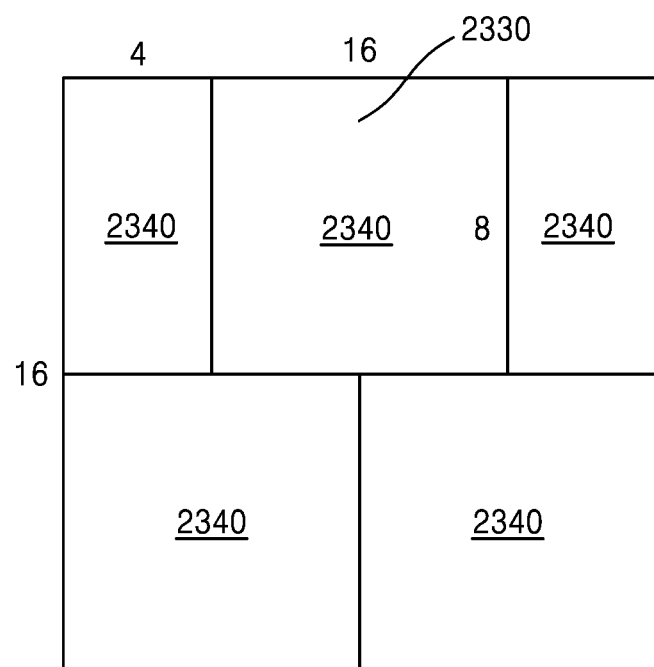

FIGS. 23A and 23B are diagrams for describing a process by which an image decoding apparatus performs deblocking filtering on a boundary of a block of a transform unit, according to various embodiments.

FIG. 23A is a diagram for describing a process by which an image decoding apparatus performs deblocking filtering on a boundary of a block of a transform unit according to an embodiment.

Referring to FIG. 23, when a size of a coding unit 2300 is 128×128, and a maximum size of a transform unit is 64, four transform units 2310 each having a size of 64×64 may be determined from the coding unit 2300.

That is, when a size of a coding unit is greater than a maximum size of a transform unit, the coding unit and the transform unit may not have the same size, and the coding unit may include a plurality of transform units. When a boundary of the coding unit is not matched to a boundary of the transform unit, the image decoding apparatus 100 may perform deblocking filtering on a boundary of a block of the transform unit.

FIG. 23B is a diagram for describing a process by which an image decoding apparatus performs deblocking filtering on a boundary of a block of a transform unit according to another embodiment.

When a maximum size of the transform unit is 64, and a size of a coding unit 2340 is equal to or less than the maximum size of the transform unit, the size of the coding unit 2340 may be same as a size of the transform unit 2340. That is, the image decoding apparatus 100 may perform deblocking filtering on a boundary of the transform unit 2340. Accordingly, when compared to a case where the image decoding apparatus 100 performs deblocking filtering at a block boundary of an 8×8 unit, the image decoding apparatus 100 may perform deblocking filtering even at a block boundary not matched to the 8×8 unit.

As described with reference to FIGS. 23A and 23B, the image decoding apparatus 100 may perform deblocking filtering on a boundary of a transform unit. However, the image decoding apparatus 100 may determine whether there is no residual information in blocks located on both sides of a boundary of a transform unit, and when it is determined that there is no residual information in the blocks located on both sides of the boundary of the transform unit, the image decoding apparatus 100 may determine whether deblocking filtering is performed on the boundary of the transform unit based on information about the blocks.

For example, when motion vectors on both sides of a boundary of a transform unit are different from each other, the image decoding apparatus 100 may perform that deblocking filtering is performed on the boundary of the transform unit. When a mode of at least one block from among blocks on both sides of a boundary of a transform unit is a predetermined mode such as an affine model based motion compensation mode or a sub-block prediction mode, the image decoding apparatus 100 may perform deblocking filtering on the boundary of the transform unit. When intra prediction modes of blocks on both sides of a boundary of a transform unit are different from each other, the image decoding apparatus 100 may perform deblocking filtering on the boundary of the transform unit.

When illumination compensation parameters on both sides of a boundary of a transform unit are different from each other, the image decoding apparatus 100 may perform deblocking filtering on the boundary of the transform unit. When modes of blocks on both sides of a boundary of a transform unit are different from each other, the image decoding apparatus 100 may perform deblocking filtering on the boundary of the transform unit. For example, when modes of blocks on both sides of a boundary of a transform unit are different from each other, for example, an inter mode and an intra mode, a combined inter-intra prediction mode and an inter mode, or a combined inter-intra prediction mode and an intra mode, the image decoding apparatus 100 may perform deblocking filtering.

Figure 24A:
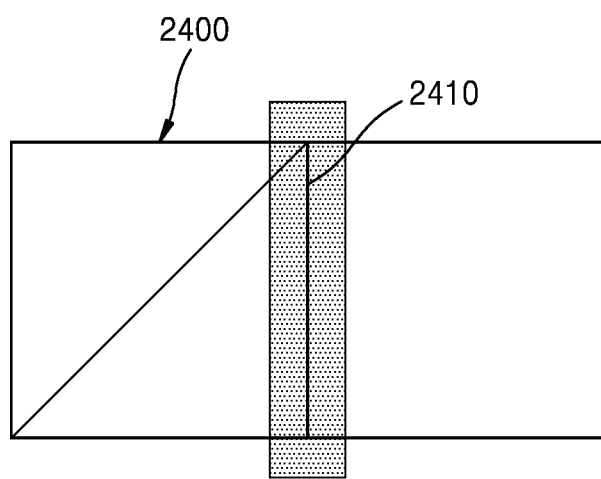
FIGS. 24A and 24B are diagrams for describing a process by which the image decoding apparatus 100 performs deblocking filtering on blocks having a triangular partition shape, according to various embodiments.
Figure 24B:
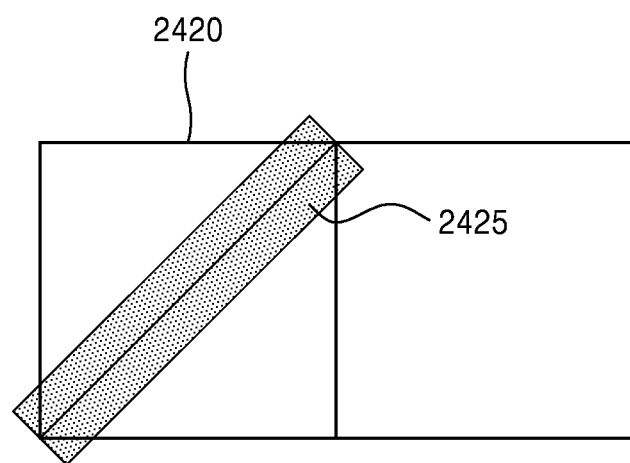

FIGS. 24A and 24B are diagrams for describing a process by which the image decoding apparatus 100 performs deblocking filtering on blocks having a triangular partition shape, according to various embodiments.

Referring to FIG. 24A, when at least one block adjacent to a boundary is a block 2400 having triangular partitions, the image decoding apparatus 100 may perform deblocking filtering on a block boundary 2410. The image decoding apparatus 100 may determine whether deblocking filtering is performed in consideration residual information of blocks adjacent to both sides of the block boundary 2410. Also, the image decoding apparatus 100 may determine whether deblocking filtering is performed in consideration of sizes of heights or widths of blocks adjacent to both sides of the block boundary 2410, and maximum values or minimum values of the two values.

Referring to FIG. 24B, when at least one block adjacent to a boundary is a block 2420 having triangular partitions, the image decoding apparatus 100 may perform deblocking filtering on a boundary 2425 between triangular partitions. When a height or a width of the block 2420 is equal to or greater or equal to or less than a specific height or width, the image decoding apparatus 100 may perform deblocking filtering on the boundary 2425 between triangular partitions.

Figure 25:
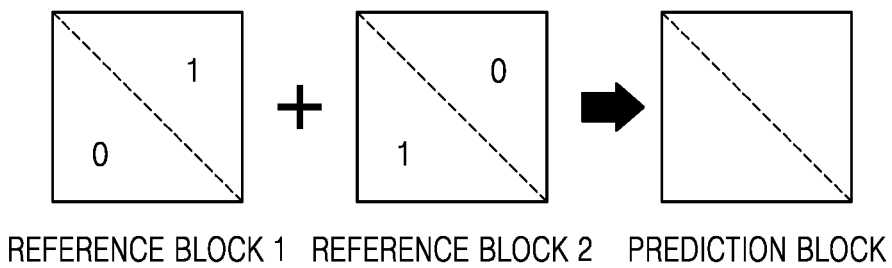
FIG. 25 is a diagram for describing a process by which the image decoding apparatus 100 performs bidirectional inter prediction on a block having triangular partitions, according to an embodiment.

FIG. 25 is a diagram for describing a process by which the image decoding apparatus 100 performs bidirectional inter prediction on a block having triangular partitions, according to an embodiment.

Referring to FIG. 25, when a block has a triangular partition shape, the image decoding apparatus 100 may generate a prediction block of the block by performing bidirectional inter prediction on triangular partitions. In this case, the image decoding apparatus 100 may variously determine weights of reference triangular partitions included in two reference blocks (e.g., a first reference block and a second reference block) of both directions. For example, referring to FIG. 25, a weight of a first reference triangular partition (left partition) of the first reference block may be 0, a weight of a second reference triangular partition (right partition) of the first reference block may be 1, a weight of a first reference triangular partition (left partition) of the second reference block may be 1, and a weight of a second reference triangular partition (right partition) of the second reference block may be 0.

Alternatively, a weight of a first reference triangular partition of the first reference block may be ¼, a weight of a second reference triangular partition of the first reference block may be ¾, a weight of a first reference triangular partition of the second reference block may be ¾, and a weight of a second reference triangular partition of the second reference block may be ¼. Various other weights of triangular partitions may be determined.

A weight of each reference triangular partition may be, but not limited to, a predetermined value, and the image decoder 110 may obtain a weight of each reference triangular partition from information about weights included in a bitstream. In this case, a weight of a triangular partition may be determined to be one weight from among one or more weight candidates. In this case, index information indicating one of the one or more weight candidates may be obtained from the bitstream. The weight candidates may be determined for each block, but the present disclosure is not limited thereto. The weight candidate may be determined for each reference block or for each reference triangular partition.

However, a block is not limited to having a triangular partition shape, and may have a partition mask shape including partitions having various shapes such as a quadrangular shape. In this case, a shape of a partition mask of a block may be determined to be one of one or more partition mask shape candidates. In this case, index information indicating one of the one or more mask shape candidates may be obtained from the bitstream.

Various embodiments have been described. It will be understood by one of ordinary skill in the art that various changes in form and details may be made therein without departing from the spirit and scope of the present disclosure. The disclosed embodiments should be considered in descriptive sense only and not for purposes of limitation. Therefore, the scope of the disclosure is defined not by the detailed description of the disclosure but by the appended claims, and all differences within the scope will be construed as being included in the present disclosure.

Meanwhile, the embodiments of the present disclosure may be implemented as a computer-executable program, and may be executed by a general-purpose digital computer that operates the program using a computer-readable recording medium. Examples of the computer-readable recording medium may include magnetic storage media (e.g., read-only memories (ROMs), floppy disks, or hard disks) and optical reading media (e.g., compact disk read-only memories (CD-ROMs) or digital versatile disks (DVDs)).

What is claimed is:

1. An image decoding method comprising:
   when a prediction mode of a first coding unit is a combined inter-intra prediction mode, determining a first prediction block of the first coding unit by using a weighted sum of a first sample value according to intra-prediction and a second sample value according to inter-prediction;
   when the prediction mode of the first coding unit is the combined inter-intra prediction mode, determining a value of a boundary filtering strength applied to a boundary between a first reconstruction block and a second reconstruction block, wherein the value of the boundary filtering strength is equal to a value of a boundary filtering strength used when the prediction mode of the first coding unit is an intra prediction mode; and
   performing deblocking filtering on samples adjacent to the boundary based on the determined value of the boundary filtering strength,
   wherein the first coding unit and a second coding unit are obtained by splitting an upper coding unit.

2. An image decoding apparatus comprising at least one processor configured to
   when a prediction mode of a first coding unit is a combined inter-intra prediction mode, to determine a first prediction block of the first coding unit by using a weighted sum of a first sample value according to intra-prediction and a second sample value according to inter-prediction,
   when the prediction mode of the first coding unit is the combined inter-intra prediction mode, to determine a value of a boundary filtering strength applied to a boundary between a first reconstruction block and a second reconstruction block, wherein the value of the boundary filtering strength is equal to a value of a boundary filtering strength used when the prediction mode of the first coding unit is an intra prediction mode, and
   to perform deblocking filtering on samples adjacent to the boundary based on the determined value of the boundary filtering strength,
   wherein the first coding unit and a second coding unit are obtained by splitting an upper coding unit.

3. An image encoding method comprising:
   when a prediction mode of a first coding unit is a combined inter-intra prediction mode, determining a first prediction block of the first coding unit by using a weighted sum of a first sample value according to intra-prediction and a second sample value according to inter-prediction;
   when the prediction mode of the first coding unit is the combined inter-intra prediction mode, determining a value of a boundary filtering strength applied to a boundary between a first reconstruction block and a second reconstruction block, wherein the value of the boundary filtering strength is equal to a value of a boundary filtering strength used when the prediction mode of the first coding unit is an intra prediction mode; and
   performing deblocking filtering on samples adjacent to the boundary based on the determined value of the boundary filtering strength,
   wherein the first coding unit and a second coding unit are obtained by splitting an upper coding unit.

4. A non-transitory computer-readable recording medium having recorded thereon a program for executing the image decoding method of claim 1.

* * * * *